United States Patent
Perkins et al.

(10) Patent No.: US 10,085,523 B2
(45) Date of Patent: Oct. 2, 2018

(54) ATTACHMENT SYSTEM FOR AN ELECTRONIC DEVICE

(71) Applicant: Apple Inc., Cupertino, CA (US)

(72) Inventors: Ryan C. Perkins, Cupertino, CA (US); Phillip M. Hobson, Cupertino, CA (US); Michael J. Webb, Scotts Valley, CA (US)

(73) Assignee: Apple Inc., Cupertino, CA (US)

(*) Notice: Subject to any disclaimer, the term of this patent is extended or adjusted under 35 U.S.C. 154(b) by 273 days.

(21) Appl. No.: 14/789,292

(22) Filed: Jul. 1, 2015

(65) Prior Publication Data
US 2016/0037870 A1 Feb. 11, 2016

Related U.S. Application Data

(60) Provisional application No. 62/036,080, filed on Aug. 11, 2014, provisional application No. 62/047,625, (Continued)

(51) Int. Cl.
*B25G 3/18* (2006.01)
*F16B 21/00* (2006.01)
(Continued)

(52) U.S. Cl.
CPC ...... *A44B 17/0011* (2013.01); *A44B 11/2596* (2013.01); *A44B 11/263* (2013.01);
(Continued)

(58) Field of Classification Search
CPC .. G04B 37/1486; G04B 37/1493; A44C 5/14; A44C 5/147; A44C 5/2085;
(Continued)

(56) References Cited

U.S. PATENT DOCUMENTS 2,126,263 A 8/1838 Kestenmen
2,346,887 A 4/1944 Winkler
(Continued)

FOREIGN PATENT DOCUMENTS

CH 694393 12/2004
CN 2052214 U 2/1990
(Continued)

OTHER PUBLICATIONS

Author Unknown, "Ikepod Wristwatches by Mark Newson," http://www.dezeen.com/2007/12/10/ikepod-wristwatches-by-marc-newson/ , 32 pages, Dec. 10, 2007.
(Continued)

*Primary Examiner* — Jack W Lavinder
(74) *Attorney, Agent, or Firm* — McDermott Will & Emery LLP

(57) ABSTRACT

Embodiments of the present disclosure provide a removable module and a housing for an attachment system of a consumer product. The removable module includes a locking mechanism comprising a first portion having a substantially planar top surface and second portion that comprises a substantially non-planar bottom surface. The first portion and the second portion are coupled together. The locking mechanism also includes a first spring mechanism coupled between the first portion and the second portion. The first spring mechanism causes the first portion to be biased away from the second portion. The locking mechanism also includes a second spring mechanism. The second spring mechanism causes the substantially planar top surface of the first portion to be biased substantially flush with respect to the removable module and also causes the substantially non-planar bottom surface of the second portion to be biased proud with respect to the removable module.

19 Claims, 49 Drawing Sheets

Related U.S. Application Data filed on Sep. 8, 2014, provisional application No. 62/129,891, filed on Mar. 8, 2015.

(51) Int. Cl.

| | |
|---|---|
| *F16D 1/00* | (2006.01) |
| *A44B 17/00* | (2006.01) |
| *F16B 2/00* | (2006.01) |
| *A44C 5/14* | (2006.01) |
| *A44B 11/25* | (2006.01) |
| *A44B 11/26* | (2006.01) |
| *A44C 5/20* | (2006.01) |
| *G04B 37/14* | (2006.01) |
| *F16B 2/12* | (2006.01) |
| *F16B 2/14* | (2006.01) |
| *F16B 2/04* | (2006.01) |
| *F16B 2/06* | (2006.01) |
| *F16B 17/00* | (2006.01) |

(52) U.S. Cl.
CPC ........... *A44C 5/14* (2013.01); *A44C 5/147* (2013.01); *A44C 5/2085* (2013.01); *F16B 2/005* (2013.01); *F16B 2/04* (2013.01); *F16B 2/06* (2013.01); *F16B 2/12* (2013.01); *F16B 2/14* (2013.01); *F16B 17/00* (2013.01); *G04B 37/1486* (2013.01); *Y10T 403/602* (2015.01)

(58) Field of Classification Search
CPC ............ Y10T 24/4718; Y10T 24/4782; A44B 17/0011; A44B 11/2596; A44B 11/263; F16B 2/005; F16B 2/04; F16B 2/06; F16B 2/12; F16B 2/14; F16B 17/00
USPC ...... 24/DIG. 45, DIG. 46, DIG. 52; 224/168, 224/177, 180; 368/281, 282
See application file for complete search history.

(56) References Cited

U.S. PATENT DOCUMENTS

| | | | |
|---|---|---|---|
| 2,408,279 A | 9/1946 | Valcourt | |
| 2,505,044 A | 4/1950 | Heinrich | |
| 2,518,551 A | 8/1950 | Jaccarino | |
| 2,775,861 A | 10/1955 | Fachon | |
| 3,293,714 A | 12/1966 | Kostanecki et al. | |
| 3,376,616 A | 4/1968 | Kaczorowski | |
| 3,589,341 A | 6/1971 | Krebs | |
| 3,675,284 A | 7/1972 | Rieth | |
| 3,747,171 A | 7/1973 | Montague, Jr. | |
| 4,068,355 A | 1/1978 | Rey | |
| 4,178,751 A | 12/1979 | Liautaud | |
| 4,217,681 A | 9/1980 | Grohoski et al. | |
| 4,234,115 A | 11/1980 | Williams | |
| 4,249,267 A | 2/1981 | Voss | |
| 4,401,388 A | 8/1983 | Mearns | |
| 4,414,714 A | 11/1983 | Kostanecki et al. | |
| 4,432,655 A | 2/1984 | Wollman | |
| 4,447,238 A | 5/1984 | Eldridge, Jr. | |
| 4,502,191 A | 3/1985 | Savage | |
| 4,615,185 A | 10/1986 | Bollinger | |
| 4,624,033 A | 11/1986 | Orton | |
| 4,648,161 A * | 3/1987 | Rosen .................. | A44C 5/2085 24/587.11 |
| 4,941,236 A | 7/1990 | Sherman et al. | |
| 5,130,899 A | 7/1992 | Larkin et al. | |
| 5,146,437 A | 9/1992 | Boucheron | |
| 5,181,192 A | 1/1993 | Paratte et al. | |
| 5,189,763 A | 3/1993 | Voumard | |
| 5,244,134 A | 9/1993 | Riley | |
| 5,305,503 A | 4/1994 | Yamagata | |
| 5,307,582 A | 5/1994 | Quintal | |
| 5,400,870 A | 3/1995 | Inoue | |
| 5,471,716 A | 12/1995 | Takahashi | |
| 5,522,529 A | 6/1996 | Yurman et al. | |
| 5,668,784 A | 9/1997 | Iguchi | |
| 5,711,056 A | 1/1998 | Taguchi et al. | |
| 5,788,400 A | 8/1998 | Wey | |
| 5,899,369 A | 5/1999 | Macripo | |
| 5,914,913 A | 6/1999 | Shriqui | |
| 5,930,873 A | 8/1999 | Wyse | |
| 5,991,978 A | 11/1999 | Nussbaum | |
| 6,014,793 A | 1/2000 | Howald | |
| 6,067,692 A | 5/2000 | Chang | |
| 6,163,938 A | 12/2000 | Weber-Unger | |
| 6,168,055 B1 | 1/2001 | Grados | |
| 6,170,131 B1 | 1/2001 | Shin | |
| 6,179,025 B1 | 1/2001 | Sutton | |
| 6,311,373 B1 | 9/2001 | Grunberger | |
| 6,505,385 B2 | 1/2003 | Grunberger | |
| 6,588,069 B2 | 7/2003 | Deriaz et al. | |
| 6,598,271 B2 | 7/2003 | Nire | |
| 6,606,767 B2 | 8/2003 | Wong | |
| 6,631,669 B2 | 10/2003 | Weldle | |
| 6,647,597 B2 | 11/2003 | Reiter | |
| 6,678,898 B2 | 1/2004 | Jones et al. | |
| 6,701,580 B1 | 3/2004 | Bandyopadhyay | |
| 6,712,501 B2 | 3/2004 | Kinkio et al. | |
| 6,726,070 B2 | 4/2004 | Lautner | |
| 6,746,058 B2 | 6/2004 | Kienzler | |
| 6,787,006 B2 | 9/2004 | Gopalraja et al. | |
| 7,243,824 B2 | 7/2007 | Tabata | |
| 7,363,687 B2 | 4/2008 | Kraus et al. | |
| 7,373,696 B2 | 5/2008 | Schoening et al. | |
| 7,380,979 B2 | 6/2008 | Hiranuma et al. | |
| 7,451,528 B2 | 11/2008 | Sima | |
| 7,509,712 B2 | 3/2009 | Sima | |
| 7,526,840 B2 | 5/2009 | Pernu et al. | |
| 7,640,632 B2 | 1/2010 | Lazarus | |
| 7,806,309 B2 | 10/2010 | Korchmar | |
| 7,882,601 B2 | 2/2011 | Nguyen | |
| 7,900,754 B2 | 3/2011 | Carlson | |
| 7,905,039 B2 | 3/2011 | Karovic | |
| 8,091,261 B2 | 1/2012 | Chadwick | |
| 8,191,209 B2 | 6/2012 | Wolfgang | |
| 8,235,585 B2 | 8/2012 | Speichinger | |
| 8,240,011 B2 | 8/2012 | Chevrolet | |
| 8,261,416 B2 | 9/2012 | Rothbaum et al. | |
| 8,316,515 B2 | 11/2012 | Slank | |
| 8,471,658 B2 | 6/2013 | Fullerton et al. | |
| 8,486,481 B2 | 7/2013 | Giuseppin et al. | |
| 8,573,458 B1 | 11/2013 | Hamilton | |
| 8,578,569 B1 | 11/2013 | Karnoski et al. | |
| 8,615,849 B2 | 12/2013 | Rothbaum et al. | |
| 8,671,725 B2 | 3/2014 | Nicoara | |
| 8,789,246 B2 | 7/2014 | Yliluoma et al. | |
| 8,844,100 B2 * | 9/2014 | Humphries .......... | A44C 5/2085 24/303 |
| 8,967,437 B2 | 3/2015 | Wilson | |
| 9,003,611 B2 | 4/2015 | Catanese | |
| 9,049,894 B2 | 6/2015 | Wong | |
| 9,357,817 B2 | 6/2016 | Lee et al. | |
| 9,392,829 B2 | 7/2016 | Manuello | |
| 9,877,549 B2 | 1/2018 | Perkins et al. | |
| 2003/0116596 A1 | 6/2003 | Terasawa | |
| 2005/0102802 A1 | 5/2005 | Sitbon et al. | |
| 2005/0265132 A1* | 12/2005 | Ho ..................... | G04B 37/1486 368/282 |
| 2006/0156520 A1 | 7/2006 | Meranto | |
| 2006/0186150 A1 | 8/2006 | Willows et al. | |
| 2006/0254105 A1 | 11/2006 | Chang | |
| 2007/0028429 A1 | 2/2007 | Ishida | |
| 2009/0133438 A1 | 5/2009 | Stampfli et al. | |
| 2009/0265832 A1 | 10/2009 | Clement | |
| 2010/0200627 A1 | 8/2010 | Shen | |
| 2010/0258601 A1 | 10/2010 | Thrope | |
| 2011/0083254 A1 | 4/2011 | Trutna et al. | |
| 2011/0226823 A1 | 9/2011 | Jasa | |
| 2011/0309121 A1 | 12/2011 | Dooley et al. | |
| 2012/0044031 A1 | 2/2012 | Ninomiya | |
| 2012/0055212 A1 | 3/2012 | Nicoara | |
| 2012/0216374 A1 | 8/2012 | Manuello | |
| 2013/0086774 A1 | 4/2013 | Krasinski et al. | |

(56) References Cited

U.S. PATENT DOCUMENTS

| | | |
|---|---|---|
| 2013/0205476 A1 | 8/2013 | Gentile et al. |
| 2013/0305780 A1 | 11/2013 | Christ |
| 2013/0326790 A1 | 12/2013 | Cauwels et al. |
| 2014/0083133 A1* | 3/2014 | Lee .................. A44C 5/14 63/3.1 |
| 2015/0174854 A1 | 6/2015 | Siahaan et al. |
| 2015/0181749 A1 | 6/2015 | Gong |
| 2016/0003269 A1 | 1/2016 | Russell-Clarke et al. |
| 2016/0010673 A1 | 1/2016 | Russell-Clarke et al. |
| 2016/0025119 A1 | 1/2016 | Russell-Clarke et al. |
| 2016/0037876 A1 | 2/2016 | Perkins et al. |
| 2016/0037877 A1 | 2/2016 | Perkins et al. |
| 2016/0037878 A1 | 2/2016 | Yabe et al. |
| 2016/0040695 A1 | 2/2016 | Perkins et al. |
| 2016/0040698 A1 | 2/2016 | Perkins et al. |
| 2016/0069371 A1 | 3/2016 | Chen et al. |
| 2016/0233034 A1 | 8/2016 | Sheng |
| 2017/0181510 A1 | 6/2017 | Novak |
| 2017/0265607 A1 | 9/2017 | Hatanaka et al. |
| 2018/0011448 A1 | 1/2018 | Von Allmen |
| 2018/0090890 A1 | 3/2018 | Kallman et al. |

FOREIGN PATENT DOCUMENTS

| | | |
|---|---|---|
| CN | 1147358 A | 4/1997 |
| CN | 3118417 | 8/1999 |
| CN | 3184158 | 4/2001 |
| CN | 3210240 | 11/2001 |
| CN | 3229132 | 3/2002 |
| CN | 2575724 Y | 9/2003 |
| CN | 1181412 | 12/2004 |
| CN | 2706786 | 6/2005 |
| CN | 200983868 Y | 12/2007 |
| CN | 101535920 | 9/2009 |
| CN | 201446979 | 5/2010 |
| CN | 101843393 A | 9/2010 |
| CN | 201709560 U | 1/2011 |
| CN | 102202533 A | 9/2011 |
| CN | 202026953 U | 11/2011 |
| CN | 102282525 | 12/2011 |
| CN | 202060129 | 12/2011 |
| CN | 102392556 | 3/2012 |
| CN | 102576213 A | 7/2012 |
| CN | 202587325 U | 12/2012 |
| CN | 202664274 U | 1/2013 |
| CN | 202704189 U | 1/2013 |
| CN | 202850585 | 4/2013 |
| CN | 3329483 | 12/2013 |
| CN | 103488076 A | 1/2014 |
| CN | 203435257 U | 2/2014 |
| CN | 103670062 A | 3/2014 |
| CN | 103802695 | 5/2014 |
| CN | 103895602 | 7/2014 |
| EP | 2098131 A2 | 9/2009 |
| EP | 2141554 | 1/2010 |
| FR | 1291875 A | 4/1962 |
| FR | 2492238 A1 | 4/1982 |
| FR | 2532239 A1 | 3/1984 |
| GB | 464417 A | 4/1937 |
| GB | 865498 | 4/1961 |
| GB | 1491532 A | 11/1977 |
| GB | 2113975 A | 8/1983 |
| GB | 2079359 B | 11/1983 |
| GB | 2355281 A | 4/2001 |
| HK | 0501949 | 8/2005 |
| HK | 1001605 | 9/2010 |
| JP | S60178382 | 9/1985 |
| JP | S 63-187913 U | 12/1988 |
| JP | 6-62387 | 9/1994 |
| JP | 3753756 B | 3/2006 |
| JP | 2013254878 | 12/2013 |
| TW | 440751 | 6/2001 |
| TW | M380273 U1 | 5/2010 |
| TW | 201336387 A | 9/2013 |
| WO | WO-2010/036090 A2 | 4/2010 |
| WO | WO-2011/0048344 A1 | 4/2011 |
| WO | WO-2012/160195 A2 | 11/2012 |
| WO | WO 2013/140080 | 9/2013 |

OTHER PUBLICATIONS

Author Unknown, "Tajan," http://www.tajan.com/pdf/7812.pdf, 2 pages, Dec. 10, 2007.
Author Unknown, "v2.0 Ikepod has landed . . . again . . . ," http://qp.granularit.com/media/38876/QP24_ikepod.pdf, 3 pages, at least as early as Apr. 25, 2015.
Taiwanese Office Action from Taiwanese Patent Application No. 105205763E01, dated Apr. 19, 2017.
Author Unknown, Boucheron Paris, Reflect Collection, http://us.boucheron.com/en_us/the-creations/watches/reflet.html, 4 pages, at least as early as Apr. 10, 2015.
International Search Report and Written Opinion, PCT/US2015/040692, 11 pages, dated Nov. 4, 2015.
Chinese Action from Chinese Patent Application No. 201510485843.X, dated Aug. 21, 2017.
Korean Office Action from Korean Patent Application No. 20-2016-0001398, dated Sep. 19, 2017.
"Consumer Product Safety Act," (Public Law 92-573; 86 Stat. 1207, Oct. 27, 1972); https://www.cpsc.gov/PageFiles/105435/cpsa.pdf?epslanguage=en site visited on Apr. 27, 2018, 118 pages.
Chinese Office Action from Chinese Patent Application No. 201510485843.X, dated May 17, 2018, 17 pages.
Chinese Office Action from Chinese Patent Application No. from 201510490138.9, dated Jun. 5, 2018, 22 pages.

* cited by examiner

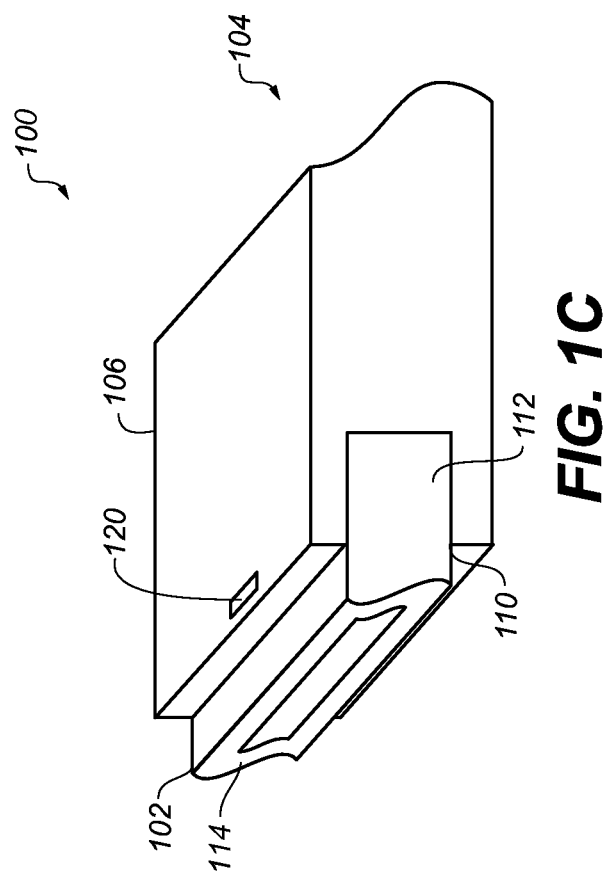

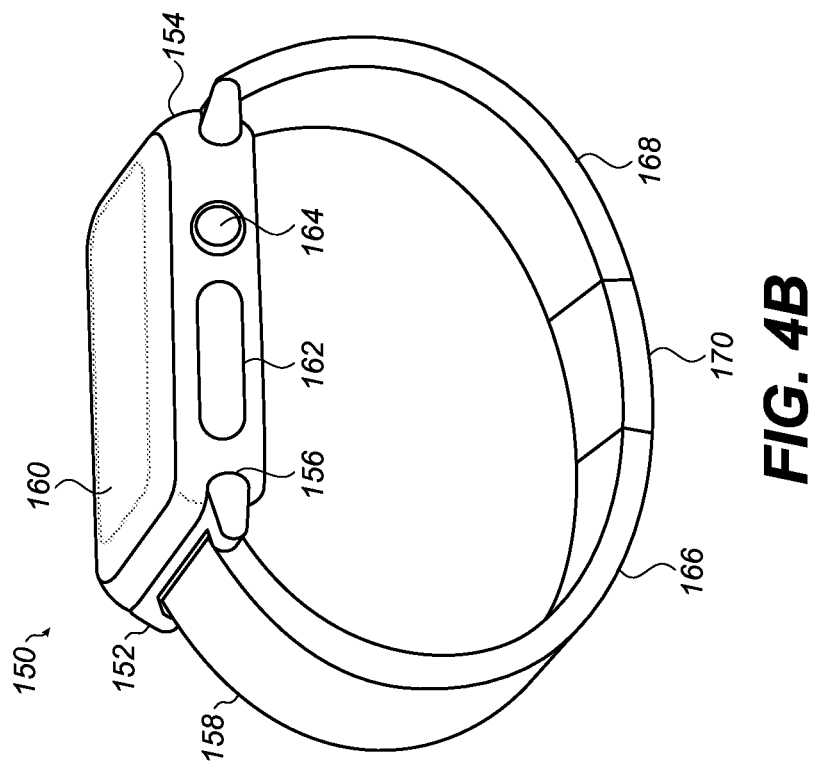

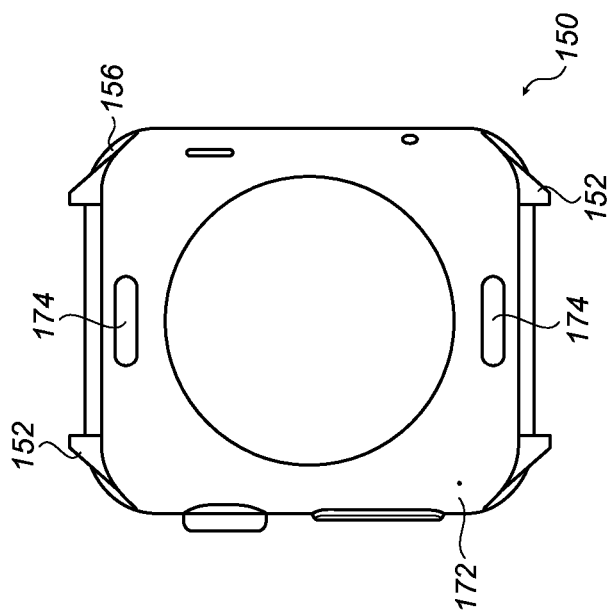
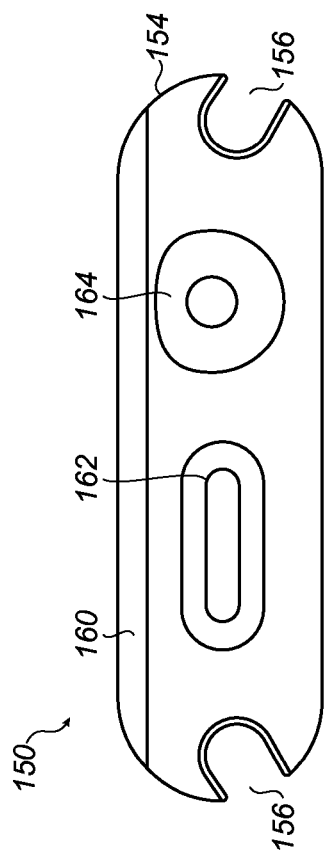

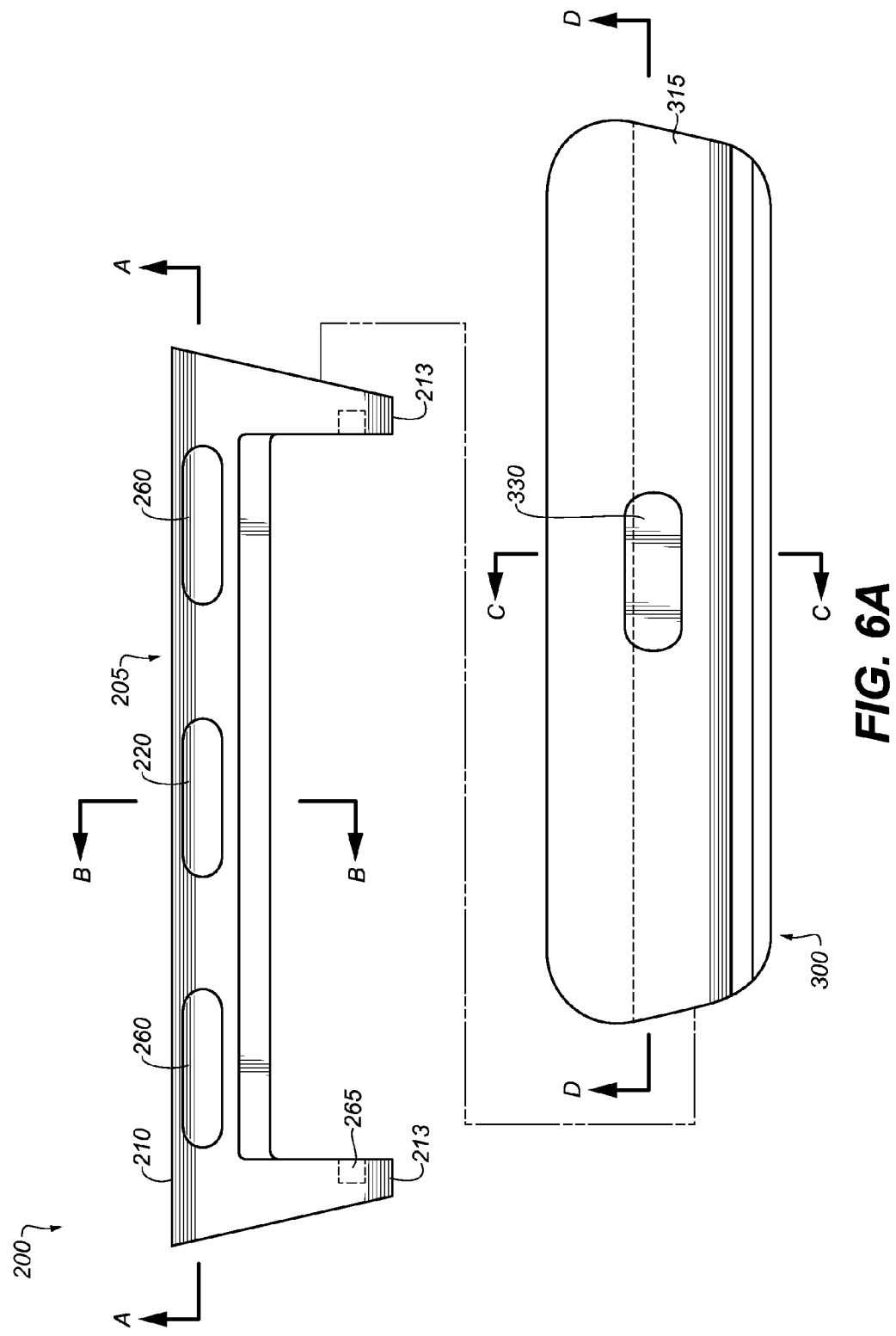

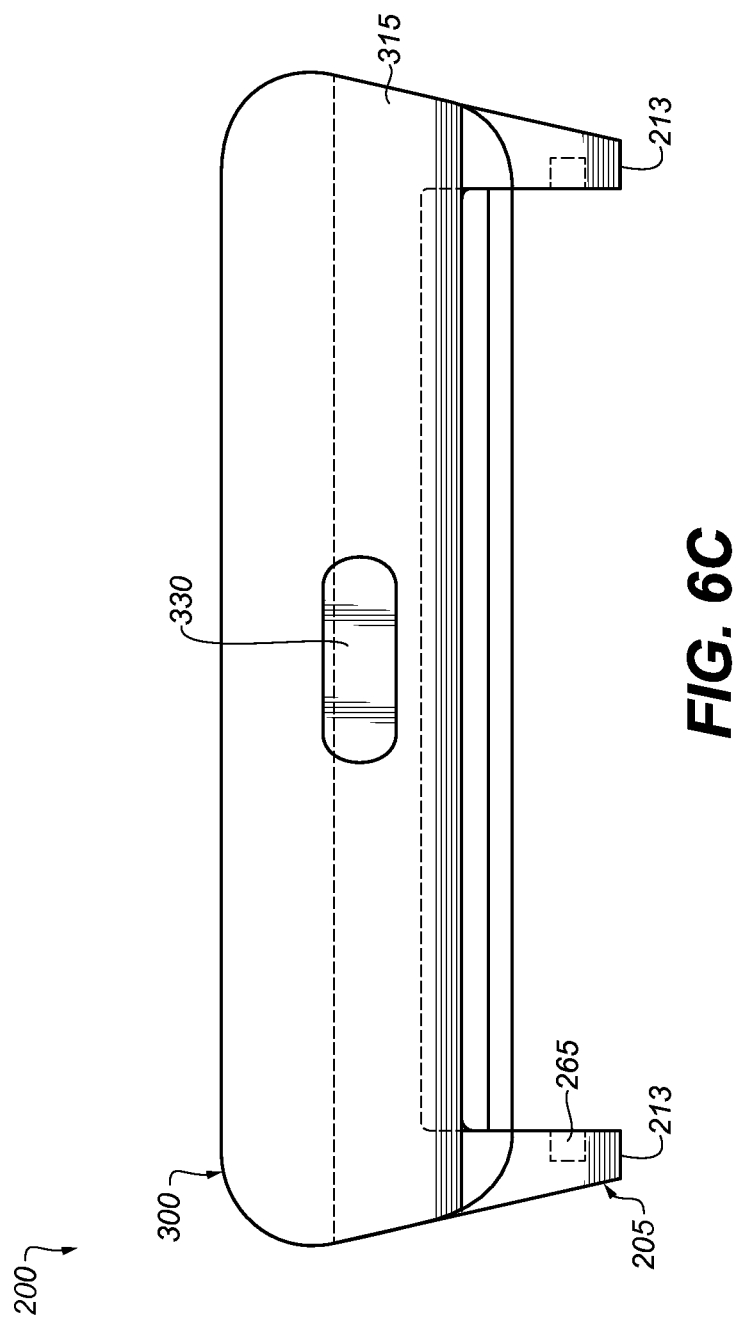

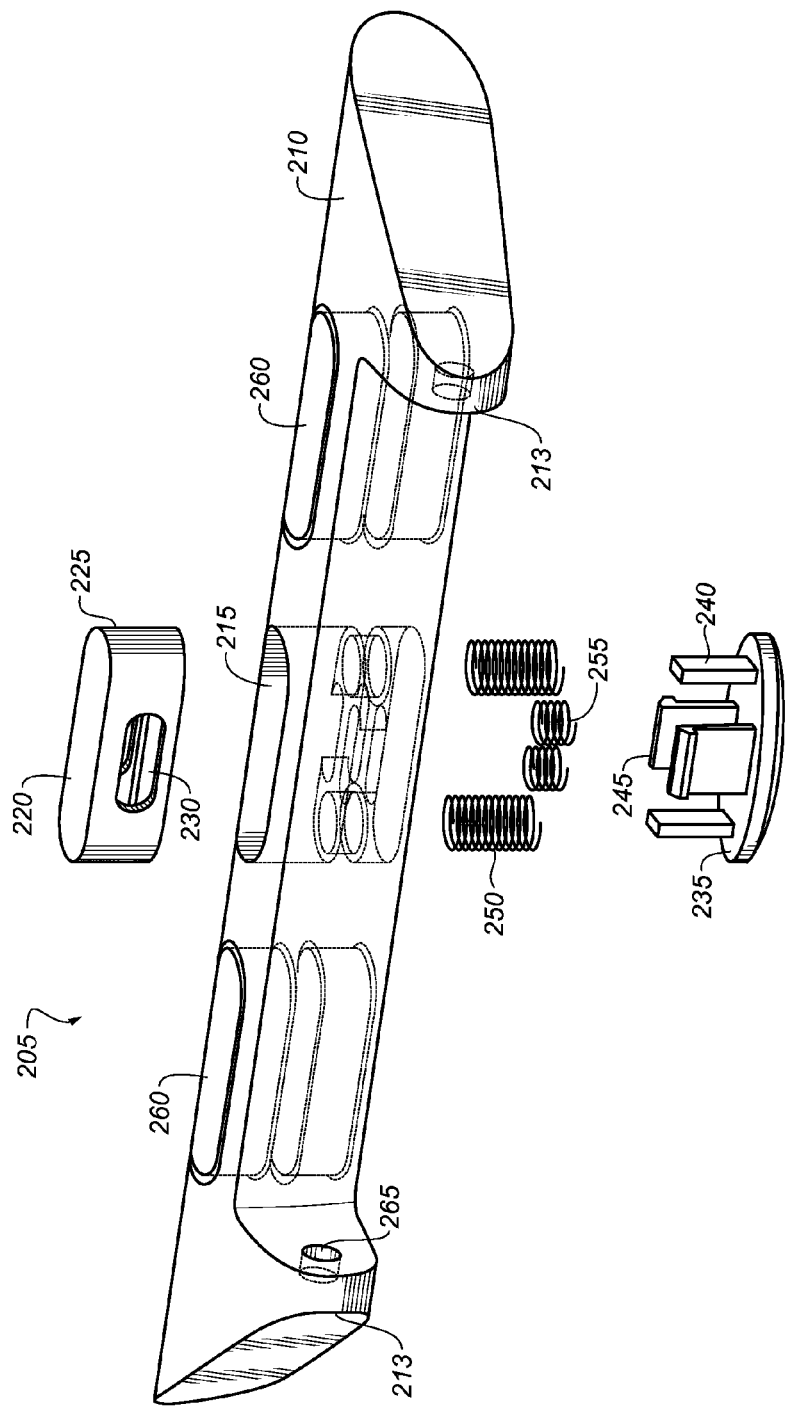

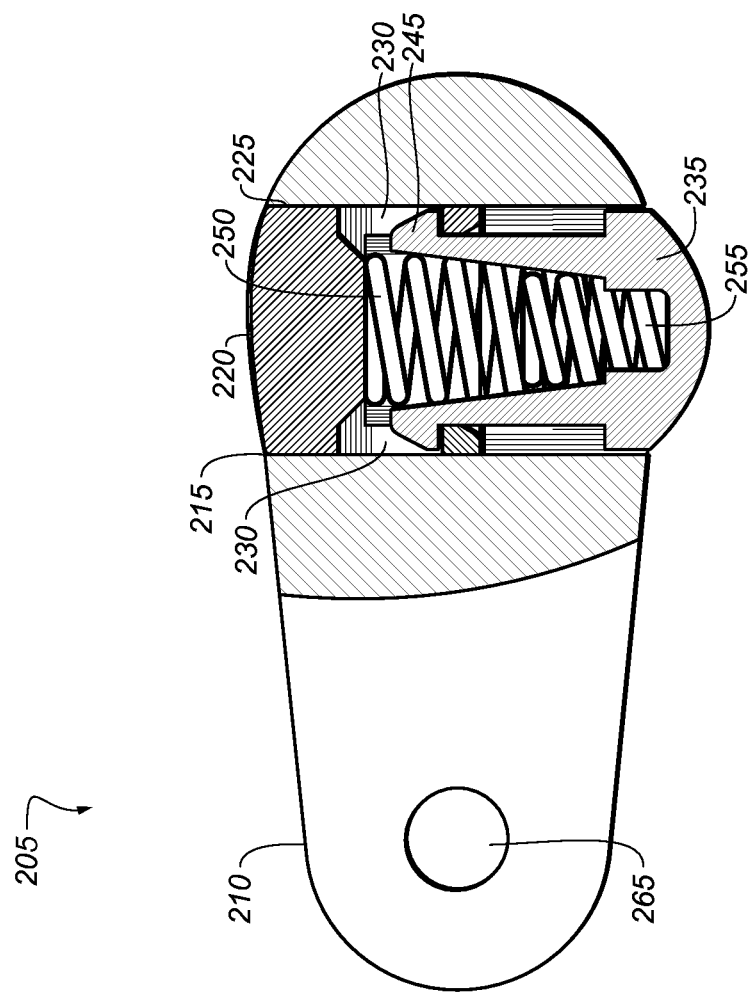

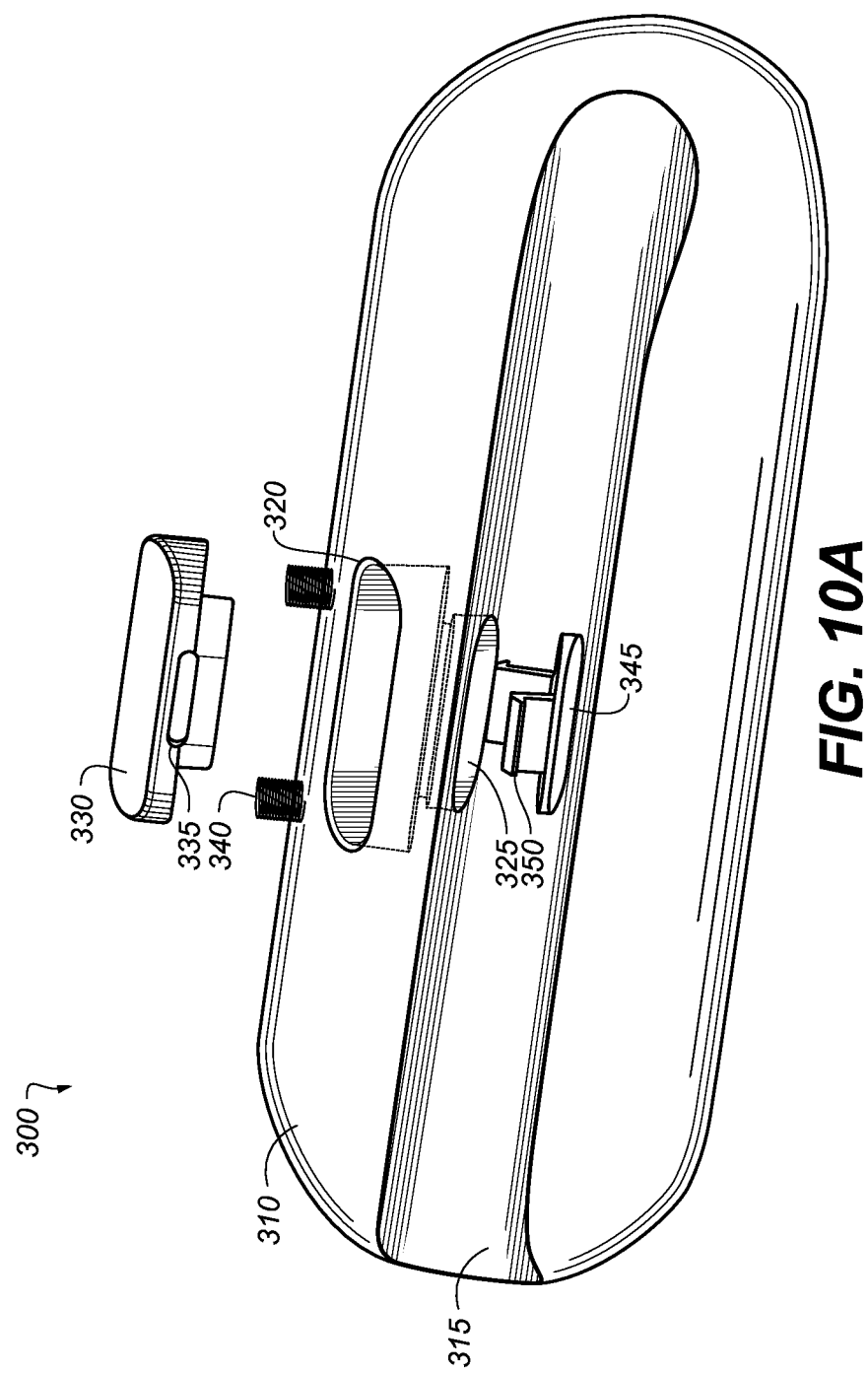

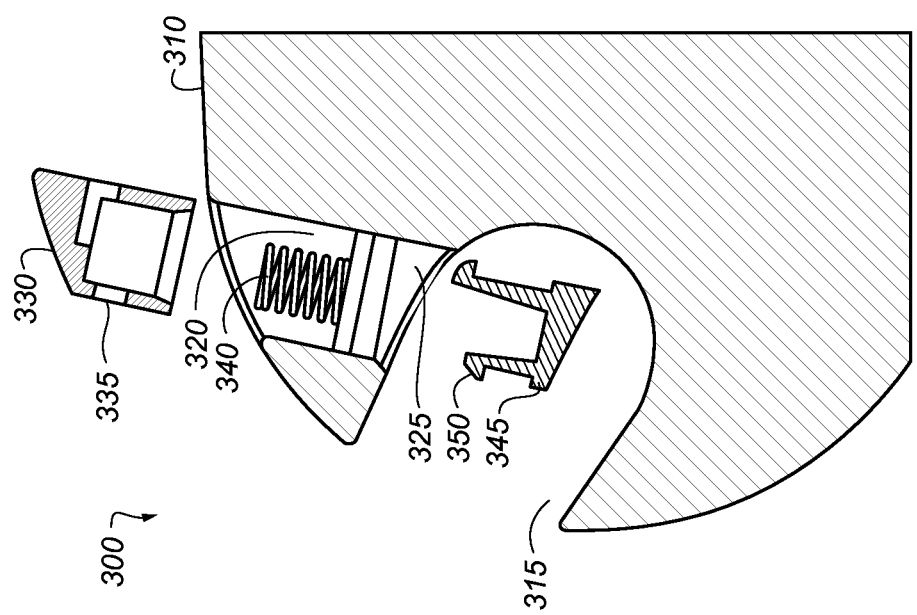

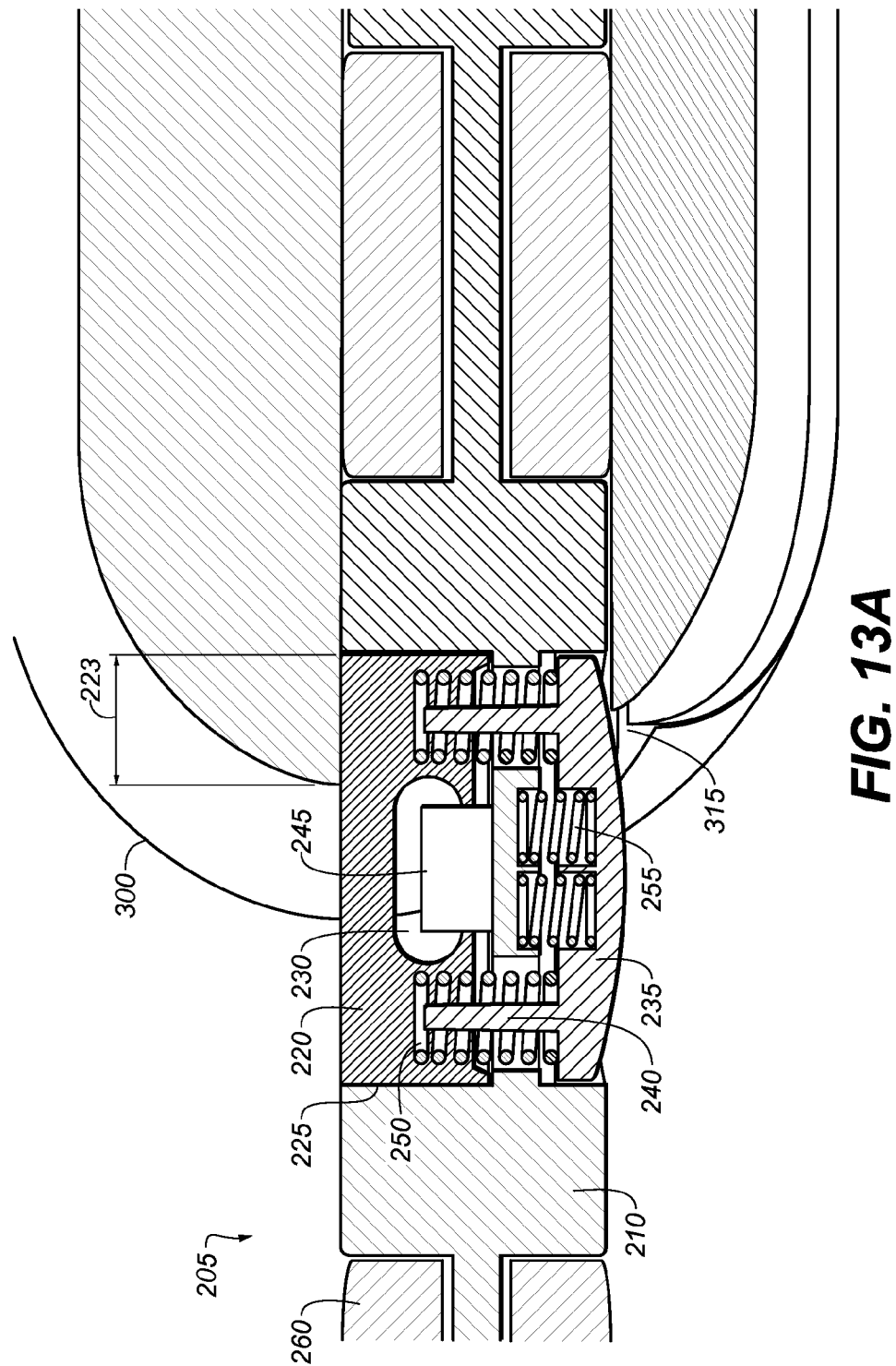

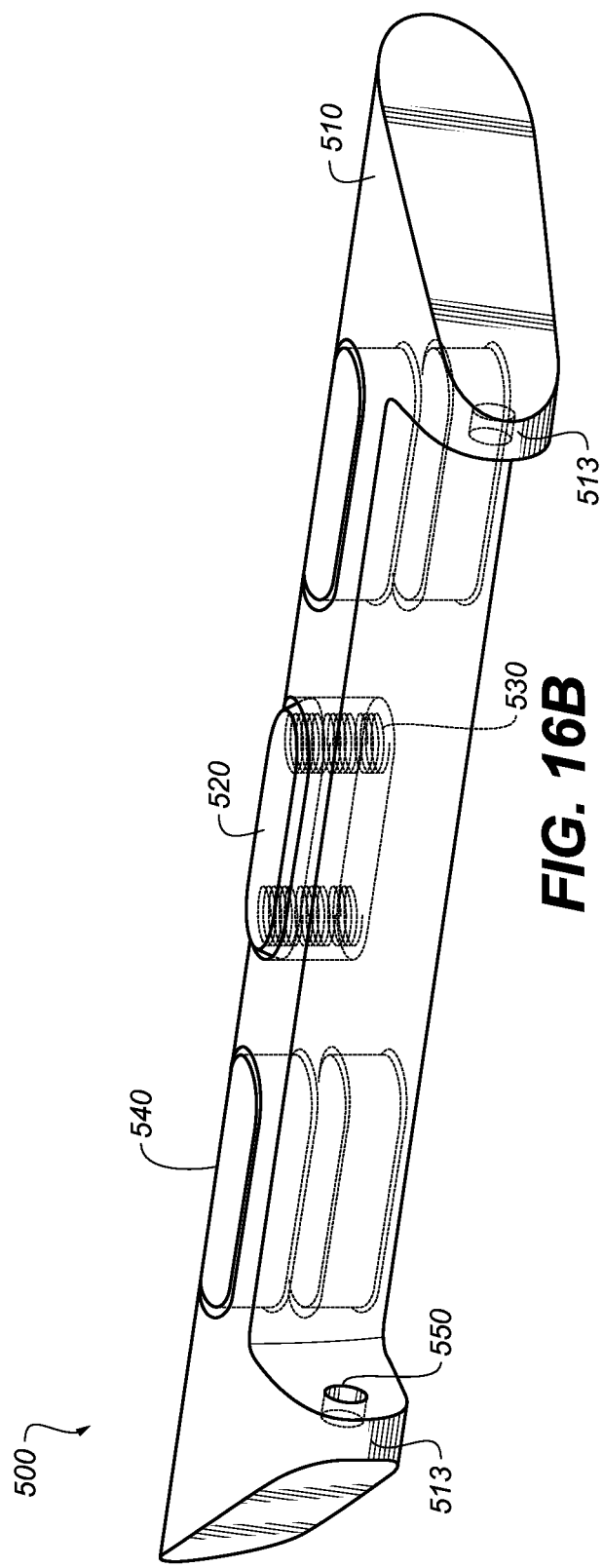

ATTACHMENT SYSTEM FOR AN ELECTRONIC DEVICE

CROSS-REFERENCE TO RELATED APPLICATIONS

This application is a nonprovisional patent application of and claims the benefit of U.S. Provisional Patent Application No. 62/036,080, filed Aug. 11, 2014 and titled "Attachment System for an Electronic Device," U.S. Provisional Patent Application No. 62/047,625 filed Sep. 8, 2014 and titled "Wearable Electronic Device and an Attachment System for Coupling Objects to the Wearable Electronic Device," and U.S. Provisional Patent Application No. 62/129,891, filed Mar. 8, 2015 and titled "Attachment System for an Electronic Device, the disclosures of each of which are hereby incorporated herein by reference in their entireties.

FIELD

The present disclosure is generally directed to an attachment system for coupling two objects together and, more specifically, to an attachment system for a consumer product.

BACKGROUND

Consumer products such as watches, cameras, phones, purses, and glasses may include one or more accessories attached thereto. The manner in which they are attached may be widely varied. However, they typically suffer from similar, if not the same, drawbacks. For example, many consumer products typically do not include user-friendly attachment systems. Some may require special tools and others may even require taking the consumer product into a shop in order to remove, fix or replace the accessories. Furthermore, even when products have user oriented attachment mechanisms, they may not provide adequate retention force. Even if the retention force is adequate, the mechanism used may be quite robust and large thereby adversely affecting the elegance of the consumer product.

In one example, wristwatches typically include a case and a band. The case carries the components or mechanisms of the wristwatch including the face. The band extends away from the case so that it can wrap around the wrist of a user. The band may be integral with the case. However, in most cases, the band is a separate part that is attached to the case. For example, the case may include a pin that captures the band thereby attaching the band to the case. In order to detach the band from the case, the pin needs to be removed. In some instances, band removal can be accomplished with a special tool. However, in many cases, the user may need to visit a specialty store or have the assistance of technician in order to remove the band.

In another example, a pair of glasses, such as, eye glasses, electronic glasses, sunglasses and the like, may have temples or stems that extend from a frame. The temples or stems may be coupled to the frames by a screw, a pin or other such mechanism. However, like the wristwatch, a special tool may be required to remove and/or secure the temples or stems to and from the frame.

In still yet another example, other electronic devices may be coupled to a lanyard or other type of band or accessory. For example a camera, a remote control, a game controller and the like may have a lanyard that is attached to a housing. However, it may be difficult to attach the lanyard to the housing as a portion of the lanyard is typically required to be inserted into a small opening within the housing of the electronic device. In this example, as with the other examples discussed above, the lanyard or other such accessory may be attached to the electronic device or consumer product in a manner that is neither secure nor aesthetically pleasing.

It is with respect to these and other general considerations that embodiments of the present disclosure have been made. Although relatively specific problems have been discussed, it should be understood that the embodiments described herein should not be limited to solving the specific problems identified in this background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Provided herein is an attachment system for a consumer product. As will be explained in detail below, the attachment system may be used to couple an article, an object, an accessory and the like to the consumer product. For example, the object, article, or accessory may be a cover, a lanyard, a band, a strap, a chain, a dock and the like. Likewise, the consumer product may be an electronic device, a mechanical device, an electromechanical device and so on. Accordingly, the attachment system may be coupled the article and further be used to secure the article to the consumer product. The attachment system may also be removed from the consumer product which thereby removes the article from the consumer product.

The article, the attachment system and the consumer product may comprise an ecosystem whereby each of the article, the attachment system and the consumer product are interchangeable with respect to one another. Thus, a single attachment system may be used with various articles and with various consumer products. Likewise, various articles may be used with various attachment systems and various consumer products. When the article is coupled to the attachment system, the combination of the article and the attachment system may be interchangeable with another attachment system and article combination. In this manner, articles (such as bands) having different characteristics may be matched or used with a single consumer product, thereby allowing the band to be easily and efficiently changed or swapped. One band may be changed out for another to account for environmental differences, operational features, functional characteristics, appearance, and so on.

Additionally, the consumer product may be changed out such that multiple consumer products may be coupled to a given band, although not necessarily simultaneously. A band may be connected to a media player through an attachment system associated with on one or both of the band and media player, as one example. The media player may be removed from the band and a portable health monitor or timekeeping device may then be attached to the band using the same attachment system, a component of the attachment system, or a compatible attachment system.

The interoperability of bands and consumer products and other such devices may be facilitated by a common attachment system. More specifically, the interoperability may be facilitated by a removable module of the attachment system. For example, the removable module of the attachment system may be received into a receiving module of a consumer product and may also be coupled to the article using a mating structure. By maintaining commonality of receiving modules across consumer products and commonality of mating structures across articles, interchangeability, functionality and choice may be enhanced. This may permit a variety of unique use cases, including using a band to physically connect two consumer products to one another presuming the band has a mating structure at both ends. Likewise, by providing a group of objects (bands, accessories, lanyards, chains, charging mechanisms, data transfer mechanisms, cables, stands, supports, structures, and so on) that each have a common mating structure that may be utilized by the attachment system, and a group of consumer products that each have a common receiving module for receiving the removable module of the attachment system, an ecosystem of objects and devices may be formed to provide increased choice, flexibility, operation and interoperability to a user.

Accordingly, and as will be described herein, an attachment system having a removable module is disclosed. The removable module is adapted to be received into an aperture, a groove or a channel of a housing of a consumer product. As the removable module slides relative to the aperture, groove or channel, the removable module may be locked in place within the aperture, groove or channel with a spring-biased locking mechanism located in a body of the removable module. More specifically, a portion of the spring-biased locking mechanism may be received into an opening within the aperture, groove or channel which locks the removable module within the housing of the consumer product.

A locking mechanism for an attachment system of an electronic device is also disclosed. The locking mechanism may be included in or otherwise retained in a body of a removable module of the attachment system. The locking mechanism includes a first portion and a second portion coupled to the first portion. The first portion is spring-biased away from the second portion and is also spring-biased substantially flush with respect to the body of the removable module. The second portion is also spring-biased away from the first portion and is spring-biased proud with respect to the body of the removable module.

A locking mechanism for an attachment system of a consumer product is disclosed. The locking mechanism includes a first portion having a substantially planar top surface and a second portion coupled to the first portion. The second portion has a substantially non-planar bottom surface. The first portion of the locking mechanism is spring-biased away from the second portion. Further, the substantially planar top surface of the first portion is spring-biased substantially flush with respect to a body of a removable module of the attachment system and the substantially non-planar bottom surface of the second portion is spring-biased proud with respect to the body of the removable module of the attachment system.

Also disclosed is a removable module for an attachment system of a consumer product. The removable module comprises a body having a proximal end and a distal end. At least one of the proximal end and the distal end is configured to be inserted into a channel of a housing of the consumer product. The body of the removable module includes a locking mechanism. The locking mechanism comprises a latch having a substantially planar top surface and ramp having a substantially non-planar bottom surface. The ramp and the latch are coupled together using a flange disposed on or otherwise associated with the ramp. The locking mechanism also includes a first spring mechanism coupled between the latch and the ramp and a second spring mechanism coupled between the ramp and an interior surface of the body. The second spring mechanism and the coupling of the latch and ramp cause the substantially planar top surface of the latch to be biased substantially flush with respect to the body of the removable module. The second spring mechanism also causes the substantially non-planar bottom surface of the ramp to be biased proud with respect to the body of the removable module.

A method for inserting a removable module of an attachment system into a channel of a housing of a consumer product is also disclosed. The method includes inserting a first portion of the removable module into the channel of a housing of a consumer product. The removable module includes a locking mechanism having a first portion that is spring-biased substantially flush with respect the removable module and a second portion that is spring-biased proud with respect to the removable module. The removable module is configured to slide into and within the channel. The sliding action of the removable module causes the first portion of the locking mechanism to enter the channel and remain substantially flush with respect to the attachment system. The sliding action also causes the second portion of the locking mechanism to be compressed by the channel such that the second portion of the locking mechanism is received into the removable module and is substantially flush with respect to the removable module. As the sliding action continues, the first portion of the locking mechanism is received into a recess of the channel when the first portion of the locking mechanism is in proximity to the recess.

A spring-biased locking mechanism that secures a removable module of an attachment system within a housing of a consumer product is disclosed herein. The locking mechanism includes a catch member and a ramp coupled to the catch member. The catch member comprises a substantially planar surface while the ramp has a substantially non-planar surface. A first spring mechanism and a second spring mechanism may be secured between the catch member and the ramp which causes the catch member to be biased away from the ramp such that the locking mechanism is in an expanded state. The second spring mechanism causes the catch member to be biased flush with respect to the removable module and further causes the ramp to be biased proud with respect to the removable module.

A removable module of an attachment system is also disclosed. The removable module has an elongated body having a rounded top surface and a rounded bottom surface. An aperture is disposed through the elongated body. The aperture defines an opening that receives a locking mechanism. In addition, the aperture comprises a first ledge portion and a second ledge portion. The first ledge portion is adapted to hold a first portion of the locking mechanism at a first location within the aperture and the second ledge portion is configured to hold a second portion of the locking mechanism at a second location within the aperture. The first location within the aperture is opposite the second location within the aperture. The second portion of the locking mechanism may be actuated in a first direction that is toward the first portion of the locking mechanism and the second ledge portion of the aperture. Actuation of the second portion of the locking mechanism in this manner causes the first portion of the locking mechanism to expand away from the first ledge portion and the second portion of the locking mechanism.

Also disclosed is a removable module of an attachment system. The removable module is comprised of an elongated body having a proximal end and a distal end. The removable module also includes a spring-biased locking mechanism having a catch member and a ramp disposed through an axis of the elongated body. The catch member of the locking mechanism is spring-biased substantially flush against a first side of the elongated body and the ramp of the locking mechanism is spring-biased proud with respect to a second side of the elongated body.

Also disclosed herein is a release mechanism for a housing of a consumer product. The release mechanism for the housing of the consumer product includes an actuation member having a substantially planar top surface. The release mechanism also includes a plunger member configured to mate with the actuation member. The release mechanism may include one or more spring mechanisms disposed between the actuation member and the plunger member. The one or more spring mechanisms may cause the substantially planar top surface of the actuation member to be biased substantially flush with respect to the housing and away from the plunger member. In certain embodiments, the release mechanism is configured to interact with a locking mechanism of an attachment system disposed within the housing. Specifically, when the actuation member of the release mechanism is actuated, the release mechanism is configured to compress at least a portion of the locking mechanism to enable the attachment system to slide within the housing.

A housing for a consumer product is disclosed. The housing includes a channel disposed at least partially along a length of the housing. In certain embodiments, the channel has an opening on one or more of a proximal end and a distal end. Each opening of the channel is configured to receive a proximal end or a distal end of an attachment system. One or more embodiments also provide that a through-hole is disposed on a first portion of the channel. The through-hole is configured to receive a release mechanism and comprises at least one ledge. The at least one ledge is configured to retain at least a portion of the release mechanism in a first position. The through-hole also includes a recess that is configured to receive a portion of the release mechanism and a portion of a spring-biased locking mechanism of the attachment system.

One or more additional embodiments of the present disclosure are directed to a housing for a consumer product. The housing comprises a channel disposed along a sidewall of the housing. The channel may include an opening on a proximal end and an opening on a distal end. The opening on each of the proximal end and the distal end is configured to receive at least a portion of an attachment system. The channel also includes a recess that is configured to receive a spring-biased locking mechanism of an attachment system. The recess may include at least a portion of a release mechanism that is configured to expel the spring-biased locking mechanism from within the recess in response to actuation of the release mechanism.

The present disclosure also describes an attachment system disposed within a channel of a housing of a consumer product. The housing includes a release mechanism. At least a portion of the release mechanism is positioned within a recess of the channel. The attachment system includes a compressible locking mechanism in which at least a portion of the compressible locking mechanism is configured to be received within the recess of the channel. The portion of the release mechanism contained within the recess is configured to expel the spring-biased locking mechanism from the recess in response to actuation of the release mechanism.

Once the spring-biased locking mechanism is free from the recess, the attachment system may be removed from the channel of the housing.

A method for coupling an attachment system to a housing of a device is also described. For this method, a first portion of an attachment system is inserted into a channel of a housing. The attachment system may comprise a spring-biased locking mechanism having a first portion and a second portion. The first portion of the locking mechanism is spring-biased substantially flush with respect to a first side of the attachment system and the second portion of the locking mechanism is spring-biased proud with respect to a second side of the attachment system. The method also includes sliding the attachment system within the housing. The sliding action causes the second portion of the locking mechanism to contract such that at least a portion of the second portion of the locking mechanism is substantially flush with respect to the second side of the attachment system. Additionally, the channel of the housing further causes the first portion of the locking mechanism to remain substantially flush with respect to the first side of the attachment system. When the first side of the locking mechanism is beneath or substantially beneath a recess in the channel of the housing, the first portion of the locking mechanism expands and is received into the recess in the channel.

Embodiments of the present disclosure also provide a method for assembling a locking mechanism for an attachment system. In such embodiments, an attachment system is provided. The attachment system may include a through-hole having at least a first ledge and a second ledge. A latch portion and a ramp of the locking mechanism are also provided. The latch portion may include a substantially planar top surface and a chamfered edge and the ramp has a rounded or non-planar bottom surface. In embodiments, the ramp is configured to mate with the latch portion and secures a first spring mechanism and a second spring mechanism between the latch portion and the ramp. The first spring mechanism causes the latch portion to be biased away from the ramp such that the locking mechanism is in an expanded state. Likewise, the second spring mechanism biases the ramp away from the latch portion such that the substantially planar top surface of the latch portion is substantially flush with respect to a first surface of the attachment system. Additionally, the second spring mechanism causes the rounded or non-planar bottom surface of the ramp to protrude from a second surface of the attachment system.

Embodiments of the present disclosure also provide a method for assembling a release mechanism for a housing of a device. The housing may include a channel at least partially disposed along a length of the housing. The housing may also include an opening that includes a recess portion disposed within the channel. The opening is configured to receive an actuation portion of the release mechanism and the recess is configured to receive a plunger of the release mechanism. One or more embodiments further provide that the actuation portion of the release mechanism is coupled with the plunger of the release mechanism. When the actuation portion is actuated, the plunger is configured to slide within the recess of the housing and compresses at least a portion of a locking mechanism that is contained within the recess.

One or more embodiments of the present disclosure also provide a method of releasing an attachment system from a housing of a consumer product. Specifically, one or more embodiments provide for actuating a button member disposed within a housing of the consumer product. In such embodiments, actuation of the button member causes a first portion of a spring-biased locking mechanism associated with the attachment system to be expelled from a recess within the housing such that the first portion of the locking mechanism that was contained within the recess is substantially flush with respect to a top surface of the attachment system. Further, in response to actuating the button member, the attachment system is moved from a first position within the housing to a second position at least substantially outside of the housing. When the attachment system is at least substantially out of the housing, a second portion of the locking mechanism is released from attachment system which causes the second portion of the locking mechanism to be biased proud with respect to a bottom surface of the attachment system while keeping the first portion of the locking mechanism biased flush with respect to the top side of the attachment system.

BRIEF DESCRIPTION OF THE DRAWINGS

The disclosure will be readily understood by the following detailed description in conjunction with the accompanying drawings, wherein like reference numerals designate like structural elements, and in which:

FIG. 1C illustrates the removable module being fully inserted into a channel of the attachment system according to one or more embodiments of the present disclosure;

FIG. 4A illustrates an example consumer product that may utilize an attachment system according to one or more embodiments of the present disclosure;

FIG. 4B illustrates an example consumer product that may utilize the attachment system to attach an accessory to the consumer product according to one or more embodiments of the present disclosure;

FIG. 4C illustrates a side view of the consumer product of FIG. 4A according to one or more embodiments of the present disclosure;

FIG. 4D illustrates a bottom view of the consumer product of FIG. 4A according to one or more embodiments of the present disclosure;

FIG. 6A illustrates a top view of an example attachment system that may be integrated with a consumer product according to one or more embodiments of the present disclosure;

FIG. 6C illustrates a top view of the removable module being fully inserted into the channel of the attachment system according to one or more embodiments of the present disclosure;

FIG. 7A illustrates a perspective exploded view of a locking mechanism of a removable module of an attachment system according to one or more embodiments of the present disclosure;

FIG. 8B illustrates an assembled side cross-section view of the locking mechanism of FIG. 7B according to one or more embodiments of the present disclosure;

FIG. 10A illustrates an exploded view of a release mechanism of an attachment system that is integrated within a housing of a consumer product according to one or more embodiments of the present disclosure;

FIG. 11A illustrates an exploded side cross-section view of a release mechanism of an attachment system that is integrated within a housing of a consumer product according to one or more embodiments of the present disclosure;

FIG. 13A illustrates a front cross-section view of a removable module of an attachment system being partially inserted into a channel of the attachment system that is integrated with a housing of a consumer product according to one or more embodiments of the present disclosure;

FIG. 16B illustrates a perspective view of the assembled locking mechanism of FIG. 16A according to one or more embodiments of the present disclosure;

DETAILED DESCRIPTION

Figure 1A:
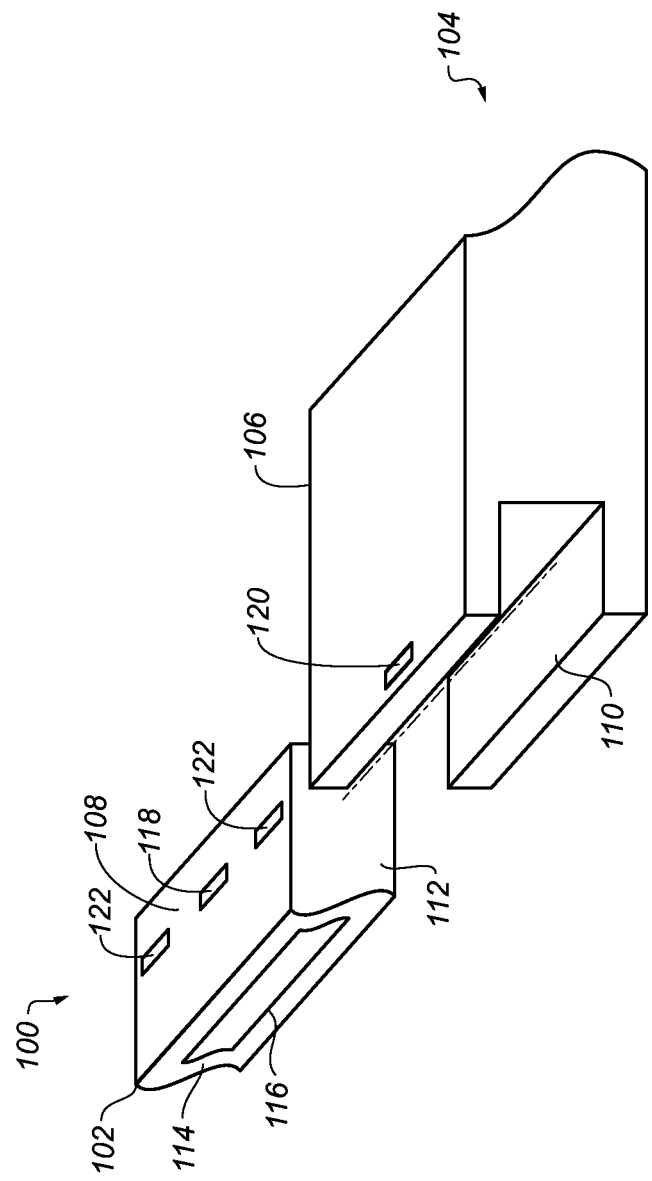
FIG. 1A illustrates an example attachment system for a consumer product according to one or more embodiments of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Provided herein is an attachment system for a consumer product. The attachment system may include a removable module that interfaces with some portion of the consumer product. For example, the removable module may engage with a related or corresponding module, recess, aperture or component of, or associated with, the consumer product. When engaged, the removable module may be carried by the consumer product. For example, when the removable module is engaged with the consumer product, the module and the consumer product may become an integrated unit. In some cases, the removable module can extend the functionality of the consumer product. That is, the attachment system and/or the removable module can provide additional operability to the consumer product.

Additionally or alternatively, the removable module may be used as an accoutrement to the consumer product. For example, the removable module may add an aesthetic or structural enhancement to the consumer product. Additionally or alternatively, the removable module may be configured to couple another object or article to the consumer product. For example, the object may be an accessory such as a cover, skin, plate, lanyard, band, strap, dock and/or the like. In all of these examples, the interface between the removable module and the consumer product may be a standard interface such that different functionality, accoutrements, and objects can be coupled to the consumer product.

The consumer product that may be used in conjunction with the attachment system can be widely varied. By way of example and not by way of limitation, the consumer product may be an electronic device, a mechanical device, an electromechanical device and the like. In one example, the consumer product is a portable consumer product. In another example, the consumer product is a wearable product. Additional and more specific examples of the consumer product include mobile phones, personal digital assistants, music players, timekeeping devices, health monitoring devices, tablet computers, laptop computers, glasses (electronic or otherwise), portable storage devices and the like. Although the examples above include electronic devices, the attachment system of the present disclosure may be used with non-electronic devices including purely mechanical timepieces, luggage, purses, jewelry, and the like.

The attachment system can also be widely varied. In one embodiment, the attachment system may have a tool-less design such that a special tool is not needed to connect and/or disconnect a removable module of the attachment system, or the attachment system itself, from the consumer product. As a tool may not be required, the attachment system may be easy to use and intuitive. Additionally or alternatively, a tool or other component, such as a component of the consumer product to which the attachment system is coupled or integrated with, may be configured to actuate a button or other component of the attachment system to secure and/or release the attachment system and/or the removable module from the consumer product.

Although a tool may not be required to secure and/or release the removable module from the consumer product, the attachment system of the present disclosure is robust and provides a retention force that enables the removable module to be securely coupled to the consumer product. Although the attachment system is robust, as will be discussed below and shown in the figures, the attachment system may have a low profile thereby enabling the consumer product to maintain a desirable or particular shape and and/or aesthetic.

As will also be described below, the attachment system of the present disclosure typically includes a product side attachment assembly and a non-product side attachment assembly that can engage with and disengage from one another. Each of these assemblies may, for example, include a lug portion that physically interfaces with one another in order to secure the two assemblies together. The assemblies may also releasably interface with one another in order to free the assemblies from each other.

In one embodiment, the attachment system includes a removable module that mechanically engages/disengages a component of the consumer product. The removable module may be coupled with and removed from the component of the consumer product. In one example, the component may be a housing of the consumer product. For example, the removable module may include a first lug portion configured for attachment to a second lug portion of the housing (or case) of the consumer product (e.g., a lug portion integrated with the housing). In another example, the component may be a module that is fixed, extends from or is otherwise attached to the housing of the consumer product. For example, the removable module may have a first lug portion configured for attachment to a second lug portion, which is fixed to and/or extends from the housing (or case) of the consumer product.

The attachment system may also include a captive locking mechanism that may be incorporated with the non-product side attachment assembly. The captive locking mechanism may be configured to engage a corresponding feature of a product-side attachment assembly of a consumer product. For example, if the consumer product is a wearable electronic device, such as a time keeping device or other wrist-wearable device, the attachment system may be configured to attach a band assembly to the body of the wearable electronic device. The band assembly may include one or more straps and a clasp that can be used to secure the wearable electronic device to the wrist of a user. In this case, the attachment system may include a captive locking mechanism that is incorporated with the band assembly and is configured to engage a corresponding feature formed in or incorporated with the body of the wearable electronic device. In some cases, the locking mechanism secures or locks the band assembly to the body of the wearable electronic device.

The attachment system may also include a release mechanism that may be incorporated with the product-side attachment assembly of a consumer product. For example, if the consumer product is a wearable electronic device, a release mechanism may be integrated with or incorporated into the body of the wearable electronic device. The release mechanism may be configured to disengage or unlock the captive locking mechanism and facilitate removal of a band assembly or other component.

In still yet other embodiments, the attachment system may include a removable module of the non-product assembly that mechanically or slideably engages/disengages a component of the consumer product. In one example, the component may be the housing or enclosure of the consumer product and the removable module may include a removable lug that forms part of a band assembly. In some cases, the band assembly includes at least one strap and a clasp that are configured to attach the consumer product to the wrist of an individual or user.

The removable module of the attachment system may be configured to be inserted into an opening on the consumer product. Once the removable module, has been inserted into the opening, the removable module may slide within the opening of the consumer product. For example, the consumer product may have a channel that is disposed on one or more surfaces or sides of a housing of the consumer product. The channel may be configured to receive a portion, such as an end portion, of the removable module of the attachment system. Once the end portion of the removable module has been inserted into the channel, the removable module may slide farther into the channel. The sliding motion of the removable module may continue until the removable module is secured or otherwise coupled to or within the channel. Just as the removable module is configured to slide into the channel of the consumer product, the removable module may also slide out of the channel of the consumer product. Thus, the removable module may be easily inserted into and removed from the consumer product.

In some embodiments, an opening or channel of the attachment system may be shaped to retain the removable module. For example, the opening or channel may include an undercut or narrowed portion that mechanically engages the removable module to retain the removable module in the opening or channel. As such, when the removable module is placed within the receiving module of the consumer product, the removable module may be integrated (either partially or entirely) with the consumer product.

In addition to the above, the attachment system of the present disclosure may have various other components and modules that enable the removable module to engage with and be disengaged from the consumer product. For example the removable module of the attachment system may have various pads disposed on a surface to assist or otherwise enable the removable module to slide within the receiving module of the consumer product. The pads may also be used to prevent undesired movement of the removable module once the removable module has been locked within the receiving module.

The attachment system may also be used to secure various accessories to the consumer product. For example, an accessory, article or object may be coupled or otherwise attached to the removable module of the attachment system. Further, the accessory, article or object may be used to secure the consumer product to a user. In some cases, the consumer product may be configured to receive multiple different bands, accessories and the like.

The consumer product, and the associated bands, may each include a common node (e.g., a removable module) that couples to a corresponding node (e.g., an opening or channel) associated with the consumer product. Accordingly, the consumer product may have a plurality of accessories or bands that may be interchangeable thereby providing a user many different aesthetic looks for the consumer product. More specifically, the consumer product may be configured to receive a first band, and second band which is different than the first band. Further, each of the first band and the second band may include a common node that couples to, or is received by, a corresponding node in the consumer product. Thus, each band may be interchangeable with respect to one another and with other bands and/or accessories.

Furthering the example from above, a band assembly or strap may be removably coupled to the removable module of the attachment system and may further be used to secure the consumer product to the user. Because the removable module is removably coupled to both the housing of the consumer product and a band or strap, the removable module itself, or the band or strap, may be interchangeable with numerous other bands having different materials, designs and configurations.

In another example, various consumer products may have bodies of different shapes, sizes and so on. However, each body may be configured to connect to a variety of different bands using a standard interface. In addition, each of the consumer products may be configured to connect via a standard interface to another type of non-band component, such as the removable module, an attachment system, a non-band component, or to another device.

For example, a consumer product may have a body that is adapted to attach to one or more bands, straps, or other similar component that may be used to attach the consumer product to the body of a user. The consumer product may be interchangeable or interchanged to provide a different set of functions or features. The bands or attachment components may be interchangeable or interchanged to provide desired functionality or features.

Furthering the example, each consumer product may include at least one receiving feature that is configured to interconnect with a corresponding feature that is attached to or integrally formed with the end of each of the bands or other mating part. The receiving feature may include a channel or groove that is formed in the body or housing of the consumer product. The mating feature of a respective band or component may be configured to slideably engage with the receiving feature formed in the body or housing of the consumer product to attach the band or component.

In some embodiments, the receiving feature and the mating feature are standardized. Thus, any of the bands can be interchangeably used with any of the bodies of the various consumer products.

In one particular embodiment, the consumer product is a portable electronic device, although the attachment system disclosed may be used with non-electronic consumer products. More specifically, the consumer product is a wearable consumer product. A wearable consumer product is one that can be worn by or otherwise secured to an individual or user. For example, the wearable electronic (or non-electronic) device may include, but is not limited to a wearable computer, a wearable watch, a wearable communication device, a wearable media player, a wearable health monitoring device, and/or the like. When used with these electronic devices, the attachment system may be used to couple a band, a strap, a sleeve or various types of clothing to the electronic device.

For example, in the case of a wrist worn product, the removable module of the attachment system may couple the device to a band that can be wrapped around and secured to a user's wrist. It should be appreciated, however, that this embodiment is not a limitation.

The band, the attachment system and/or portions of each may be made up of a variety of different materials and/or configurations. For example, the band and/or the attachment system, may be made from rubber, metal, woven fiber, leather, rubber overlaying a woven mesh, silicon, Milanese mesh, stainless steel, and so on.

In some embodiments, a first band, or a first portion of a first band, may be made up of a first material and a second band, or a second portion of the first band, may be made from a different material. The band may also be made up of a plurality of links with the attachment system forming one or more of the links. As such, the band may be resizable by, for example, adding or removing links.

The band may be coupled to a portion of the attachment system using a mechanical joint. For example, the band may be attached to a removable module such as a lug using one or more pins, holes, adhesives, screws, and the like. In some implementations, the band may be co-molded or over-molded with at least a portion of the removable module or lug. The band may also be integrally formed with a feature that functions as the removable module or lug. In still other implementations, the band may be configured to magnetically couple to a second part of the part or to a portion of the consumer product.

These and other embodiments are discussed below with reference to FIG. 1-FIG. 31. However, those skilled in the art will readily appreciate that the detailed description given herein with respect to these figures is for explanatory purposes only and should not be construed as limiting. It is understood that similarly numbered and/or named components shown in the various figures and described throughout may function in a substantially similar fashion and may be formed from similar portions and/or similar materials.

Figure 1B:
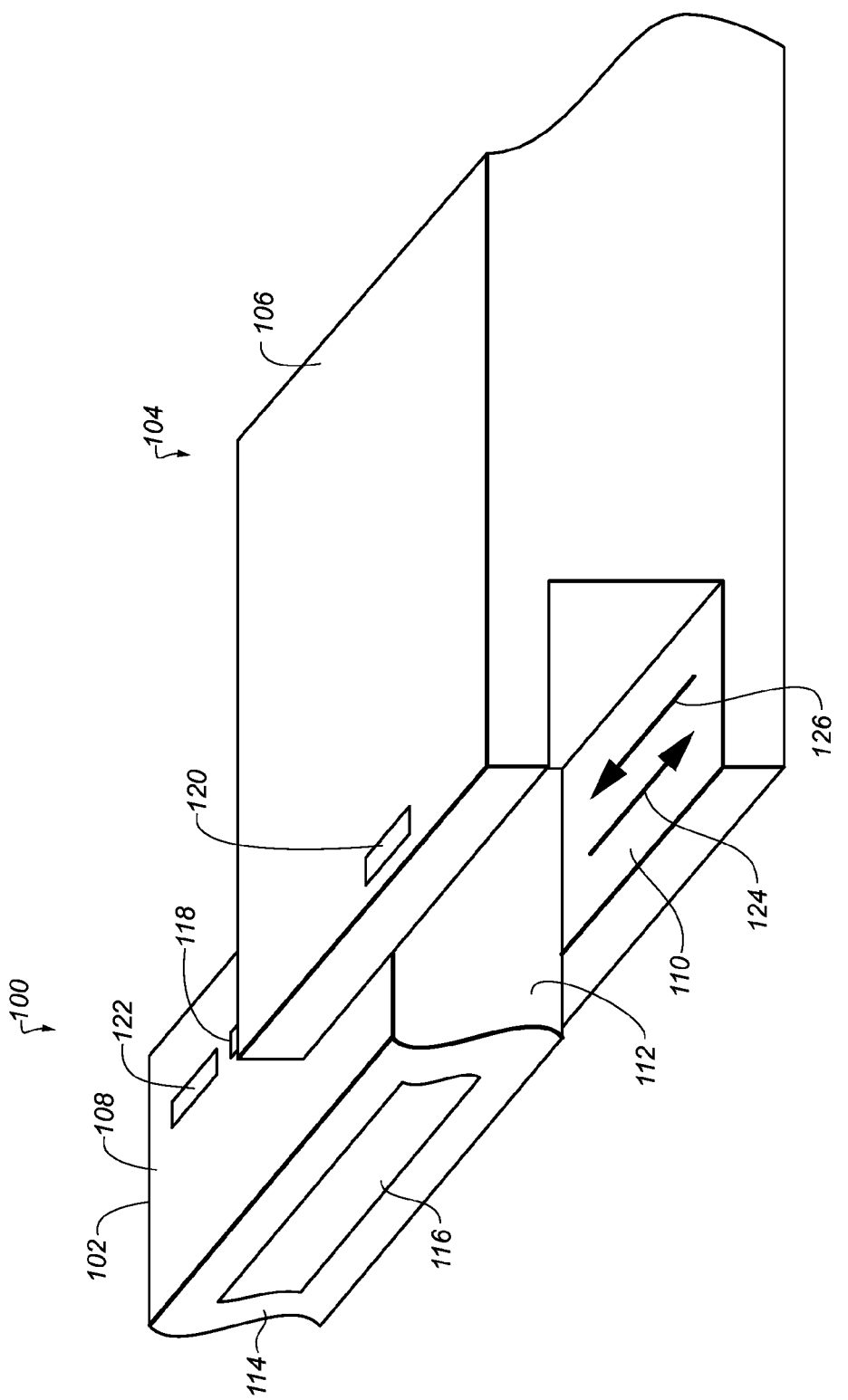
FIG. 1B illustrates a removable module of the attachment system being inserted into a channel of the attachment system according to one or more embodiments of the present disclosure.

FIG. 1A-FIG. 1C illustrate an example attachment system 100 according to one or more embodiments of the present disclosure. The attachment system 100 may include a removable module 102 that interfaces with some portion of a consumer product 104. The removable module 102 may, for example, engage with a housing 106 of the consumer product 104. The housing 106 may include, for example: a portion of the housing of the consumer product, an extension of another part of the consumer product 104, a separate part fixed to a portion of the housing 106 of the consumer product 104, and the like. In certain embodiments, the housing 106 may be used as a housing for various consumer products, electronic devices, mechanical devices and the like. Accordingly, the housing 106 may be referred to a housing 106 throughout this disclosure.

As discussed above, non-limiting examples of consumer products include electronic devices, mechanical devices and so on. Mores specific examples include, but are not limited to, a tablet computer, a timekeeping device, a mobile telephone, a portable music player, a personal digital assistant, glasses and the like. As such, the component or housing 106 may have various dimensions and shapes based on the anticipated or actual use of the housing 106. Further, the housing 106 may include various openings and/or recesses (not shown) that may be used for buttons, display screens and the like. Depending on the intended use, the actual use and desired durability of the housing 106, the housing 106 may be made of stainless steel, aluminum, plastic, gold, glass, platinum, or other such materials and combinations thereof.

The removable module 102 can be widely varied. The removable module 102 may, for example, extend the functionality of the consumer product 104 (e.g., adding operational modules, electrical systems and the like). The removable module 102 may be used as an accoutrement to the consumer product 104 thereby enhancing aesthetics of the consumer product 104. The removable module may also be configured to couple an object or other article to the consumer product 104. For example, the object may be a cover, skin, plate, lanyard, band, strap, and/or the like. The interface may be standard interface such that different objects can be attached to the consumer product 104 via the attachment system 100.

The removable module 102 may include a body 108 that is configured for insertion into a mating feature or channel 110 of the housing 106 of the consumer product 104. For example, FIG. 1A shows the removable module 102 outside of the channel 110 and FIG. 1C shows the removable module 102 inserted within the channel 110. When the removable module 102 is inserted into the channel 110, the removable module 102 is engaged with or otherwise secured to the consumer product 104 such that the consumer product 104 carries the removable module 102 (e.g., the two parts become an integrated unit).

The shape of the body 108 of the removable module 102 may correspond to a shape of the channel 110. For example, if the channel 110 is rounded or has another shape, the removable module 102 may have a similar shape. As such, the removable module 102 may mate with, fit within or otherwise be received and contained within the channel 110.

Furthermore, the length of the body 108, or the overall length of the removable module 102, may generally correspond to the length of the channel 110. In some cases, the ends of the removable module 102 may be flush or substantially flush with the outer surfaces or sidewalls of the housing 106 when fully engaged such as shown in FIG. 1C. In other implementations, the length of the removable module 102 may be less than or greater in length than the channel 110. Accordingly, the removable module 102 may jut from one or more sides of the channel 110.

The body 108 of the removable module 102 may be configured to engage the housing 106 by sliding within the channel 110 such as shown in FIG. 1B. Although not shown, a keying feature may be provided to ensure proper alignment between the removable module 102 and the housing 106. Furthermore, a retention feature such an undercut or flange may be provided to prevent disengagement in a direction that is perpendicular to the length of the channel 110.

In some implementations, the channel 110 of the consumer product 104 may be dimensioned and shaped to provide sliding movement but not movement that is perpendicular to the sliding direction. The channel 110 may include a single open end for receiving the body 108. Alternatively, the channel 110 may include opposing open ends for receiving the body (as shown in FIG. 1A-FIG. 1C).

The removable module 102 may be manufactured from stainless steel, aluminum, plastic, gold, platinum or other such materials and combinations thereof. Although specific materials are mentioned, the removable module 102, and/or the components of the attachment system 100, may be manufactured from various other materials. Likewise, the housing 106 of the consumer product 104 may be made from similar or different materials or combinations of materials.

The body 108 of the removable module 102 includes a proximal end 112 and a distal end 114. The proximal end 112 and the distal end 114 of the removable module 102 may each have an arm that extends beyond a width of the body 108 (not shown).

The removable module 102 may have an opening or a recess 116 that receives an accessory, an object, an article and the like. For example, the recess 116 may be configured to receive a pin (not shown) or other connection mechanism that enables a strap or a band, such as, for example, a band or other accessory 158 (FIG. 4A) or another device or component to be removably attached to the removable module 102.

The removable module 102 may be a single unitary piece having a shape that conforms to the shape of the housing 106. That is, when the removable module is inserted into the housing 106, the shape of the removable module 102 acts as a blank to fill in the channel 110 of the housing 106. In such implementations, arms, slots or other apertures may not be present in the removable module 102.

When arms or other such attachment mechanisms are included on the removable module 102, an inner side of each arm may include a recess. The recess may be used to coupled or secure various accessories to the removable module 102. In other implementations, the arms of the removable module 102 may include one or more protrusions. An accessory may have one or more detents that mate with the protrusions. In another embodiment, the arms, the recesses and/or the protrusions may be magnetized to enable a magnetic connection between the removable module 102 and the accessory. Although not specifically mentioned, other connection mechanisms may be used between the removable module 102 and the accessory. Examples include snaps, hooks and so on.

The body 108 of the removable module 102 may also include an opening or aperture (not shown) that extends from a top surface of the body 108 to a bottom side of the body 108. The opening receives and secures a locking mechanism within the removable module 102. As will be explained in greater detail below, the locking mechanism may include a spring-loaded locking mechanism that includes a catch member 118 and a ramp member (not shown). The springs of the locking mechanism position the catch member 118 flush or substantially flush with respect to the top surface of the body 108. The springs may also be configured to cause the catch member 118 to be received into an opening or recess within the channel 110 when the removable module 102 is fully inserted into the channel 110.

The locking mechanism may be centrally located on the body 108 of the removable module 102 although this is not required. In other embodiments, the locking mechanism may be located at other areas on the body 108. Further, although a single locking mechanism is shown on the body 108, the removable module 102 may have multiple locking mechanisms at various locations on the body 108. Alternatively or additionally, the locking mechanism may be positioned in or on the housing 106.

In other embodiments, the opening may partially extend through the body 108 of the removable module 102. An example locking mechanism according to this embodiment is described in more detail below with reference to FIG. 16A and FIG. 16B.

The catch member 118 of the locking mechanism may have a top surface that is recessed, flush or substantially flush with respect to a top surface of the body 108 when the locking mechanism is in its nominal state. In some cases, a ramp member (not shown), or the bottom portion of the locking mechanism, may be spring-biased proud with respect to a bottom surface of the body 108. As such, a bottom surface of the ramp member extends or protrudes beyond the bottom surface of the body 108. As the ramp member is forced into the opening of the removable module 102 (e.g., as the removable module 102 is being inserted into the channel 110), an internal spring of the locking mechanism may exert an outward force on the catch member 118, which may cause the catch member 118 to extend or protrude beyond the top surface of the body 108 and into a corresponding recess or aperture formed in a side wall of the channel 110.

Because the locking mechanism is spring-biased in a particular manner, when the ramp member contracts or is pushed into the opening, the spring mechanisms within the locking mechanism cause the catch member 118 to move from a first position (e.g., the recessed, flush or substantially flush position) to a second position (if available space within the channel permits the expansion).

The second position is a position in which at least a portion of the catch member 118 extends beyond the top surface of the body 108. However, when the removable module 102, and more particularly the catch member 118, is sliding or contained within the channel 110, the catch member 118 will not move from the first position to the second position until the catch member 118 is in proximity to a recess formed within the channel 110 as the recess permits the expansion.

Once the catch member 118 is in proximity to the recess within the channel 110, the locking mechanism expands such that at least a portion of the catch member 118 extends from the body 108 and is received into the recess. Once the catch member 118 is received into the recess, the removable module 102 is locked in place within the channel 110.

The recess of the channel 110 is shaped and positioned in such a manner as to enable the catch member 118 to be received directly into the recess when the removable module 102 reaches a determined point within the channel. The determined point within the channel 110 may be when the body 108 of the removable module 102 is centered in the channel 110. In some cases, the determined point may be a location at which the proximal end 112 and the distal end 114 of the removable module 102 are flush or substantially flush with one or more sidewalls of the housing 106 and/or one or more openings of the channel 110.

To unlock and subsequently remove the removable module 102 from the housing 106, the housing 106 includes a release mechanism 120. Actuation of the release mechanism causes the catch member 118 to be displaced from the recess within the channel. Once the catch member 118 has been removed from the recess, the removable module 102 may slide within, or be removed entirely from, the channel 110.

When the removable module 102 is removed from the channel 110, the spring mechanisms within the locking mechanism cause the ramp member to expand or protrude outwardly from the body 108 of the removable module 102. As a result, the ramp member is again spring-biased proud with respect to the bottom surface of the body 108. The spring mechanisms that cause the ramp member to be biased proud with respect to the body 108 also cause the catch member 118 to be biased flush or substantially flush to the top surface of the body 108.

The body 108 of the removable module 102 may also include one or more protrusions 122. The protrusions 122 may be positioned on one or both of the top surface of the body 108 and the bottom surface of the body 108. Further, the protrusions 122 may be positioned on one side of the locking mechanism or on both sides of the locking mechanism. In other embodiments, the protrusions 122 may be absent from the body 108.

The protrusions 122 may be used to increase friction between the removable module 102 and the channel 110. For example, the protrusions 122 may add a damping feel when the removable module 102 is inserted into the channel 110 and reduce or eliminate any rattling that may occur. In another embodiment, the channel 110 may include protrusions that are configured to mate with corresponding recesses on the removable module. The protrusions 122 may be made of nylon, silicon or other such material.

Although the removable module 102 and its associated components are shown having a particular shape, the removable module 102 and its associated components may have any shape. For example, the body 108 of the removable module 102 may be rounded, squared, triangular and the like. Non-limiting examples of various shapes are shown in FIG. 2A-FIG. 2F.

If present on the body 108, the arms of the removable module 102 may also have any desired shape, orientation or dimensions. Further, the catch member 118, the ramp, and/or the protrusions 122 may also have various dimensions and shapes.

The housing 106 of the consumer product 104 may include a channel 110 disposed along at least one side or sidewall. Although a single channel 110 is shown in FIG. 1A, the housing 106 may have any number of channels 110 disposed on various sides. The channel 110 may include an opening at a distal end and an opening at a proximal end.

Although FIG. 1A depicts the channel 110 having openings at both a distal end and a proximal end, the channel 110 may have an opening at one end (e.g., the distal end) and be closed or solid at another end (e.g., the proximal end 112). In such embodiments, the removable module 102 may travel within the channel 110 until one end of the removable module 102 (e.g., the proximal end 112) comes into contact with the closed end of the channel 110.

Once the end of the channel 110 has been reached, a spring-biased locking mechanism may be used to secure the proximal end 112 of the removable module 102 to the closed end of the channel 110. Alternatively or additionally, a spring-biased locking mechanism may be used to secure the proximal end 112 of the removable module within a recess of the channel 110 such as described above.

Alternatively, one or more magnets or other securement mechanisms may be positioned at or near the closed end of the channel 110. As such, when a proximal end 112 or a distal end 114 of the removable module 102 is in proximity to or comes into contact with the magnet, the removable module 102 may be magnetically secured within the channel 110.

Although the channel 110 and the button portion of the release mechanism 120 are shown having a particular shape and orientation, each of the above elements may have any shape and orientation. For example, the channel 110 may be rounded or polygonal. Further, the channel 110 may be orientated at any desired position and angle. For example, the channel 110 may be positioned below a centerline of the housing. The channel 110 may be positioned below a display or other components of the consumer product 104. The button portion of the release mechanism 120 may have any desired shape and size and may be positioned at any desired location on the housing 106.

FIG. 1B illustrates the removable module 102 shown in FIG. 1A being partially inserted into the channel 110 of the housing 106 according to one or more embodiments of the present disclosure. As shown in FIG. 1B, the proximal end 112 of the removable module 102 may be inserted into an opening of the channel 110 of the housing 106 in the direction indicated by arrow 124.

Although FIG. 1B shows the proximal end 112 of the removable module 102 being inserted into the opening of the channel 110 and sliding in the direction of arrow 124, the distal end 114 of the removable module 102 may be inserted into the channel 110 and may slide within the channel 110 in the direction indicated by arrow 126. Regardless of the direction in which the removable module 102 is inserted into the channel 110, the removable module 102 slides or moves within the channel 110 in either direction until the locking mechanism, and more specifically the catch member 118 of the locking mechanism, is received into the recess of the channel 110.

As the removable module 102 is inserted into the channel 110, a portion of channel 110 contacts the ramp member of the locking mechanism. Continued movement in the direction indicated by arrow 124 causes the ramp member to be compressed or otherwise forced into the body 108 of the removable module 102. Further movement in the indicated direction causes the locking mechanism to enter a fully compressed state (e.g., a state in which the ramp member and the catch member 118 are both contained within the body 108 of the removable module 102 and both the ramp member and catch member 118 are prohibited from expanding).

FIG. 1C illustrates the attachment system 100 having the removable module 102 fully engaged with the housing 106 of the consumer product 104 according to one or more embodiments of the present disclosure. As previously discussed, the removable module 102 is fully engaged with the housing 106 when the removable module 102 is centered within the channel 110. However, in other embodiments, the removable module 102 may be fully engaged with the housing 106 when the removable module is offset or otherwise not centered within the channel 110.

When the removable module 102 has been fully inserted into the channel 110, a portion of the removable module 102 may extend in a direction that is perpendicular to the length of the channel 110. In other embodiments, there may be no extension of the removable module 102. In still yet other embodiments, the removable module 102 may be flush or substantially flush with respect to the channel 110 or may be recessed within the channel 110. Likewise, each of the proximal end 112 and the distal end 114 of the removable module 102 may extend from, be flush or substantially flush, or be recessed from one or more edges or sidewalls of the housing 106 and/or one or more edges or sides of the channel 110.

For example, a sidewall of the proximal end 112 of the removable module 102 and a sidewall of the distal end 114 of the removable module 102 may have a shape that is complimentary to the shape of the sidewall of the housing 106. Thus, when the removable module 102 is locked in place within the channel 110 of the housing 106, the sidewalls of the removable module 102 and the sidewalls of the housing 106 are flush and/or smooth with respect to one another. That is, the shape of the sidewall of the removable module 102 may match the shape, or otherwise is coordinated with, the sidewall of the housing 106.

In alternative embodiments, the proximal end 112 and the distal end 114 of the removable module 102 may protrude or extend from the housing 106 when the removable module 102 has been locked within or is otherwise engaged with the channel 110. Alternatively, the length of the channel 110 and/or the housing 106 may be longer than the length of the removable module 102. In such instances the proximal end 112 and the distal end 114 of the removable module 102 may be recessed within the channel 110 or the housing 106. Further, one or more of the proximal end 112 and the distal end 114 may have a surface that extends around a diameter of the end. The surface may engage with the housing 106 and/or the channel 110 to prevent or prohibit further movement of the removable module 102 within the channel.

The locking mechanism engages with the housing 106 when the removable module 102 is fully engaged. For example, when the catch member 118 (FIG. 1A) of the locking mechanism is in proximity to or beneath a recess in the channel 110, one or more spring mechanisms within the locking mechanism cause the catch member 118 of the locking mechanism to expand into the recess.

More specifically, one or more springs in the locking mechanism may cause the catch member 118 to move from a first position, in which the catch member 118 is flush or substantially flush with respect to a top surface of the body 108 of the removable module 102, to a second position, in which at least a portion of the catch member 118 extends from the top surface of the body 108 and is received into the recess. Once received into the recess, the catch member prevents movement of the removable module 102 within the housing 106.

When the removable module 102 is fully engaged with the housing 106, the removable module 102 is retained until released. In some instances, the locking mechanism of the removable module 102 may be released from the recess when a button portion of the release mechanism 120 is actuated. For example, a release mechanism 120, or portions of a release mechanism 120, may be located in the recess of the housing 106 above the catch member 118. When the button portion of the release mechanism 120 is actuated, a plunger of the release mechanism 120 pushes or expels the catch member 118 of the locking mechanism out of the recess. Once the catch member 118 is no longer engaged with the recess, the removable module 102 may be once again slide within the channel 110.

In some embodiments, the housing 106 may not include a release mechanism 120. For example, the locking mechanism or the recess may be shaped such that when a force is applied to one end of the removable module 102, the removable module 102 moves in the direction of the applied force. As the removable module 102 moves, one or more side walls of the recess causes the locking mechanism to contract and disengage from the recess. The contraction of the locking mechanism continues as the removable module 102 moves in the direction of the applied force. As a result, the locking mechanism enters a compressed state (e.g., the locking mechanism is contained within the body 108 of the removable module 102). When the locking mechanism is in the compressed state, the removable module 102 may slide within the channel 110 such as previously described.

The removable module 102 may have a band, strap or other such accessory, article or object removably coupled thereto. Although a band and a strap are specifically mentioned, the removable module 102 may be coupled to various accessories or devices. For example, the removable module 102 may be used to secure a clip, a lanyard, a dock, a case, or a protective cover to the consumer product 104. In embodiments where the removable module 102 is used to couple a band, strap or other such accessory, article or object to the consumer product 104, the band or strap may be attached to the removable module 102 using a pin (not shown), a clasp (not shown), a snapping mechanism (not shown) or other type of attachment mechanism. The band or strap may be used to secure the consumer product 104 to a user of the consumer product 104 or to an article of clothing, a stand, a display system, or any suitable item.

Although a square sidewall and channel are shown in FIG. 1A-FIG. 1C, the sidewalls of the body 108 of the removable module 102 and the sidewalls of the component or housing 106, in particular the proximal and distal ends of the channel 110, may have any desired shape so long as the shapes are complimentary to one another. For example, the body 108 of the removable module 102 may be rounded, squared, triangular and the like such as shown in FIG. 2A-FIG. 2F.

Figure 2A:
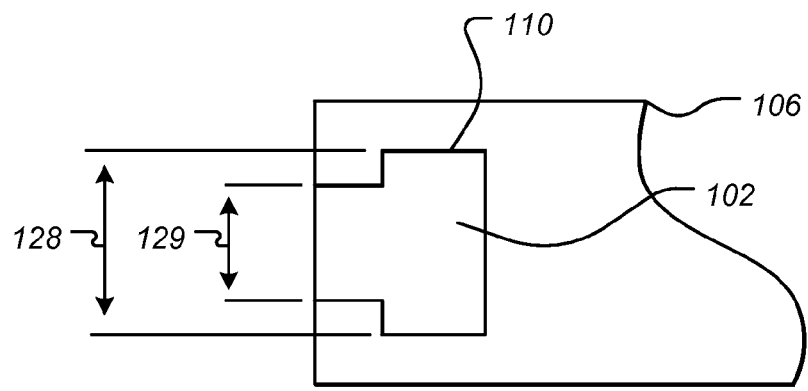
FIG. 2A illustrates a side view of a first locking configuration of an attachment system according to one or more embodiments of the present disclosure.
Figure 2B:
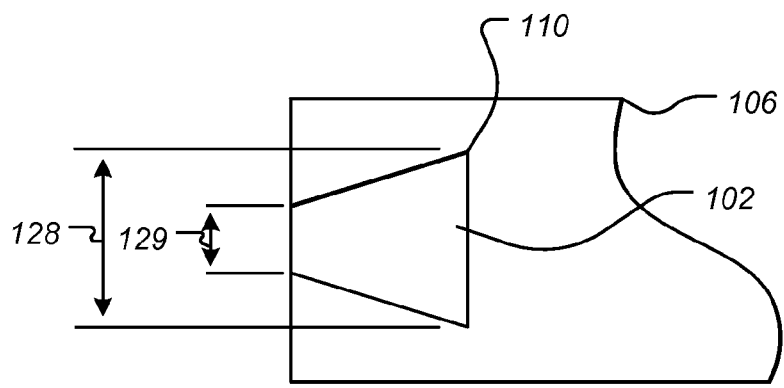
FIG. 2B illustrates a side view of a second locking configuration of an attachment system according to one or more embodiments of the present disclosure.
Figure 2C:
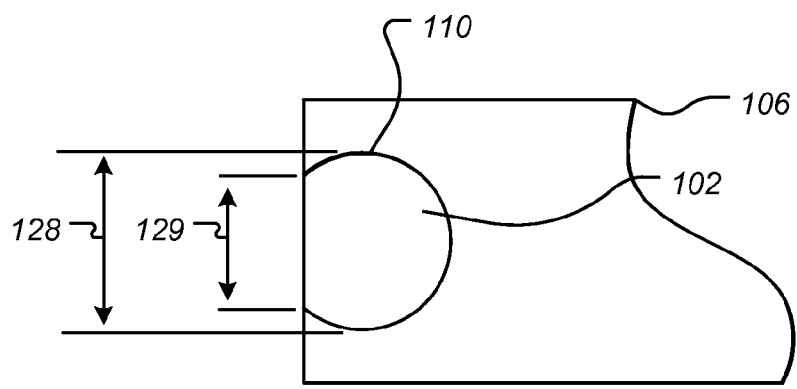
FIG. 2C illustrates a side view of a third locking configuration of an attachment system according to one or more embodiments of the present disclosure.
Figure 2D:
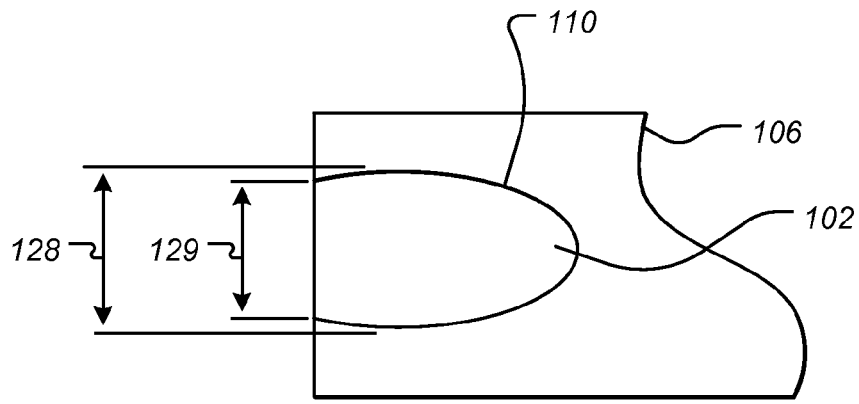
FIG. 2D illustrates a side view of a fourth locking configuration of an attachment system according to one or more embodiments of the present disclosure.
Figure 2E:
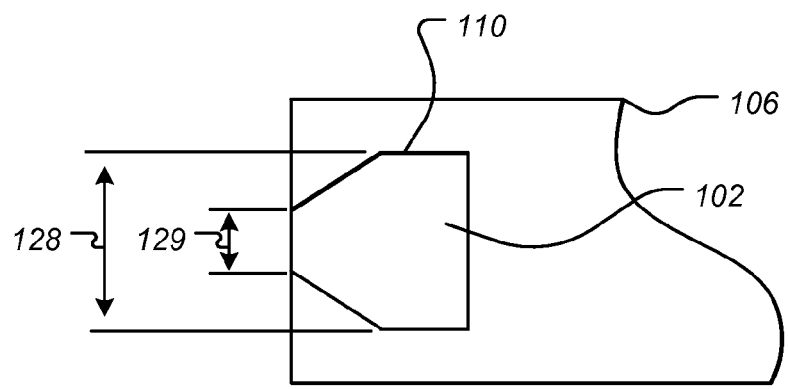
FIG. 2E illustrates a side view of a fifth locking configuration of an attachment system according to one or more embodiments of the present disclosure.
Figure 2F:
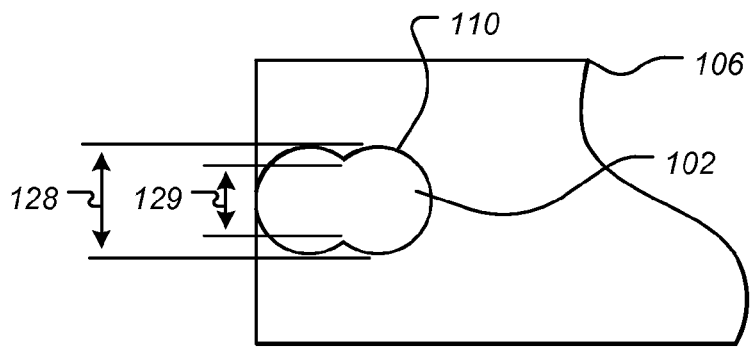
FIG. 2F illustrates a side view of a sixth locking configuration of an attachment system according to one or more embodiments of the present disclosure.

More specifically and as shown in FIG. 2A-FIG. 2F, the sidewalls of the proximal end and the distal end of the removable module 102, as well as the sidewalls of the housing 106 and/or the channel 110 may have one or more flanges (FIG. 2A). In other implementations channel and the removable module may be trapezoidal (FIG. 2B), curvilinear (FIG. 2C), oval (FIG. 2D), polygonal (FIG. 2E), or have another such shape such as shown in FIG. 2F. Likewise, the attachment system may be arranged in any desired orientation within the housing 106.

The channel 110 may have an undercut that retains the removable module 102 within the channel 110. The channel 110 of the housing 106 has an opening width 129 at the opening of the channel 110 and a maximum width 128 within the channel. The maximum width 128 may be greater than the opening width 129 to form the undercut. Similarly, the removable module 102 may have a first portion with a first thickness that is smaller than the opening width 129 of the channel 110 and a second thickness that is less than the maximum width 128 of the channel 110 and also greater than the opening width 129. Thus, due to the undercut formed by the channel 110, the opening width 129 of the channel may be configured to limit the movement of the removable module 102 in a direction that is perpendicular to the opening.

FIG. 3A-FIG. 3E are simplified examples of an attachment system having a removable module 130 being engaged with a mating feature of a mating component 138. The mating component 138 may be the housing or body of a device or other type of consumer product. The attachment system of FIG. 3A-FIG. 3E may be similar to the attachment system 100 discussed above with respect to FIG. 1A-FIG. 1C as well as the other attachment systems, removable modules and the like disclosed herein.

Figure 3A:
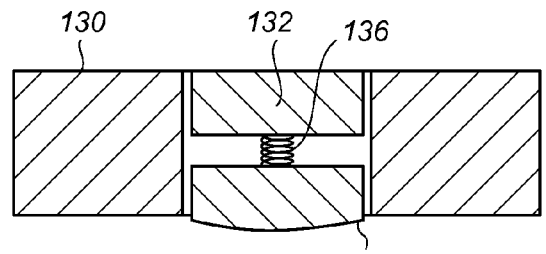
FIG. 3A illustrates a block diagram of a removable module of an attachment system according to one or more embodiments of the present disclosure.

FIG. 3A illustrates a block diagram of an example removable module 130 according to one or more embodiments of the present disclosure. As shown in FIG. 3A, the removable module 130 may include a locking mechanism having a catch member 132 and a ramp member 134. In some embodiments, the catch member 132 is coupled to the ramp member 134 by a spring element 136. In certain embodiments, the catch member 132 may be spring-biased flush or substantially flush with respect to a top surface of the removable module 130 when the locking mechanism is in an expanded state (as shown in FIG. 3A). In addition, the ramp member 134 of the locking mechanism may be spring-biased proud with respect to a bottom side of the removable module 130.

Figure 3B:
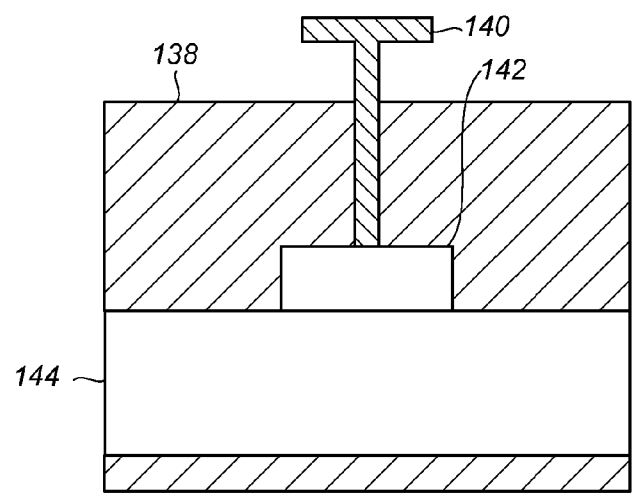
FIG. 3B illustrates a block diagram of a housing of a consumer product that may be part of or integrated with the attachment system according to one or more embodiments of the present disclosure.

FIG. 3B illustrates a block diagram of a housing or component 138 of a consumer product according to one or more embodiments of the present disclosure. The component 138 may be a housing for an electronic device such as described herein. The component 138 may include a mating feature such as a channel 144 having two ends and an opening extending between the ends. The channel 144 may have a single opening at one end of the channel 144. The channel 144 may be configured to receive the removable module 130 of FIG. 3A.

As shown in FIG. 3B, the component 138 may also include a release mechanism 140 disposed relative to the channel 144. The release mechanism 140 may be positioned within or relative to a recess 142 formed in a side wall of the channel 144. Actuation of the release mechanism 140 causes the catch member 132 (FIG. 3A) to be expelled from the recess 142 and disengage the removable module 130 from the component 138.

Figure 3C:
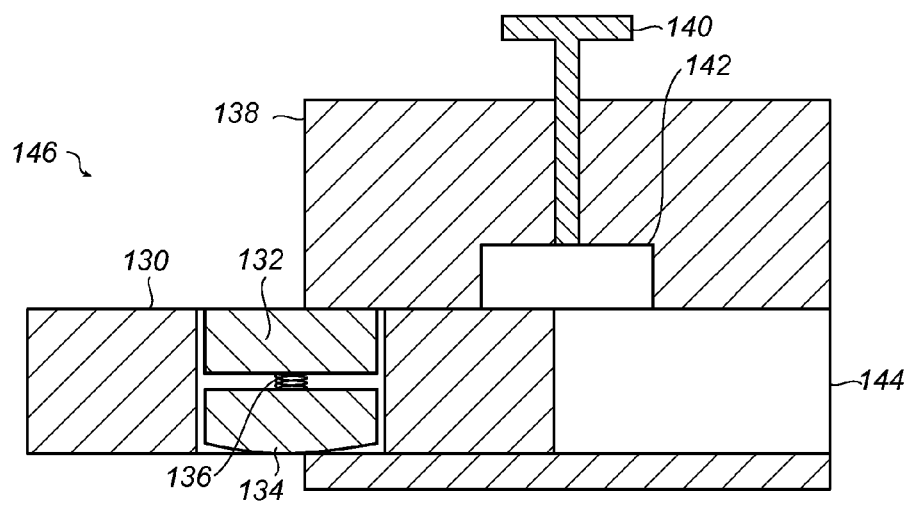
FIG. 3C illustrates a block diagram of a removable module being inserted into a housing of a consumer product according to one or more embodiments of the present disclosure.

FIG. 3C illustrates a block diagram of an attachment system 146 having a removable module 130 being inserted into a housing or component 138 of a consumer product according to one or more embodiments of the present disclosure. A first end of the removable module 130 may be inserted into an opening of a channel 144 of the component 138. As the removable module 130 is inserted farther into the channel 144 of the component 138, the ramp member 134 comes into contact with a lower portion of the channel 144 causing the ramp member 134 of the removable module 130 compresses.

As shown in FIG. 3C, an upward or inward movement of the ramp member 134 may cause compression of the spring element 136, which produces an upward or outward force on the catch member 132. If movement of the catch member 132 were to be unimpeded, the upward or outward force caused by the spring element 136 would cause the catch member 132 to extend or protrude from the upper surface of the removable module 130. However, as shown in FIG. 3C, because the catch member 132 is at least partially inserted into the channel 144, the catch member 132 is prevented from protruding and remains substantially flush with the upper surface of the removable module 130.

Thus, with reference to FIG. 3C, as the removable module 130 continues to slide or move within the channel 144 of the component 138, the locking mechanism remains in the compressed state (i.e., both the catch member 132 and the ramp member 134 being contained within the body of the removable module 130). The locking mechanism remains in this state until the catch member 132 is in proximity to the recess 142 or other opening within the channel 144.

Figure 3D:
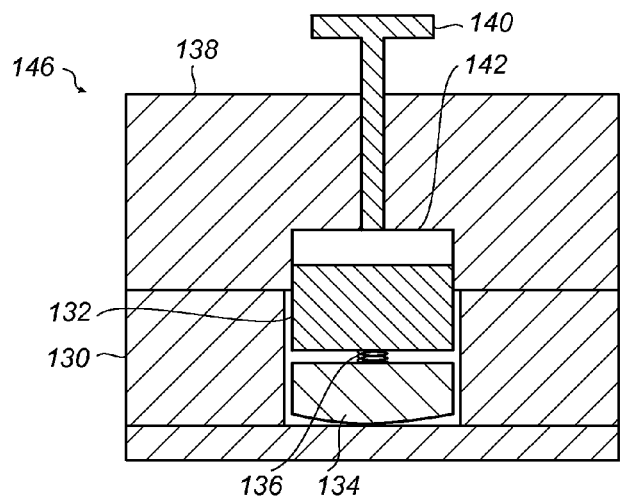
FIG. 3D illustrates the removable module being locked in place within the housing of the consumer product according to one or more embodiments of the present disclosure.

FIG. 3D illustrates the removable module 130 fully engaged or inserted into the mating feature of the component 138, in this case, the channel 144. As shown in FIG. 3D, the removable module 130 is positioned such that the catch member 132 is aligned with or is proximate to the recess 142. As also shown in FIG. 3D, the removable module 130 is centered with respect to the channel 144 and the sides of the removable module 130 are flush or substantially flush with respect to one or more sidewalls of the component 138.

As also shown in FIG. 3D, the catch member 132 is permitted to expand, be received, or otherwise engage with the recess 142, which locks the removable module 130 in place within the component 138. In particular, the catch member 132 of the locking mechanism may move from a first position, in which the catch member 132 is flush or substantially flush with respect to a top surface of the removable module 130, to a second position in which the catch member 132 of the locking mechanism protrudes from the top surface of the removable module 130 and is received into the recess 142. The upward or outward movement of the catch member 132 is facilitated by spring element 136, which maintains the catch member 132 in the second position as shown in FIG. 3D. In the present example, the engagement between the catch member 132 and the recess 142 prevents movement of the removable module 130 with respect to the channel 144.

In an alternative embodiment, the locking mechanism may include a catch member 132 but not a ramp member 134. In such embodiments, the catch member 132 of the locking mechanism may be biased by a spring or similar element causing the catch member 132 to protrude from a top surface of the body of the removable module 130. When the catch member 132 of the locking mechanism comes into contact with the channel 144 of the component 138, the contact causes the catch member 132 to be withdrawn or depressed into the removable module 130, causing one or more springs or compressible elements of the locking mechanism to compress. However, when the catch member 132 is in proximity to the recess 142 of the channel 144, such as described above with respect to FIG. 3D, the catch member 132 is permitted to expand or otherwise move into the recess 142 thereby locking the removable module 130 within the channel 144.

A release mechanism 140 may be used to disengage or release the removable module 130 from the channel 144. In some cases, in order to unlock the removable module 130, the release mechanism 140 may be disposed on the component 138 (e.g., housing) of the consumer product and is configured to expel the catch member 132 from the recess 142. When the release mechanism 140 is actuated, a plunger of the release mechanism 140 causes the catch member 132 of the locking mechanism to move from the second position back to, or substantially back to, the first position. Once the catch member 132 of the locking mechanism has been removed from the recess 142, the removable module 130 may be moved within, or removed entirely from, the channel 144 of the component 138.

Figure 3E:
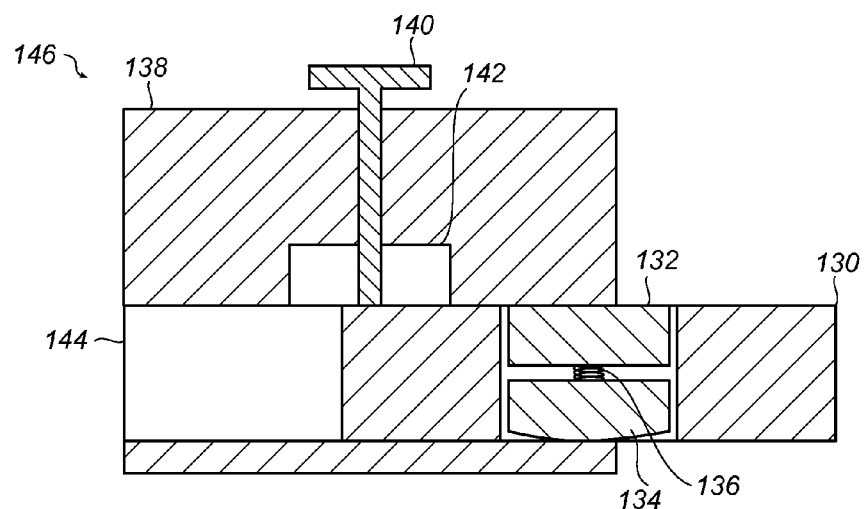
FIG. 3E illustrates the removable module being removed from the housing of the consumer product according to one or more embodiments of the present disclosure.

FIG. 3E illustrates the removable module 130 being removed from a housing or component 138 of a consumer product according to one or more embodiments of the present disclosure. As described above, once the catch member 132 has been expelled or is otherwise removed from the recess 142, the removable module 130 may slide or move within the channel 144 of the component 138. For example, as shown in FIG. 3E, the removable module 130 may be moved in a direction away from the one opening within the channel 144 and out of a second opening within the channel 144. In this case, the removable module 130 may be slid out of the channel 144 completely disengaging the removable module 130 from the component 138.

Although actuation of a release mechanism 140 is specifically mentioned, the catch member 132 may be compressed using other methods. However, this alternate design, nor any other alternate design disclosed herein, does not affect the utility of the embodiments disclosed herein.

For example, a force may be applied to one side of the removable module 130 when the catch member 132 is within the recess of the channel 144. As the force is applied to the removable module 130, the catch member 132 of the locking mechanism may contact the side of the recess 142. As the removable module 130 continues to move in the direction of the applied force, the side of the recess 142 may cause the catch member 132 of the locking mechanism to further contract until the catch member 132 has moved from the second position back to, or substantially back to, the first position. Once the catch member 132 of the locking mechanism has been removed from the recess 142, the removable module 130 may move or slide within the channel 144 and may be disengaged or separated from the component 138.

FIG. 4A illustrates an example consumer product 150 that may be used with an attachment system of the present disclosure. The consumer product 150 may, for example, correspond to the consumer product shown in the previous figures.

The consumer product 150, and more specifically the attachment system of the consumer product 150 may include a base unit (shown in FIG. 4A as a housing 154) and one or more attachment units (shown in FIG. 4A as removable module 152) capable of being removably coupled to the housing 154. The housing 154 may, for example, include a coupling node (shown in FIG. 4A as channel 156) that mechanically engages a corresponding coupling node on the removable module 152. The channel 156 may be widely varied. The channel 156 on the housing 154 includes an opening while the coupling node on the removable module 152 includes a lug that fits within the opening. The opening may be configured in a variety of different shapes and orientations. Further, the opening is configured to removably receive the lug.

More specifically and as shown in FIG. 4A, the removable module 152 of the attachment system is configured to slide relative to the housing 154 of the consumer product 150. Once inserted, the removable module 152 may continue to slide or move within the housing 154 of the consumer product 150. The removable module 152 may also lock in place within the housing 154 of the consumer product 150 when the removable module 152 reaches a certain point within the housing 154. Although the removable module 152 may be locked in place within the housing 154, actuation of a release mechanism (e.g., release mechanism 174 of FIG. 4D) or an actuator on the housing 154 releases the removable module 152 which enables the removable module 152 to be removed from the housing 154. The release mechanism 174 (FIG. 4D) may be disposed on an underside (172 of FIG. 4D) of the housing 154. In other embodiments, the release mechanism 174 (FIG. 4D) may be disposed or positioned on a top side of the housing 154. Further, the release mechanism 174 may be placed at various locations on the underside and/or the top side of the housing 154.

Although a single removable module 152 is discussed, a plurality of removable modules 152 may be coupled to the consumer product 150. For example, as shown in FIG. 4A, a removable module 152 may be coupled to a first side of the consumer product 150 and a second removable module 152 may be coupled to a second side of the consumer product 150.

When multiple removable modules 152 are used, the consumer product 150 may have corresponding channels 156 or other such coupling nodes on both sides of the housing 154. Thus, a channel 156 on the first side of the housing 154 may receive one removable module 152 and the channel 156 on the second side of the housing 154 receives another removable module 152.

Each removable module 152 may have a specific shape, size or orientation based on the channel 156 the removable module 152 is to be inserted into. For example, a first removable module 152 may have a circular shape and/or a first size that corresponds to a shape and/or size of the channel 156 on the first side of the housing 154. Likewise, a second removable module 152 may have a second size and/or shape that corresponds to a shape and/or size of the channel 156 on the second side of the housing 154. In other embodiments, each removable module 152 may have the same shape and/or size and can therefore be interchangeable with respect to one another.

In addition to the above, the first removable module 152 may be coupled to the consumer product 150 while the second removable module 152 is detached or removed from the consumer product 150. Likewise, the second removable module 152 may be coupled to the consumer product 150 while the first removable module 152 is removed from the consumer product 150. The first removable module 152 may be configured to receive a first accessory, object or article or type of accessory, object or article. Likewise the second removable module 152 may be configured to receive an accessory, object or article that is similar to, or different from, the accessory, article or object that is coupled to the first removable module 152.

As briefly discussed above, one or more accessories 158, objects or articles may be coupled to each removable module 152. More specifically, each accessory 158 may be removably coupled to the consumer product 150 using one or more of the removable modules 152.

In another example, each accessory 158 that is coupled to the respective removable modules 152 may be different structures or part of the same structure. As such, one end of the accessory 158 may be removably coupled to the removable module 152 while a second end of the accessory 158 may be coupled to another accessory 158 or to a user. The accessory 158 may be integrated with the removable module 152. As such, the accessory 158 may not be removed from the removable module 152.

The consumer product 150 may be widely varied. For example, the consumer product 150 may be a wearable consumer product 150. Additionally or alternatively, the consumer product 150 may be an electronic device. The consumer product 150 may be a portable computing device. Examples include cell phones, smart phones, tablet computers, laptop computers, timekeeping devices, computerized glasses and other wearable devices navigation devices, sports devices, accessory devices, health-monitoring devices, medical devices, wristbands, bracelets, jewelry, and/or the like.

In one example, the consumer product 150 may be a wearable multifunctional electronic device. The electronic device may have various functionalities and/or capabilities described above (e.g., computing, communication, timekeeping or time display, health monitoring, health tracking and/or health output functionalities/capabilities, etc.). In one example, the consumer product 150 is a wrist worn multifunctional device and may include various components and/or modules such as, for example, the components and modules shown and described below with respect to FIG. 21. In another example, the consumer product 150 may act as an extension of another electronic device (or vice versa). For example, if the consumer product 150 is configured as a wrist worn device, it may serve as a watch like device that can interact with a phone that is carried by (e.g., in a pocket) or otherwise associated with the user.

The consumer product 150 may include a housing 154. The housing 154 serves to surround a peripheral region of the consumer product 150 as well as support the internal components of the consumer product 150 in their assembled position. That is, the housing 154 may enclose and support various internal components (including for example integrated circuit chips, processors, memory devices and other circuitry) to provide computing and functional operations for the consumer product 150. The housing 154 may also help define the shape or form of the consumer product 150. That is, the contour of the housing 154 may embody the outward physical appearance of the consumer product 150. As such, it may include various ornamental and mechanical features that improve the aesthetical appearance and tactile feel of the device. The housing 154 may be formed as a single piece, which may enhance the structural rigidity, water impermeability, and manufacturability of the housing 154.

For example, as shown in FIG. 4A, the housing 154 may have a rectilinear shape. However, the housing 154 may be configured in a variety of shapes. The housing 154 may also have a substantially planar or flat top surface on which a display 160 may be positioned and a substantially planar or flat bottom surface. Although the top surface of the housing 154 and the bottom surface of the housing 154 may be substantially planar, the transition between the top surface of the housing 154 and one or more sidewalls of the housing may be curved. Put another way, the transition from the top surface to the one or more sidewalls of the housing (e.g., including a side in which the channel 156 is positioned) may be rounded such that a smooth transition is present between the top surface and the sides of the housing 154. Likewise, the transition from the bottom surface of the housing 154 to one or more sidewalls of the housing 154 may have a similar rounded shape and transition.

The housing 154, which may sometimes be referred to as a case or enclosure, may be formed of plastic, glass, ceramics, fiber composites, metal (e.g., stainless steel, aluminum, titanium, magnesium), other suitable materials, or a combination of these materials. Further, the surface of the housing 154 may be formed from any suitable material, including aluminum, steel, gold, silver and other metals, metal alloys, ceramics, wood, plastics, various types of glass and combinations thereof, and the like.

The consumer product 150 may include various components that may be disposed on the outside of the housing 154, within the housing 154, through the housing 154, inside the housing 154 and so on. For example, the housing 154 may include a cavity for retaining components internally as well as holes or windows for providing access to the various internal components. The housing 154 may also be configured to form a water-resistant or water-proof device. For example, the housing 154 may be formed from a single body and the openings in the body may be configured to cooperate with other components to form a water-resistant or water-proof barrier.

In some embodiments, the consumer product 150 may include one or more I/O systems. For example, the consumer product 150 may include a display 160 configured to output various information about the consumer product 150. The display 160 may also output data from applications and other programs that are being executed by the consumer product 150. For example, the consumer product 150 may provide information regarding time, health of a user, status notifications, notifications or messages received from externally connected devices or communicating devices and/or software executing on such devices. The consumer product 150 may also provide information about applications or otherwise display messages, video, operating commands, and so forth that are executing on the consumer product.

The display 160 may also be configured to receive input. The display 160 may be integrated with or incorporated with a touch panel or touch sensor that includes an array of capacitive touch electrodes. In embodiments where the display 160 is configured to receive input, the display 160 may have an input area. The input area may cover the entire display 160 or substantially all of the display 160. In another embodiment, the input area may cover only a portion of the display 160. Further, the display 160 may be a multi-touch display that is configured to receive and process various contact points received on the display.

The display 160 may include image pixels formed from light-emitting diodes (LEDs), organic LEDs (OLEDs), plasma cells, electronic ink elements, liquid crystal display (LCD) components, or other suitable image pixel structures. The shape, size and dimensions of the display 160 may also vary. For example, the display 160 may be planar or substantially planar. In other embodiments, the display 160 may be concave or convex. The display 160 may be shaped to cover or substantially cover a top portion of the housing 154. As such, the display 160 may have a shape that is similar to the shape of the housing 154. In other embodiments, the shape of the display 160 may differ from the shape and/or size of the housing 154.

The consumer product 150 may also include other input and output mechanisms. For example, the consumer product 150 may include or interface with one or more buttons 162, a crown 164, keys, dials, trackpads, microphones and the like. Each of these input mechanisms may be disposed on a top surface of the housing 154 and/or on one or more sidewalls of the housing 154. The consumer product 150 may also include one or more speakers, headphone jacks and the like.

The consumer product 150 may also be configured to provide haptic output, audio output, visual output or combinations thereof. With respect to the haptic output, the consumer product 150 may have one or more haptic actuators that are configured to provide the haptic output. The haptic output, and other forms of output provided above, may vary based on a variety of factors. Some of these include, but are not limited to, how the consumer product 150 is being used, which applications are being executed, the information that is output on the display 160 and the like.

For example, if the consumer product 150 is monitoring the health of the user, a first type of haptic output may be provided. Alternatively or additionally, if the consumer product 150 is executing a time keeping application, a second type of haptic output may be provided. In yet another example, if a warning or message is output on the display 160, the warning or message may include a haptic output, visual output and an auditory output.

The type, feel and duration of the haptic output, the audio output and/or the visual output may also vary. For example, the type, feel and duration of the haptic output of the consumer product 150 based on an orientation of the consumer product 150 and/or a location or position of the consumer product 150 (e.g., with respect to a user, environmental conditions, whether the consumer product is outside or inside and the like).

In addition to the above, the band or other accessory attached to the device (using, e.g., the attachment system), may be configured to provide and/or enhance haptic output. For example, the band or other accessory may have a haptic actuator disposed in an inner portion of the removable portion. In yet another embodiment, a haptic actuator disposed in the consumer product 150 may cause the band or accessory 158 to resonate or amplify the haptic output that is provided by the haptic actuator.

The consumer product 150 may include a connection system, either wired or wireless, that enables the consumer product to interface with other devices. These other devices may include laptop computers, mobile phones, tablet computers, exercise equipment, electronic glasses and the like.

The consumer product 150 may also include operation components (potentially housed with the housing 154). These components may include a processor, a memory, a communication system, an antenna and the like. For example, the consumer product 150 may include a processor coupled with or in communication with a memory. The consumer product 150 may also include one or more communication interfaces, The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces.

The consumer product 150 may also include various sensors. These sensors may include and are not limited to, biometric sensors, gyroscopes, accelerometers, light sensors, optical sensors, global positioning sensors, and so on. These sensors may assist with or otherwise provide functionality to the consumer product 150. In addition, readings from these sensors may be analyzed by the consumer product 150 and/or may be transmitted to a companion device or other product.

As also shown, in FIG. 4A, the consumer product 150 may include a channel 156 a groove or other such opening that is configured to receive a removable module 152, such as an interchangeable lug, for a wristband or attachment accessory 158. While a wristband is depicted as an example attachment accessory 158, other types of attachment accessories, accessories, components, and the like, may be removably attached to the housing 154 of the consumer product 150 using the attachment system. In some implementations, the first accessory includes a long band or strap that is configured to attach the device to the user by looping the band strap through the second accessory, which includes a loop or clasp.

The accessory 158 may be interchangeable with respect to the removable module 152. Thus, the accessory 158, the removable module 152 and the housing 154 of the consumer product 150 (or the consumer product 150 itself), and various combinations thereof, may comprises an ecosystem whereby each component of the ecosystem may be interchangeable with respect to one another. For example, one removable module 152 may be used with various accessories. In another embodiment, various removable modules may be used with a single consumer product 150.

In yet another embodiment, a single accessory 158 and/or a single removable module 152 may be used in various consumer products 150. In still yet other embodiments, the accessory 158 may not be removable from the removable module 152. In such instances, the removable module 152 and accessory combination may be interchangeable with a different removable module 152. In the case of a watch band accessory 158, the removable module 152 may include a lug having one end that is configured to attach to the housing 154 of the consumer product 150 and another end that is configured to attach to a band strap of the accessory 158.

A component of the accessory 158 (e.g., a band or strap) may be coupled to the removable module 152 using a clasp or other attachment means such as, for example, magnets, snaps, and the like. A component of the accessory 158 may also be secured, coupled or otherwise attached to the removable module 152 using a variety of attachment means. Examples of such include, but are not limited to a clasp, a pin, magnets, snaps, and other such attachment means. In other embodiments, one or more components of the accessory 158 may be secured to the removable module 152 by overmolding a material, weaving a material into, or otherwise integrating the material of the component with the removable module 152.

The band (or accessory 158) may include a first band strap 166 attached to a first removable module 152 of the consumer product 150 and a second band strap 168 attached to a second removable module 152 of the consumer product 150. In some embodiments, free ends of the first band strap 166 and the second band strap 168 may be configured to be releasably secured to one another using a clasp 170 or other attachment mechanism to form a loop. This loop may then be used to attach the consumer product 150 to a user's wrist.

The first band strap 166 and the second band strap 168 may be formed from various materials that are suited for various applications. For example, the first band strap 166 and the second band strap 168 may be formed from leather, plastic, woven textiles, metal links, metallic mesh materials and the like. The materials and construction of the first band strap 166 and the second band strap 168 may depend on the application.

For example, the first band strap 166 and the second band strap 168 may be formed from a woven textile material configured for exposure to impact and moisture typically associated with outdoor activities. In another example, the first band strap 166 and the second band strap 168 may be formed from a metallic mesh material that may be configured to have a fine finish and construction that may be more appropriate for professional or social activities.

The clasp 170 may also be configured for a particular application and/or selected based on a particular style of band. For example, if the first band strap 166 and the second band strap 168 are formed from a metallic mesh material, the clasp 170 may include a magnetic clasp mechanism.

The accessory 158 may be a unitary accessory. As such, a distal end of the accessory 158 may be configured to be coupled to a first removable module 152 and a proximal end of the accessory may be configured to be coupled to a second removable module 152. In yet another example, the accessory 158 may be coupled directly to, or may be manufactured to contain, a removable module 152 or various components of the removable module. That is, the accessory 158 may designed to include a feature that is configured to slide within the housing 154 of the consumer product 150 in a similar fashion as the removable module described above.

For example, the proximal end and/or the distal end of the accessory 158 may have a locking mechanism that acts to secure the ends of the accessory 158 within the channel 156 of the housing 154. In addition, the ends of the accessory 158 may include one or more protrusions or friction pads such as described herein. Further, the proximal end and/or the distal end of the accessory may be made from various materials including leather, silicon, metal links or mesh, and so on.

FIG. 4C illustrates a side view of the consumer product 150 of FIG. 4A according to one or more embodiments of the present disclosure. The housing 154 may have a three-dimensional shape that is generally rectilinear. Although a rectilinear shape is shown and described, the housing 154 may be rounded, square, oval, triangular, and have other such shapes.

In the example depicted in FIG. 4A, the housing 154 can be described as having two ends (a first end and a second end opposite the first end), and a first side and a second side opposite the first side, the sides being continuous with the ends. In this example, the first end and the second end and the first side and the second side have an outwardly curved three-dimensional shape.

The top side and the bottom side of the housing 154 may be substantially planar or flat. In other implementations one or both of the top side and the bottom side may be rounded. A display 160 may be positioned on the top side of the housing 154. When the display 160 ends, the housing 154 may transition from a flat or planar surface into one or more rounded edges. The rounded edges provide a smooth transition from the top side of the housing 154 to a sidewall of the housing 154 and from a sidewall of the housing 154 to a bottom side of the housing 154. The rounded edges of the housing 154 may cause a side profile of the housing to have a general lozenge shape although other shapes are contemplated.

In the example shown in FIG. 4C, the channel 156 is formed in the first end. Similarly, a second channel 156 is formed in the second end. In the present example the channels 156 have openings at the interface of the first and second sides and first and second ends. As also shown in FIG. 4C, the channel 156 of the housing 154 may be disposed on one or more sidewalls of the housing 154. Thus, as the rounded edges transition from the top surface to the bottom surface of the housing 154, the rounded edges may transition into the channel 156 itself. That is, the channel 156 may be carved directly into a solid portion of the housing 154. As such, the channel 156 may be positioned below the display 160 of the consumer product 150.

The length and shape of the channel 156 may follow the shape and length of the housing 154. Thus, if the housing 154 is rounded or curved, the channel, and one or more removable modules 152 may also be rounded or curved.

As shown below with respect to FIG. 10A, channel may also have an inwardly curved three-dimensional shape with an undercut. For example, the channel 156 may have a width that is greater than the openings on a proximal end and/or a distal end of the channel 156. The upper portion of the housing 154 may overhang the lower portion of the housing 154 at the channel 156 opening. In the example depicted in FIG. 4C, the channel 156 is cut into a solid portion of the housing 154 such that the channel 156 forms a continuous interior shape.

The channel 156 may be formed at an angle relative to the centerline of the housing 154. The channel 156 may also be located underneath a centerline of the housing 154. In some embodiments, the channel 156 is angled upward and inward within the profile of the housing 154, such that the channel 156 crosses a vertical centerline of the housing 154. The channel 156 may be angled with respect to a centerline of the housing 154 at approximately 5 degrees or greater.

The channel 156 may be configured in a variety of shapes. For example, the channel 156 may be rounded such as shown in FIG. 4C. In other embodiments, the channel 156 may be rectilinear or have other shapes such as described above with respect to FIG. 2A-FIG. 2F.

The channel 156 may also have an opening at a proximal end and another opening at a distal end. As discussed above, the channel 156 may extend along a side of the housing 154 such that the openings at each end are connected. In addition, the channel 156 may be shaped such that a lateral opening of the channel 156, as well as the proximal end and the distal end of the channel 156 follow the contour of the housing. As such, the openings may be slanted or otherwise curved based on the shape and dimensions of the housing 154. The openings may be on a curved surface and/or located inward of an outer dimension of the consumer product 150.

The channel 156 may be shaped such that the openings at the proximal end and the distal end are slightly tapered. As the channel 156 progresses toward the center of the channel 156, the depth of the channel increases. Put another way, near the open ends of the channel 156, the channel 156 may have a shallow depth and as the channel 156 progresses within the housing 154, the depth of the channel increases. As each opening may be configured to receive an accessory (e.g., accessory 158) and/or a removable module 152 such as described above, the configuration of the channel 156 in this manner may assist in enabling the removable module 152 or accessory 158 to enter the channel 156.

In addition to the openings at the proximal ends and the distal end of the channel 156, a slot may extend between the proximal end and the distal end of the channel 156. The slot may provide space for an object to pass through the housing 154 which enables the object to be attached to an removable module 152 contained within the channel 156 or otherwise be secured to the housing 154.

The slot may be tapered or have a dimension that is narrower than the dimensions of the openings at each of the ends. That is, the proximal end and the distal end of the channel 156 may have a first dimension while the slot of the channel 156 has a second dimension. In some embodiments, the second dimension is smaller than the first dimension. This configuration may help prevent perpendicular movement of an accessory 158 and/or removable module 152 that is contained within the channel 156.

For example, due to the narrower dimension of the slot, an accessory 158 or removable module 152 may be prohibited from being pulled out of the front of the slot due to a pulling motion or force that may be applied on the removable module 152 or accessory 158. The slot of the housing 154 may also be comprised of a rigid material which prevents or helps prevent the housing 154 from bending, expanding and so on.

FIG. 4D illustrates a bottom view of the consumer product 150 of FIG. 4A according to one or more embodiments of the present disclosure. The bottom side 172 of the housing 154 may be flat or substantially flat such as described above. In other embodiments, the bottom side 172 of the housing 154 or portions of the bottom side 172 of the housing 154 may be rounded. In addition, the bottom side 172 of the housing 154 may include a release mechanism 174. The release mechanism 174 is aligned with a recess in the channel 156. As discussed above, the release mechanism 174 may be used to release a locking mechanism of the removable module 152 from the channel 156.

Although FIG. 4D shows the release mechanism 174 centrally positioned near the sides of the housing 154, the release mechanism 174 may be positioned anywhere on the bottom side 172 of the housing 154. In addition, each side of the housing 154 may include a single release mechanism 174 or multiple release mechanisms 174. Further, although the release mechanism 174 is shown on the bottom side 172 of the consumer product 150, the release mechanism 174 may be positioned on a sidewall of the housing 154 and/or a top side of the consumer product 150.

As also shown in FIG. 4D, when the removable module 152 is inserted into the channel 156, the removable module 152 is contained within the channel 156. When the removable module 152 is contained within the channel 156, the removable module 152 may complete or otherwise fill the groove in the periphery of the housing 154 caused the channel 156. As shown in FIG. 4D, one or more arms may extend from the channel 156. The arms may be used to secure an accessory 158 (FIG. 4A) to the housing 154 such as described above.

FIG. 5A-FIG. 6C illustrate an example attachment system 200 including a removable module 205 and a housing 300 combination in accordance with one or more embodiments of the present disclosure. The removable module 205 may for example, correspond to the removable modules shown and described with respect to any of the previous figures. For example, the removable module 205 and the housing 300 may be similar to the removable module and housing shown and described with respect to FIG. 4A-FIG. 4D.

Figure 5A:
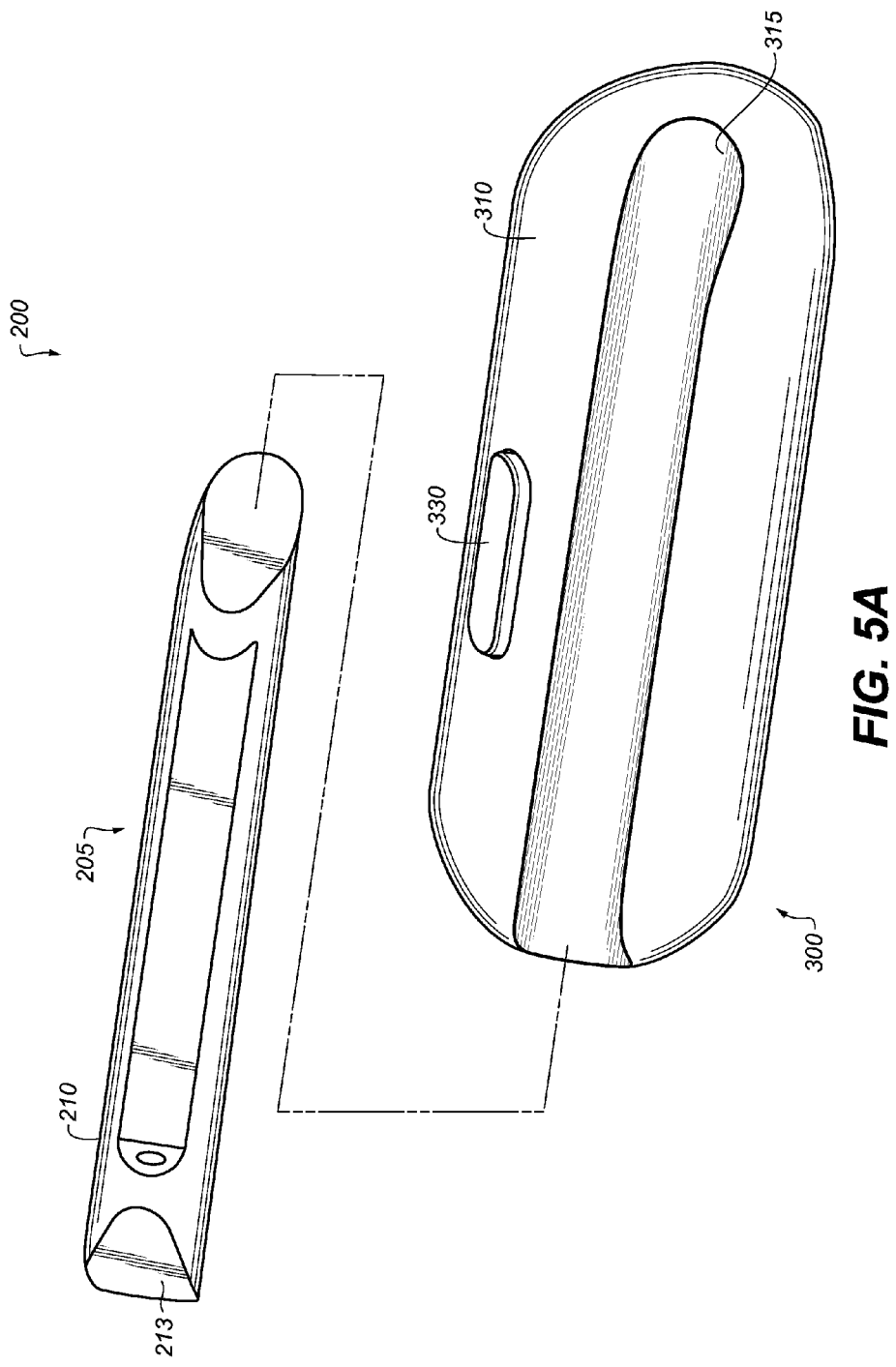
FIG. 5A illustrates an example attachment system and removable module that may be integrated with a consumer product according to one or more embodiments of the present disclosure.
Figure 5B:
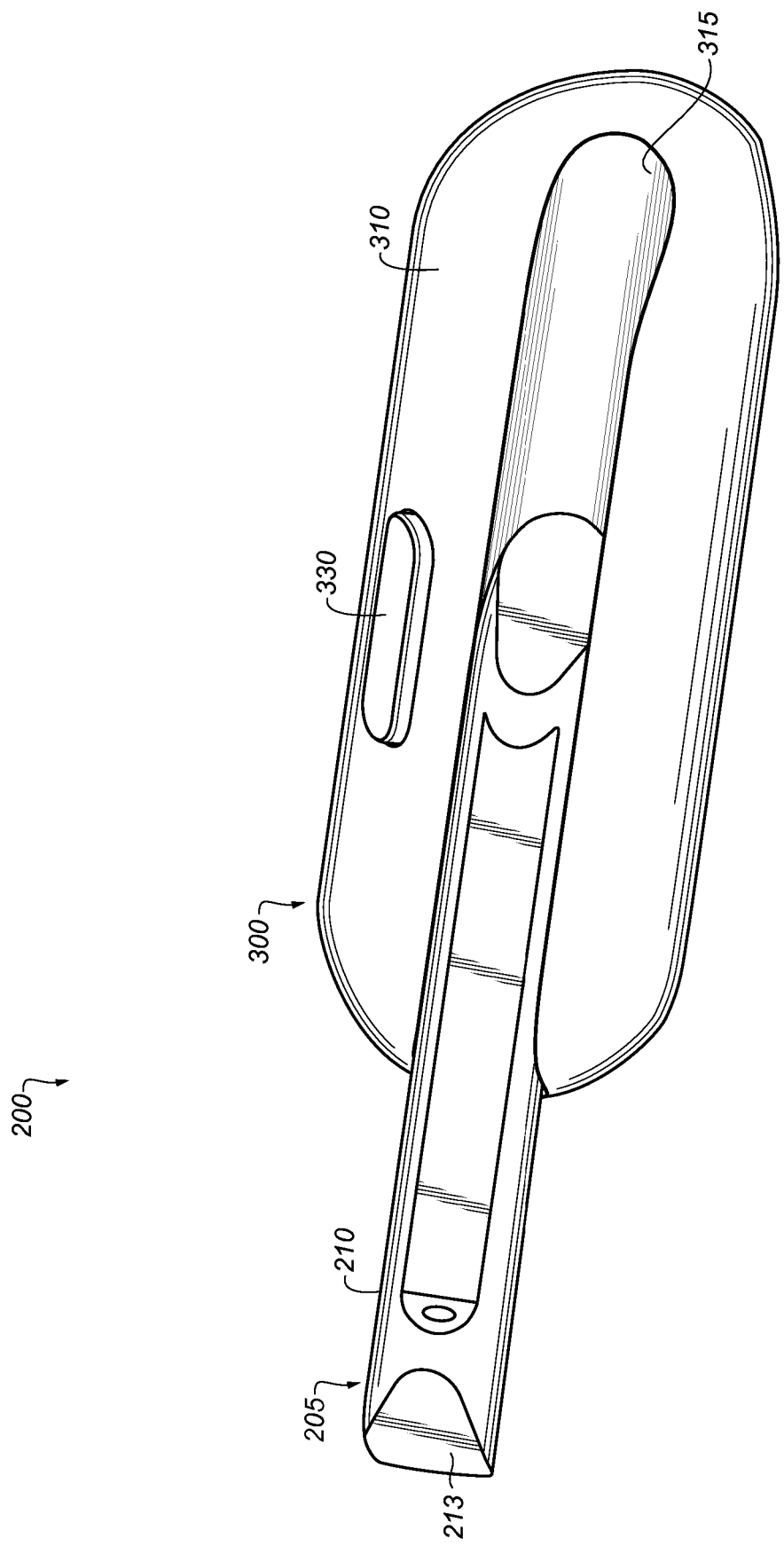
FIG. 5B illustrates a removable module of an attachment system being inserted into a channel of an attachment system according to one or more embodiments of the present disclosure.
Figure 5C:
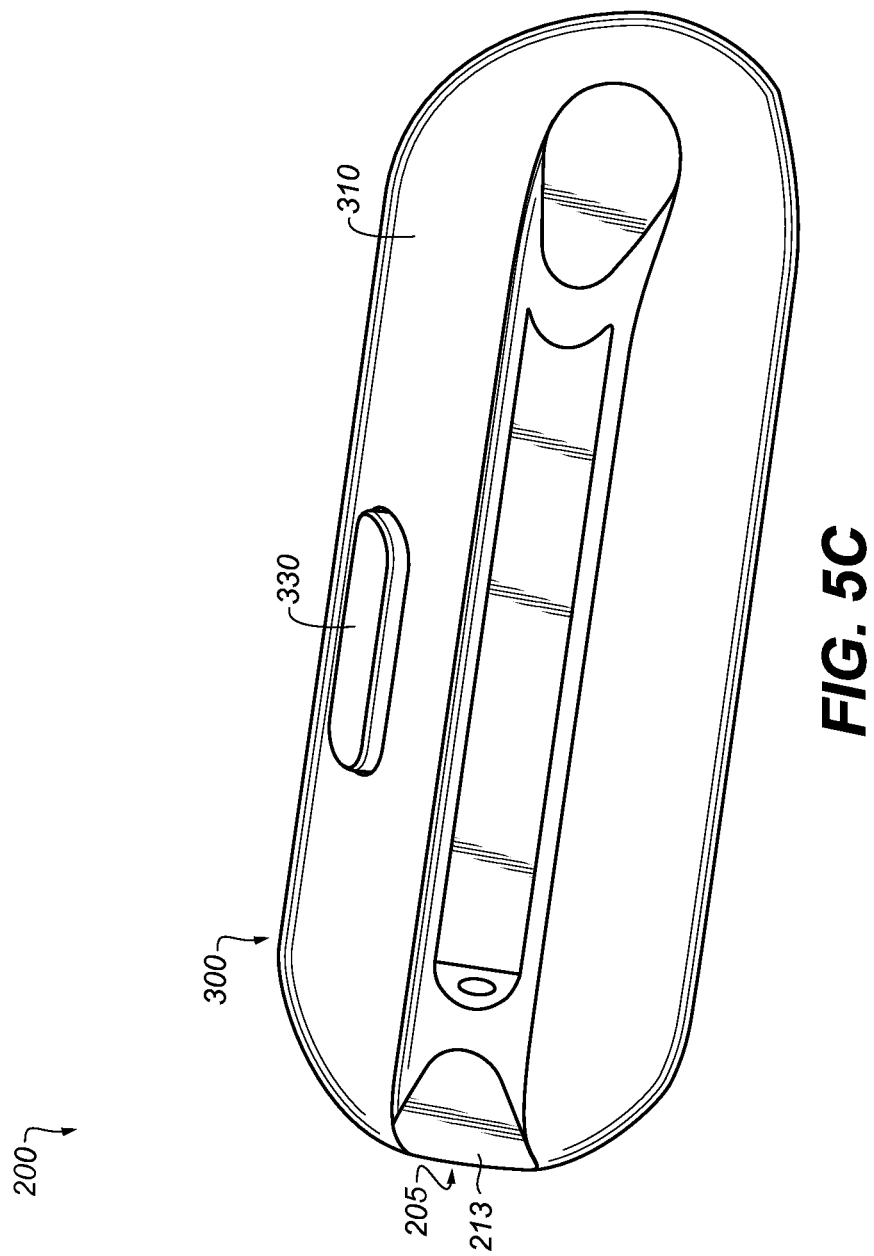
FIG. 5C illustrates the removable module being fully inserted into the channel of the attachment system according to one or more embodiments of the present disclosure.

As shown in FIG. 5A-FIG. 5C, the removable module 205 of the attachment system 200 may be removably coupled to a component or housing 300 of a consumer product. More specifically, FIG. 5A-FIG. 6C illustrate the removable module 205 during various stages of being inserted into a housing 300 of a consumer product.

FIG. 5A illustrates an example attachment system 200 including a removable module 205 and an example housing 300 or other such component of a consumer product. The removable module 205 is configured as an entirely separate unit that may be wholly removed from or integrated with the housing 300 of the consumer product. The removable module 205 may have a rounded and/or tapered body 210 with one or more arms 213 extending therefrom.

The outer walls of the arms 213 may be smooth and chamfered such as shown. More specifically, the arms 213 may begin as a part of the body 210 and extend beyond the body 210. The shape of the arms 213 may vary based on the shape of the channel 315 and the shape of the housing 300. Further, the arms 213 are configured to be flush or substantially flush with respect to at least a portion of an outer surface 310 of the housing 300 when the removable module 205 has been placed entirely within the housing 300 such as shown in FIG. 5C.

As also shown in FIG. 5A, the housing 300 may include a release mechanism that includes a spring-biased button portion 330 that interacts with one or more components of the removable module 205. For example, the button portion 330 is configured to be actuated to release the removable module 205 from the channel 315 of the housing 300 after the removable module 205 has been locked in place within the housing 300. A more detailed description of an example release mechanism is provided below with respect to FIG. 10A-FIG. 12B.

FIG. 5B illustrates the removable module 205 being partially inserted into the channel 315 of the housing 300. As shown in FIG. 5B, the removable module 205 fits within the channel 315 and slides relative to the channel 315. Although not shown in FIG. 5B, once the body 210 of the removable module 205 has been inserted into the channel 315, a locking mechanism of the removable module 205 is compressed such as shown and described with reference to FIG. 13B.

Once the body 210 of the removable module 205 is fully inserted into the channel 315 such as shown in FIG. 5C, the locking mechanism, or a portion of the locking mechanism, engages with a recess in the channel, which locks the removable module 205 in place within the channel 315. Interaction between the locking mechanism and the recess is shown and described in greater detail below with respect to FIG. 13C-FIG. 15. When the removable module 205 has been locked within the channel 315, actuation of the button portion 330 of a release mechanism on an outer surface 310 of the housing 300 releases the removable module 205 thereby permitting the removable module 205 to move within the channel 315.

As also shown in FIG. 5C, when the removable module 205 of the attachment system 200 is locked within the channel 315, the shape of the outer surface of the arms 213 conforms to the outer shape of the housing 300. Thus, if the sides of the housing were rounded, the outer surface of the arms 213 may also be rounded such that the removable module 205 and the housing 300 appear as a single unitary piece.

Figure 6B:
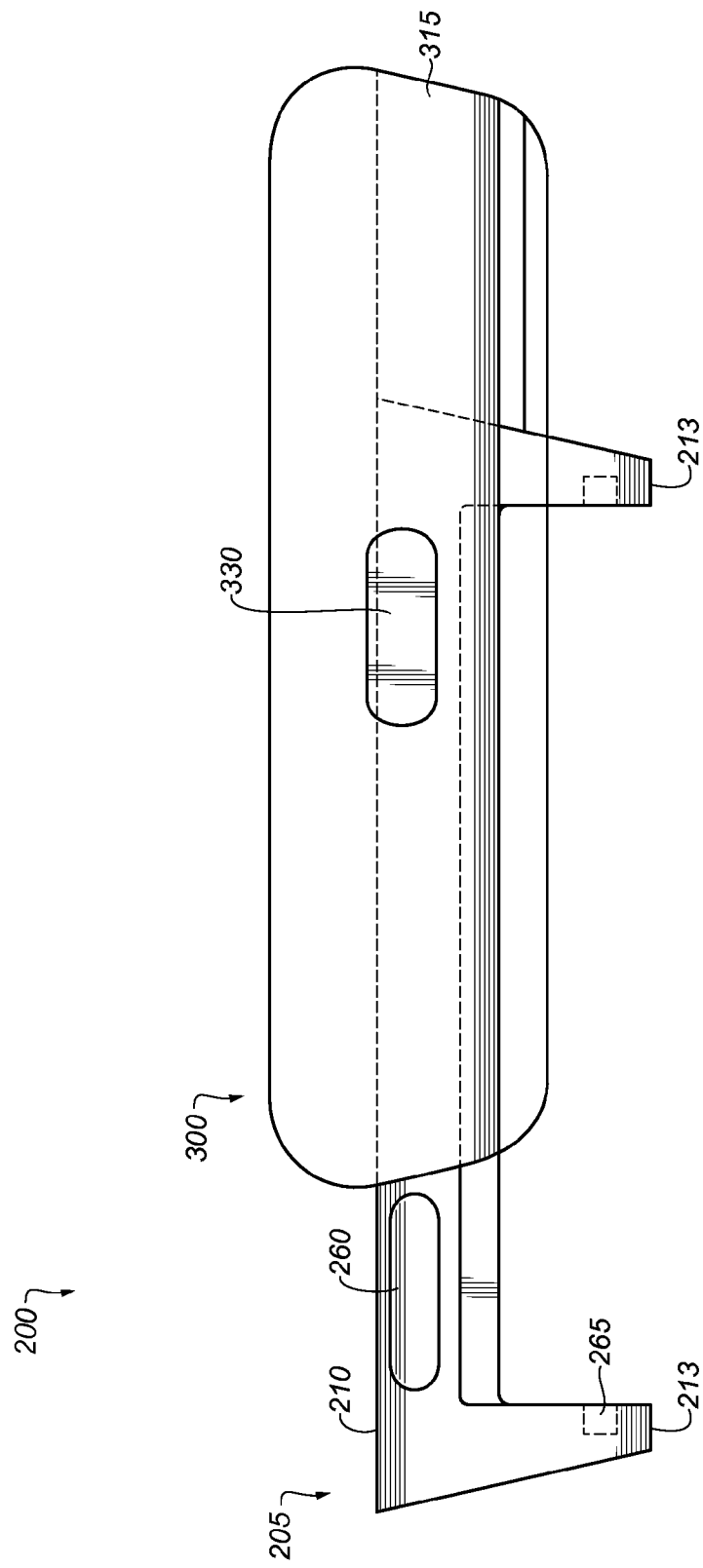
FIG. 6B illustrates a top view of a removable module of an attachment system being inserted into a channel of an attachment system according to one or more embodiments of the present disclosure.

FIG. 6A-FIG. 6C illustrate various views of an attachment system 200 including a removable module 205 and an example housing 300 of a consumer product. The removable module 205 may be similar to the removable modules shown and described above. As such, the removable module 205 may be inserted into a housing 300 of an electronic device or otherwise coupled to a consumer product. Further, the removable module 205 may be removably connected to a band, a strap, a dock, a stand, a display system and the like.

The various components and features of the removable module 205 will be discussed in greater detail below with respect to FIG. 7A-FIG. 9C. As such, similar reference numbers may be used across the various figures to show similar components. Additionally, various cross-section views represented by cross-section AA and cross-section BB are discussed in greater detail below. Additionally, various cross-section views represented by cross-section CC and cross-section DD shown in FIG. 6A are discussed in greater detail below.

FIG. 6A illustrates a top view of the removable module 205 not engaged or attached to the housing 300, FIG. 6B illustrates a top view of the removable module 205 being partially inserted into the channel 315 of the housing 300, and FIG. 6C illustrates a top view of the removable module 205 being fully inserted into the channel 315 of the housing 300. As shown in the assembly sequence of FIG. 6A-FIG. 6C, the removable module 205 is configured to slideably engage with the channel 315 of the housing 300 to connect the two components. Other components, such as a band or strap, may also be attached to the removable module 205, which are omitted from these views for clarity.

A catch member 220 of a locking mechanism disposed on the body 210 may interact with the channel 315. As will be shown and described below with respect to FIG. 13A and FIG. 13B, the catch member 220 of the locking mechanism may be spring-biased flush with respect to the body 210 of the removable module 205. As a result, the catch member 220 may be received into the channel 315 with little to no resistance. However, when the body 210 of the removable module 205 has been fully received into the channel 315, the catch member 220 may expand into a recess within the channel 315 such as shown and described below with respect to FIG. 13C and FIG. 14A.

The removable module 205 may also include one or more friction pads 260. The friction pads may be positioned at various locations on the body 210 of the removable module 205 and be used to increase friction, restrict movement, and maintain spacing of the removable module 205 within the channel 315.

The removable module 205 may have a profile shape that corresponds to at least a portion of the profile shape of the housing 300. In particular, as shown in FIG. 6C, the width of the channel 315 may be substantially equivalent to the width of the body 210 of the removable module 205. When the removable module 205 is fully inserted, as shown in FIG. 6C, at least a portion of the outer surface of the body 210 is flush or substantially flush with an outer surface 310 of the housing 300.

In the present embodiment, the contour of the outer surface of the body 210 corresponds to the contour of the outer surface 310 of the housing although this is not required. For example, in some implementations, the body of the removable module may have a shape that corresponds to the channel 315 of the housing 300 while another portion of the removable module 205 (e.g., one or more arms 213) has a non-conforming shape. Also, as also shown, the arms 213 of the removable module 205 may extend from the housing 300 in a direction perpendicular to the length of the channel 315.

The removable module 205 may include arms 213 for coupling the removable module 205 with another component or accessory. An engagement feature 265 is formed in a surface of a respective arm 213. The engagement feature 265 may be a recess that receives a pin, post, or similar protrusion feature of a mating part. The mating part may include a band strap or other component that attaches to the removable module 205 using the engagement feature 265.

In alternative embodiments, the arms 213 of the removable module 205 may be partially or entirely received into the channel 315 of the housing 300. In another embodiment, the body 210 and the arms 213 may extend from or otherwise protrude from the channel 315. As also shown in these figures, the arms 213 are configured to be flush or substantially flush with respect to one or more outer walls of the housing 300 when the removable module 205 has been placed entirely within the housing 300 such as shown in FIG. 6C. Actuation of a button portion 330 on the housing 300 enables the removable module 205 to be released from the channel 315 such as described below.

FIG. 7A-FIG. 9C illustrate various views and components of a removable module 205 of an attachment system according to one or more embodiments of the present disclosure. The removable module 205 shown and described with respect to FIG. 7A-FIG. 9C may be similar to the removable modules of the attachment systems shown and described above. In addition, specific dimensions, shapes and orientations are described below with respect to the removable module 205 and the various components of the removable module 205. However, the disclosed dimensions, shapes and orientations of the removable module 205, and its associated components, are not limiting and are used as examples. Alternate shapes, dimensions and orientations do not affect the utility of the disclosed embodiments. Accordingly, similar dimensions, shapes and orientations of the removable module 205, and its associated components, described below with respect to FIG. 7A-FIG. 9C may be used with the various embodiments of the removable modules described herein.

FIG. 7A illustrates an exploded perspective view of a removable module 205 according to one or more embodiments of the present disclosure. The removable module 205 may include a body 210. The body 210 may be elongated and rounded such as shown in FIG. 7A. More specifically, a top surface of the body 210 may be rounded and also have a rounded sidewall that transitions to a rounded bottom surface. The body 210 may also have a flat surface disposed between two arms 213 that extend from the body 210. The flat surface may be opposite the rounded sidewall that is between the rounded or curved top surface and the rounded or curved bottom surface.

The width of the arms 213 and/or the body 210 may increase when moving from a font side (e.g., a side where the arms 213 begin) to a back side of the body 210. In other embodiments, the height of the body 210 may also increase when moving from a first portion of the body to a second portion of the body 210 (e.g., from a flat side wall or first transition wall to the rounded sidewall or second transition wall of the body).

The arms 213 may have substantially planar outer side surfaces that flare outwardly from a first end to a second rounded end. The body 210 may be disposed between the arms 213 to complete the removable module 205. In another embodiment, the top and/or bottom surface of the body 210 may be flat or substantially flat and have at least one rounded side wall that transitions from the flat top surface to the flat bottom surface.

In certain embodiments the body 210 of the removable module 205 is 32.2 mm in length, 3.2 mm in height and 7.2 mm in width. Although specific dimensions and shapes have been given, the body 210 may have any desired shape and/or dimensions based on, for example, the type or size of the housing of the electronic device the removable module 205 is to be used for.

For example, if the removable module 205 is to be used in a housing of a wearable electronic device, the body 210 and/or the entire removable module 205 may have a first set of dimensions. Likewise, if the removable module 205 is to be used in a housing of a mobile phone, the body 210 and/or the entire removable module 205 may have a second set of dimensions. The removable module 205 may have the same size across a variety of different products. As such, a removable module 205 that is used for one product may be interchangeable with an attachment system of another product.

In yet another embodiment, the removable module 205 may have different dimensions for differing sizes of similar devices. For example, a wearable device may be available in a first size and may also be available in a second size. Although the wearable devices may have similar functionality, the attachment systems and the removable modules may be shaped and sized differently based the respective size of the housing of each wearable device.

Further, the shape and dimensions of the removable module 205 and/or the body 210 may vary based on demographics of a target audience of a particular electronic device. For example, if the target user of a particular electronic device is a child, the removable module 205 may have a first shape, orientation and set of dimensions. Likewise, if the target user of the electronic device is an adult, the removable module 205 may have a second shape, orientation and set of dimensions.

The body 210 of the removable module 205 may be made from a variety of materials including metal, fabric, ceramics, plastic, rubber or other such polymer and so on. In some embodiments, the removable module 205 may be integrated with an accessory or object such as, for example a band. That is, the removable module 205 and the band may be formed as a single integrated unit. In other embodiments the band may be molded over the removable module 205. In embodiments where the removable module 205 is integrated with an object or accessory, the various components described below may also be integrated with the object or accessory.

Continuing with the band example, the band may have one or more friction pads 260 that are integrated with the band. Likewise, the band may have a locking mechanism such as described below. In other embodiments, the band may have a thickness that is slightly greater than the dimensions of a channel. As such, the band may have to be compressed to enter the channel but decompresses within the channel to secure the band within the channel.

Depending on the type of material used to create the body 210 of the removable module 205, the body 210 may include a support member or structure disposed within the body 210. For example, if the body 210 was made of fabric, rubber or plastic, a support structure may be placed within the body 210 to add rigidity to the body 210. The added rigidity of the support structure may help prevent the removable module 205 from being compressed or being perpendicularly pulled (e.g., being pulled from a frontal opening of the channel) or otherwise removed from a channel of a housing.

Referring back to FIG. 7A, the body 210 includes a proximal end and a distal end. Although not required, each of the proximal end and the distal end may include an arm 213 that extends beyond the body 210. The arms 213 may follow the shape of the body 210 and have a lozenge shape although other shapes are contemplated. For example, as shown in FIG. 5A, 6A and FIG. 7A, each of the proximal end and the distal end of the body 210 has a rounded and/or chamfered arm 213.

The arm 213 may be rounded and/or tapered/chamfered so as to enable the proximal end and the distal end of the body 210 of the removable module 205 to be flush or substantially flush with respect to one or more sides of the housing of the electronic device or the channel into which the removable module 205 is to be inserted (such as shown in FIG. 5C and FIG. 6C). The chamfered arms 213 may be chamfered using an angle of about 5 degrees from the back of the arm 213 to the front of the arm 213.

Although a specific angle has been described, the angle of the chamfer of the arms 213 may be at any angle. In addition, the arms 213 may be configured in a variety of sizes. However, the size of the arms 213 should not be so large that force is unduly concentrated on any portion of the arms 213 when the removable module 205 is within the channel or slides within the channel. Although rounded chamfered arms 213 are specifically shown and described, the proximal end and the distal end of the removable module 205 may be in any shape or configuration based on the shape of the housing, the shape of the channel within the housing or based on a desired aesthetic of the removable module 205.

The removable module 205 may also include an opening 215 disposed within the body 210. The opening 215 may be positioned at any point along the body 210. Thus, although the opening 215 is shown as being in a center axis of the body 210, the opening 215 may be positioned at any point, and in any orientation along the body 210. In embodiments, the opening 215 is configured to receive one or more portions of a locking mechanism. Further, the opening 215 enables each portion of the locking mechanism to slideably move within respective portions of the opening 215.

Specifically, the opening 215 includes a top portion and a bottom portion. The top portion and the bottom portion may be separated by an outer ledge and an inner ledge (such as for example, outer ledge 216 and inner ledge 217 (FIG. 9A)). Both the inner ledge and the outer ledge may be used to hold various portions of the locking mechanism in place within the opening 215. Further, the inner ledge and the outer ledge are also used to ensure that various portions of the locking mechanism are spring-biased in the manner described herein with respect to the removable module 205 and with respect to each other.

Figure 16A:
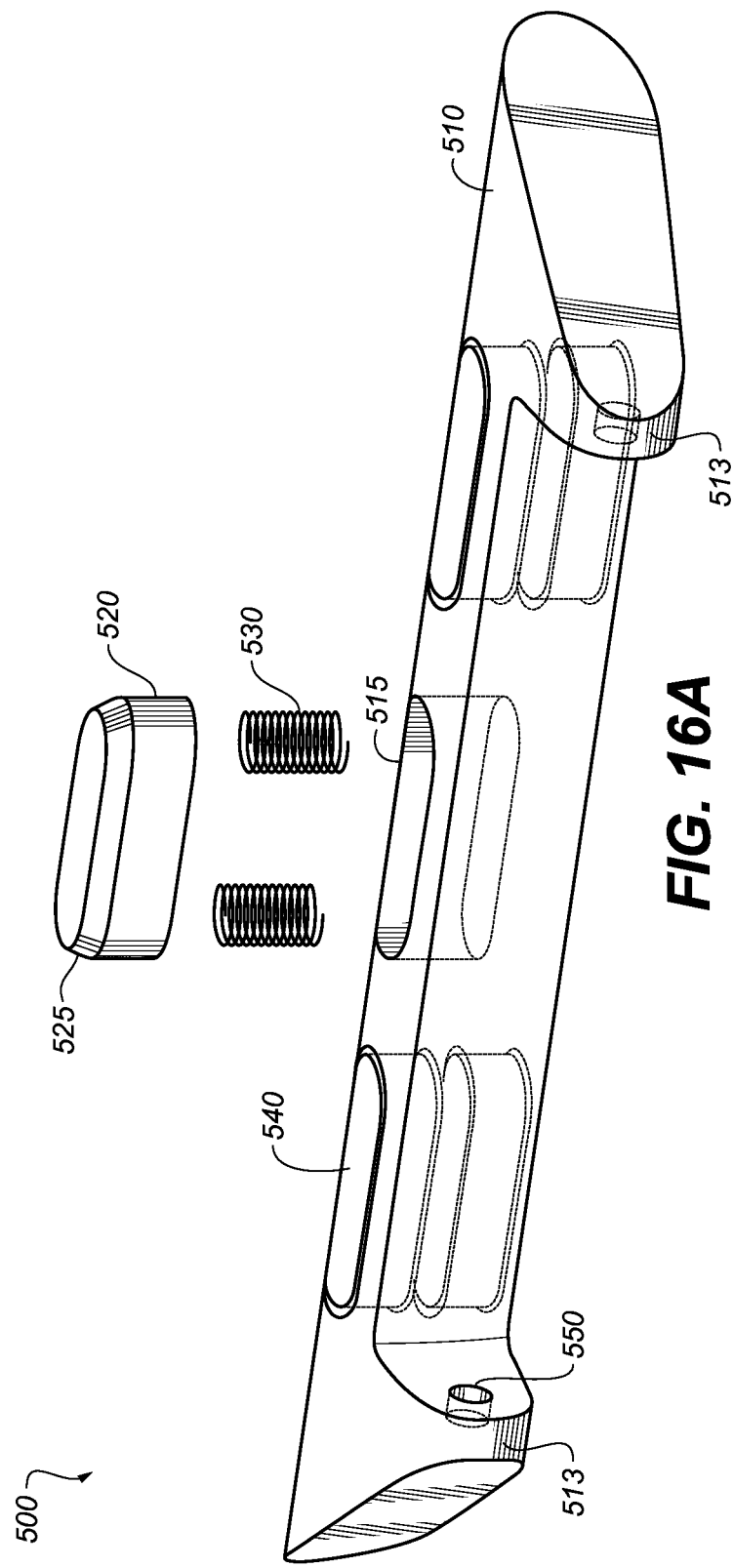
FIG. 16A illustrates an exploded perspective view of a locking mechanism of a removable module of an attachment system according to one or more alternate embodiments of the present disclosure.

Referring back to FIG. 7A, the locking mechanism of the removable module 205 includes a catch member 220 and a ramp 235. From top to bottom, the catch member 220 includes an upper surface, a sidewall 225 forming the body that extends from the upper surface of the catch member 220 to a bottom portion of the catch member 220, an aperture 230 in the body, and an opening in the bottom. In some embodiments, the sidewall 225 of the catch member 220 may be formed at a ninety-degree angle with respect to the upper surface of the catch member 220 although other angles may be used. For example, the catch member 220 may have a chamfer disposed between the top surface of the catch member 220 and the sidewalls of the catch member such as shown in FIG. 16A. The chamfer may define a transition between the upper surface of the catch member and a body of the catch member. In such embodiments, the chamfered edge may be rounded.

The catch member 220 may be made of plastic, aluminum, stainless steel, metal, ceramic or any other material or combination of materials. The catch member 220 may be configured in a rounded oblong or lozenge shape and may include a smooth planar or substantially planar top surface. In certain embodiments, the catch member 220 may be approximately 5.2 mm in length, 1.9 mm in width and 1.8 mm in height although other dimensions may be used.

In embodiments where the chamfered edge is present, the planar or substantially planar top surface of the catch member 220 may be surrounded or substantially surrounded by the chamfered edge. As will be explained below with respect to FIG. 16A, the chamfered edge may be used to facilitate withdrawal and insertion of the catch member 220 in the recess of a channel. In such embodiments, the chamfered edge may angled at approximately eighteen degrees with respect to the planar or substantially planar top surface of the catch member 220 and have a length of 0.5 mm although other angles and lengths are contemplated.

Although the catch member 220 has been described as having a planar or substantially planar top surface, the top surface of the catch member 220 may have various configurations. The top surface need not be planar and need not have a chamfered edge. Rather, the top surface can take any of a number of different forms; it may define a central depression surrounded by a flattened, raised edge; it may define a C-, U-, T-, E-, or S-shape (or other, similar shape) that is generally flat; it may take the form of a discontinuous group of flat or substantially flat surfaces; and so on.

In some cases, only a portion of the top surface of the catch member 220 is planar or substantially planar while other portions of the top surface are concave, non-planar, substantially non-planar and so on. For example, an outer edge of the catch member may be planar or substantially planar while the other portions (e.g., an inner portion) of the top surface are concave. For example, a substantially planar edge may extend entirely or partially around the top surface of the catch member 220. In another example, the top surface of the catch member 220 may have a planar or substantially planar section that extends from a proximal side to a distal side.

Regardless of the configuration of the top surface, at least a portion of the top surface typically engages the channel until the catch member 220 has been received into a channel of the housing and/or the recess within the channel. More specifically, the substantially planar top surface provides for uninterrupted travel of the removable module 205 as the removable module 205 slides relative to a housing such as described herein. It should be appreciated that portions of the top surface may continuously engage an edge of the channel in some embodiments, or may continuously engage a channel sidewall in other embodiments.

Although specific dimensions, angles and shapes are discussed above, the catch member 220 may have various configurations, shapes and sizes. In addition to the examples set forth above, in another implementation, the top surface of the catch member 220 may be rounded or non-planar. In another example, the catch member 220 may have a rectangular shape, a rounded or oblong shape and so on. When present, the chamfered edge of the catch member 220 may be disposed on proximal and distal ends (e.g., the ends of the catch member 220 that contact or engage the channel of the housing) of the catch member 220.

The top surface of the catch member 220 may have blocked or stair-step configuration. Although not shown in FIG. 7A, the shape of the recess within the channel of the housing of the electronic device may have a shape, dimensions and orientations which enables the catch member 220 to be at least partially received into the recess.

One or more sidewalls of the catch member 220 may also define an aperture 230. The aperture 230 is configured to receive one or more flanges 245 of the ramp 235. For example, the one or more flanges 245 of the ramp 235 may be configured to be at least partially received into the catch member 220 and moveably secured within the aperture 230. Although the aperture 230 is shown in FIG. 7A as being rounded, the aperture 230 may have various shapes and dimensions. Further, the aperture 230 may be positioned at various locations on the catch member 220.

Although the aperture 230 is shown as extending entirely through the sidewall of the catch member 220, the aperture 230 may extend partially through the sidewall which creates a ledge or cliff on the sidewall. The ledge may also be configured to receive and secure the flanges 245 of the ramp 235.

The locking mechanism also includes a ramp 235. The ramp 235 may be made of plastic, aluminum, stainless steel or any other material or combination of materials. The ramp 235 may have a rounded oblong shape and have a rounded or substantially non-planar bottom surface. In certain embodiments, the ramp 235 may be 5.2 mm in length, 1.5 mm in width and 2.5 mm in height although other dimensions may be used.

The rounded or non-planar bottom surface of the ramp 235 enables the ramp 235 to slideably contract within the opening 215 when the rounded surface of the ramp 235 comes into contact with the channel of the housing of the electronic device or is otherwise compressed. Likewise, the rounded or non-planar bottom surface of the ramp 235 enables the ramp to slideably expand from the opening 215 as the ramp 235 exits the channel of the housing of the electronic device or is otherwise permitted to expand from the opening 215.

Although the ramp 235 is shown with a rounded or non-planar bottom surface, the bottom surface of the ramp 235 may be configured in any shape. For example, the bottom surface of the ramp 235 may be partially flat or substantially flat and have a chamfered edge. As the chamfered edge of the ramp comes into contact with the channel of the housing, the force applied by the channel on the chamfered edge causes the ramp 235 to contract within the opening 215.

The ramp 235 also includes one or more protrusions 240 and one or more flanges 245. The protrusions 240 may extend from the ramp 235 and may be used to secure a first set of spring mechanisms 250 between the catch member 220 of the locking mechanism and the ramp 235 of the locking mechanism.

The first set of spring mechanisms 250 may be used to bias the catch member 220 away from the ramp 235. Thus, when the ramp 235 moves in a direction toward the catch member 220 (and the catch member 220 is not prevented from expanding), the first set of the spring mechanisms 250 causes the catch member 220 to move in a direction away from the ramp 235 such that the catch member 220 protrudes from the top surface of the body 210 of the removable module 205. Accordingly, the catch member 220 may be configured to receive at least a portion of each spring mechanism of the first set of spring mechanisms 250 along with the protrusions 240. Although two spring mechanisms 250 and two protrusions 240 are shown and described, the first set of spring mechanisms 250 may include any number of spring mechanisms. Likewise, the ramp 235 may have any number of protrusions 240.

The ramp 235 may also include one or more flanges 245. As discussed above, the one or more flanges 245 may be used to secure the ramp 235 to the catch member 220. Further, the one or more flanges 245 may be used to secure a second set of spring mechanisms 255 between the ramp 235 and a lower portion of the opening 215. Although two spring mechanisms are shown with respect to the second set of spring mechanisms 255, the ramp 235 may be used to secure any number of spring mechanisms within the bottom portion of the opening 215 and the ramp 235.

The second set of spring mechanisms 255 may be used to bias the ramp 235 of the locking mechanism proud with respect to a bottom surface of the removable module 205. In addition, the second set of spring mechanisms 255 also cause the catch member 220 of the locking mechanism to be biased flush or substantially flush with respect to a top surface of the removable module 205. Specifically, the second set of spring mechanisms 255 cause the rounded or non-planar bottom surface of the ramp 235 to protrude from the removable module 205.

Although the ramp 235 is spring-biased proud with respect to the removable module 205, when force is applied to the non-planar bottom surface of the ramp 235 (e.g., by causing the non-planar bottom surface of the ramp to come into contact with the channel and continuing to the slide the attachment system within the channel) the second set of spring mechanisms 255 contract which enables the ramp 235 to move in a direction toward to the catch member 220 such that the non-planar bottom surface of the ramp 235 is flush, or substantially flush, with respect to the bottom side of the body 210 removable module 205. When the ramp 235 is removed from the channel of the housing of the electronic device, the second set of spring mechanisms 255 expand which causes the ramp 235 to once again protrude from the body 210 of the removable module 205.

The removable module 205 may also include one or more friction pads 260 that extend or protrude from the body 210 of the removable module 205. The friction pads 260 may be positioned at leading edges of the body 210. The friction pads 260 may include one or more alignment pads that act as a guide for the removable module 205 when the removable module 205 slides relative to a channel in the housing of the electronic device. The friction pads 260 may have a rounded top surface that follows or substantially follows the contour of the body 210 while still protruding from the top surface of the body 210. The friction pads 260 may have a planar or substantially planar top surface. In another embodiment, a friction pad 260 may be part of or integrated with the locking mechanism. For example, the catch member 220 and/or ramp 235 of the locking mechanism may be friction pads 260 or have a friction pad positioned on a surface.

The friction pads 260 may be 5.2 mm in length, 1.5 mm in width and 3.4 mm in height. In some embodiments, the friction pads 260 may extend approximately 0.11 mm above the top surface and/or below the bottom surface of the body 210. Further, the distance from the center of a friction pad 260 to the opening 215 is 7.2 mm. The distance from a center of a friction pad 260 to an outer edge of the body 210 is 8.9 mm in some embodiments and 10.3 mm in embodiments where the removable module 205 is larger.

Although the friction pads 260 are shown in a rounded oblong or lozenge shape, the friction pads 260 may be curved, proud, flat, angled, have a raised edge and a flat interior or any combination thereof. Further, although specific dimensions have been given, the friction pads 260 may be configured in various shapes with varying dimensions.

The friction pads 260 may be positioned on various parts of the body 210 of the removable module 205 such as shown in FIG. 7A. For example, a top surface of the body 210 of the removable module 205 may include one or more friction pads 260 and the bottom surface of the body 210 of the removable module 205 may also include additional friction pads 260. In such embodiments the friction pads 260 on the top surface of the body 210 may be aligned with respect to the friction pads 260 on the bottom surface of the body 210.

The friction pads 260 on the top surface of the body 210 may be asymmetrically aligned with the fiction pads 260 on the bottom surface of the body 210. In addition, the friction pads 260 may be aligned with the catch member 220 and the ramp 235 of the locking mechanism.

In other implementations, the friction pads may not be aligned with the catch member 220 and/or the ramp 235 of the locking mechanism. In yet other implementations, the friction pads 260 may be removed entirely from the body 210 or be present on either a top surface or a bottom surface of the body 210.

The friction pads 260 may be made of plastic, nylon or other such material. The material may be a material that acts to increase friction between the removable module 205 and the channel of the housing of the consumer product.

The body 210 of the removable module 205 may include one or more recesses in which the friction pads 260 may be placed. In alternative embodiments, the friction pads 260 may be placed directly on top, bottom and/or side surfaces of the body 210 of the removable module 205. Further, the friction pads 260 may be disposed in one or more openings that extend entirely though an axis of the body 210 of the removable module 205.

The friction pads 260, or at least a portion of each friction pad 260, extends or protrudes from one or more surfaces of the body 210 of the removable module 205. In such embodiments, the portion of the friction pad 260 that extends beyond the surface of the body 210 of the removable module 205 is used to: (1) increase friction between the removable module 205 and the channel of the housing of the electronic device into which the removable module 205 is to be placed; and (2) maintain or substantially maintain spacing between one or more surfaces of the removable module 205 and a surface of a channel of the housing of the electronic device into which the removable module 205 is to be placed. In embodiments, because the friction pads 260 help maintain spacing between the removable module 205 and the channel, undesired movement, rattling and/or noise caused by any movement of the removable module 205 may be reduced when the removable module 205 is contained within the channel.

The removable module 205 may also include one or more engagement features 265. As shown in FIG. 7A, the one or more engagement features 265 may be placed on inner sides of the arms 213 that extend from each of the proximal end and the distal end of body 210 of the removable module 205. Further, the engagement features 265 may be posited in parallel with the flat or substantially flat sidewall or transition wall of the body 210.

The engagement features 265 may be used to secure a band, a strap or other accessory (not shown) to the removable module 205. For example, a band or a strap may include one or more pins that enable the band or strap to be removably attached to the removable module 205. As such, proximal and distal ends of the pin associated with the band or strap may be received into respective ones of the one or more engagement features 265.

In certain embodiments, the pin that is used to secure the band to the removable modules 205 by being coupled to the engagement features 265 may also be used to perform a hard reset on the electronic device. For example, the pin, or other such connection mechanism, may be removed from the engagement feature 265 and inserted into an aperture or communication port that causes the electronic device to be restored into a factory default state. In another embodiment, the pin or other such connection mechanism may be used to access a compartment (e.g., a tray that holds a SIM card or a memory card or device) that is removably or slideably coupled to the housing of the electronic device.

Although the one or more engagement features 265 are shown and described at particular locations, the engagement features 265 may be positioned at various points along the body 210 of the removable module 205. In alternative embodiments, a bar may laterally extend between the arms 213 of the proximal end and the distal end of the body 210 of the removable module 205. In such embodiments, the one or more engagement features 265 may not be required as a band or strap may be woven, directly molded or attached to, or otherwise inserted through the bar and the removable module 205.

Figure 7B:
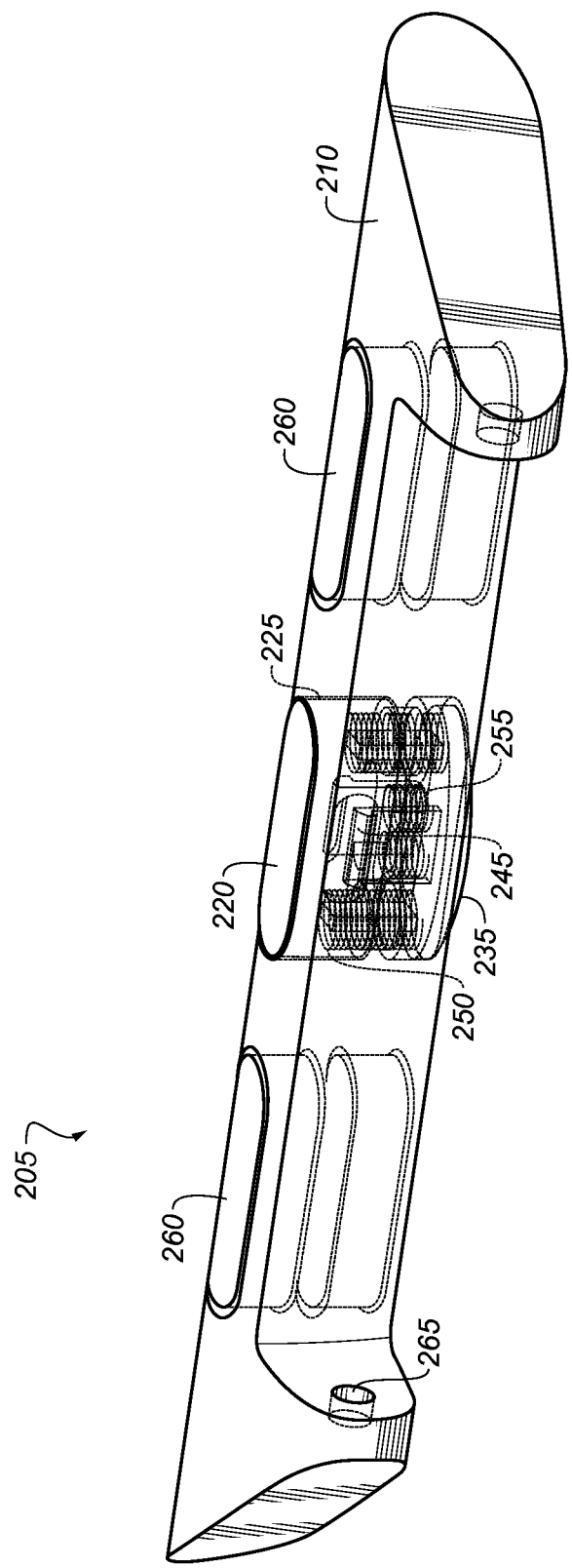
FIG. 7B illustrates a perspective view of the assembled locking mechanism of FIG. 7A according to one or more embodiments of the present disclosure.

FIG. 7B illustrates a perspective view of the assembled removable module 205 of FIG. 7A according to one or more embodiments of the present disclosure. As shown in FIG. 7B, the catch member 220 of the locking mechanism is placed within the body 210 of the removable module 205 such that the top surface of the catch member 220 is flush or substantially flush with respect to a top side of the body 210. Likewise, the ramp 235 of the locking mechanism is placed within the body 210 of the removable module 205 such that the bottom surface of the ramp 235 is biased proud or protrudes from a bottom surface of the body 210 of the removable module 205.

As also shown in FIG. 7B, one or more flanges 245 are configured to be received within an aperture 230 of the catch member 220 of the locking mechanism. The one or more flanges 245 may be permitted to move within the aperture 230 in response to actuation of the ramp 235 and movement of the catch member 220.

For example, when the ramp 235 is compressed, the flanges 245 may move within the aperture 230 toward the top surface of the catch member 220. When the catch member 220 expands outwardly from the body 210, the flanges 245 move from a top portion of the aperture 230 and contact the bottom portion of the aperture 230. When the flanges 245 contact the bottom portion of the aperture 230 the catch member 220 is prohibited from further outward expansion. Likewise, as the ramp 235 expands outwardly, the flanges 245 are secured against the bottom portion of the aperture 230 which causes the catch member 220 to be biased flush or substantially flush with respect to the top side of the body 210 of the removable module 205.

As also shown in FIG. 7B, the first set of spring mechanisms 250 may be coupled to one or more protrusions of the ramp 235. The first set of spring mechanisms 250 may also be secured between the ramp 235 and catch member 220. As discussed, the first set of spring mechanisms 250 cause the catch member 220 to be biased away from the ramp 235. Further, when the ramp 235 is compressed, the first set of spring mechanisms 250 are also compressed which causes the catch member 220 to move from a first position, in which the planar or substantially planar top surface of the catch member 220 is flush or substantially flush with respect to the top side of the body 210 of the removable module 205, to a second position, in which at least a portion of the catch member 220 protrudes from the top side of the body 210 of the removable module 205.

The second set of spring mechanisms 255 are secured between the ramp 235 and an inner ledge of a bottom portion of the opening 215 contained within the body 210 of the removable module 205. As the one or more flanges 245 of the ramp are secured to the catch member 220, when the second set of spring mechanisms 255 bias the ramp 235 proud, the flanges 245 and the second set of spring mechanisms 255 causes the catch member 220 of the locking mechanism to be biased flush or substantially flush with respect to a top side of the body 210 of the removable module 205.

Figure 8A:
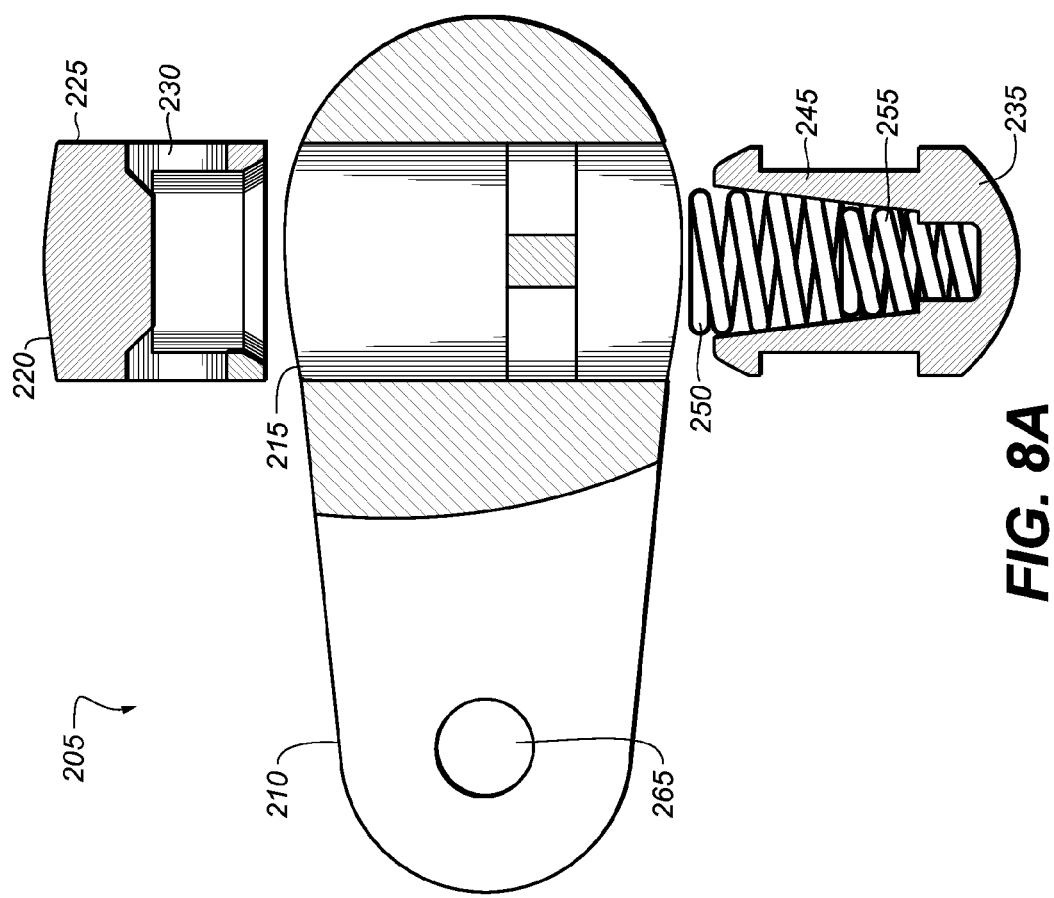
FIG. 8A illustrates an exploded side cross-section view of the locking mechanism of FIG. 7A according to one or more embodiments of the present disclosure.

FIG. 8A illustrates an exploded side cross-section view of the locking mechanism of the removable module 205 of FIG. 7A according to one or more embodiments of the present disclosure. More specifically, FIG. 8A illustrates an exploded cross-section view taken from cross-section BB shown in FIG. 6A.

FIG. 8A also illustrates the overall shape of the body 210 of the removable module 205. For example, the body 210 of the removable module 205 may have a planar or substantially planar sidewall, a rounded top surface, a rounded bottom surface and a rounded (or substantially non-planar) outer sidewall, opposite from the substantially planar sidewall. Each sidewall may provide a transition between the top surface and the bottom surface. In some embodiments, the rounded outer sidewall may have dimensions that are greater than the substantially planar sidewall. In another embodiment, the top surface of the body 210 and/or the bottom surface of the body 210 may be flat or planar and have the rounded outer sidewall and flat or substantially flat sidewall such as described above.

In some embodiments, a thickness height, and/or width of the body 210 may increase when moving from the arms 213 (FIG. 7A) toward to the rounded sidewall of the body and/or toward the opening 215 is disposed. That is, the body 210 may be tapered such that the thickness of the body 210 increases when moving from a first side (e.g., a side in which the arms 213 extend from body 210) to a second side.

As shown in FIG. 8A, the removable module 205 may include an opening 215 that has an upper portion and a bottom portion. In certain embodiments, the upper portion of the opening 215 is configured to receive a catch member 220 of a locking mechanism and the bottom portion of the opening is configured to receive a ramp 235 of the locking mechanism.

As also shown in FIG. 8A, the catch member 220 of the locking mechanism may have a planar or substantially planar top surface. In certain embodiments, the catch member 220 includes an aperture 230 configured to moveably secure one or more portions (e.g., one or more flanges 245) of the ramp 235. More specifically, one or more flanges 245 of the ramp 235 may be received into a bottom opening of the catch member 220 and be snap-fit, press-fit or otherwise received into the aperture 230. Although the one or more flanges 245 are secured within the aperture 230, the one or more flanges 245 may also move within the aperture 230. For example, when the ramp 235 is actuated in a direction toward the catch member 220 or in a direction that is away from the catch member 220, the one or more flanges may be permitted to move or slide within the aperture 230 in a given direction while still being secured within the aperture 230.

The ramp 235 of the locking mechanism may have a rounded or non-planar bottom surface. The non-planar bottom surface of the ramp 235 may enable the ramp 235 to be gradually actuated as the removable module 205 slides or is otherwise inserted into a channel of a housing of an electronic device.

The ramp 235 may also include one or more protrusions (not shown in FIG. 8A) and one or more flanges 245. In embodiments, the protrusions may extend from the ramp 235 and may be used to secure a first set of spring mechanisms 250 between the catch member 220 and the ramp 235. Likewise, the one or more flanges 245 may be used to secure the ramp 235 to the catch member 220 and may be configured to receive and secure a second set of spring mechanisms 255 within the locking mechanism. Specifically, the one or more flanges 245 may be used to secure the second set of spring mechanisms 255 between the ramp 235 and a bottom portion of the opening 215 such as described above.

FIG. 8B illustrates an assembled side cross-section view (e.g., cross-section view BB (FIG. 6A)) of the locking mechanism of the removable module 205 of FIG. 7B according to one or more embodiments of the present disclosure. As shown in FIG. 8B, the catch member 220 of the locking mechanism is placed within an opening 215 of the body 210 of the removable module 205. In such embodiments, the top portion of the opening has a depth sufficient to enable the top planar or substantially planar surface of the catch member 220 to be spring-biased flush or substantially flush with respect to the top surface of the body 210 of the removable module 205.

FIG. 8B also shows how the one or more flanges 245 are configured to be moveably received within the catch member 220 of the locking mechanism. For example, the flanges 245 may be in contact with a bottom side of the aperture 230 when the locking mechanism is an extended state such as shown in FIG. 8B. However, when the ramp 235 is compressed, the flanges 245 may slideably move in an upward direction toward the top surface of the catch member 220 within available space provided by the aperture 230. When the catch member 220 subsequent expands outwardly from the body 210, the flanges 245 move from the top portion of the aperture 230 back to the bottom portion of the aperture 230. When the flanges 245 contact the bottom portion of the aperture 230 the catch member 220 is prohibited from further outward expansion.

FIG. 8B also illustrates that the first set of spring mechanisms 250 may be secured between the catch member 220 and the ramp 235. Additionally, FIG. 8B illustrates that the second set of spring mechanisms 255 may be secured between the ramp 235 of the locking mechanism and an inner ledge of the bottom portion of the opening 215. As discussed above, the first set of spring mechanisms 250 causes the catch member 220 to be biased away from the ramp 235 of the locking mechanism. Further, the second set of spring mechanisms 255 causes catch member 220 to be biased flush or substantially flush with respect to a first side of the body 210 of the removable module 205 and further causes the ramp 235 to be biased proud with respect to a second side of the body 210 of the removable module 205.

Although the ramp 235 is spring-biased proud with respect to the body 210 of the removable module 205, when pressure is applied to the non-planar bottom surface of the ramp 235, or the ramp 235 is otherwise actuated, the ramp 235 compresses and is received into the opening 215. The ramp 235 may continue to be received into the body 210 until the non-planar bottom surface of the ramp is substantially received, or entirely received, into the bottom portion of the opening 215.

Figure 9A:
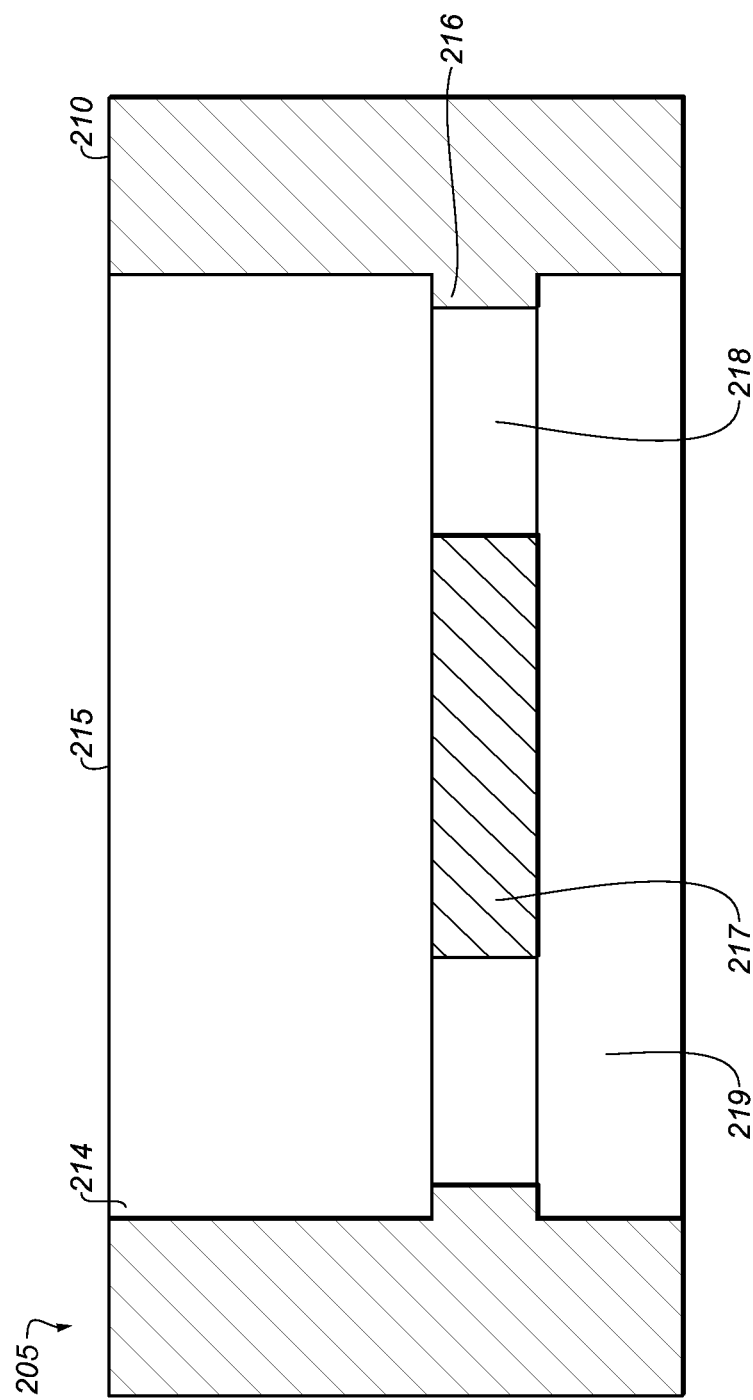
FIG. 9A illustrates a front cross-section view of an opening in a removable module according to one or more embodiments of the present disclosure.

FIG. 9A illustrates a front cross-section view of the opening 215 in the body 210 of the removable module 205. More specifically, FIG. 9A illustrates a cross-section view AA (FIG. 6A) of the opening 215. As discussed, the opening 215 is configured to receive one or more portions of a locking mechanism of the removable module 205. As such, the opening 215 may include a top portion 214 and a bottom portion 219. The top portion 214 may have first depth and be configured to receive a catch member (e.g., catch member 220 (FIG. 7A)) of a locking mechanism. The depth of the top portion 214 of the opening 215 may be defined by one or more of an outer ledge 216 and an inner ledge 217. Further, the depth of the top portion 214 of the opening 215 may be similar or substantially similar to the depth of the catch member 220 of the locking mechanism.

The opening 215 may also include a bottom portion 219 configured to receive a ramp (e.g., ramp 235 (FIG. 7A) of a locking mechanism. As with the top portion 214 of the opening 215, the bottom portion 219 of the opening 215 may have a depth defined by the outer ledge 216 and the inner ledge 217. The bottom portion 219 of the opening 215 has a depth sufficient to enable the ramp 235 of the locking mechanism to be received into the bottom portion 219. As such, when the ramp 235 is in a compressed state, a non-planar bottom surface of the ramp of the locking mechanism may be flush or substantially flush with respect to a second side of the body 210. In certain embodiments, the depth of the bottom portion 219 of the opening may be at least twice the depth of the ramp although other depths may be used.

The opening 215 may include one or more pass-through holes 218. The one or more pass-through holes 218 may be used to enable one or more protrusions (e.g., protrusions 240 (FIG. 7A)) and one or more spring mechanisms coupled to the protrusions (e.g., first set of spring mechanisms 250 (FIG. 7A) to pass between the bottom portion 219 of the opening 215 into the top portion 214 of the opening 215. In addition, the opening 215 may have one or more additional pass-through holes (not shown) to enable one or more flanges (e.g., flanges 245 (FIG. 7A)) to pass from the bottom portion 219 of the opening 215 to the top portion 214 of the opening 215 and be moveably received into a aperture (e.g., aperture 230 (FIG. 7A)) of a catch member of a locking mechanism.

Figure 9B:
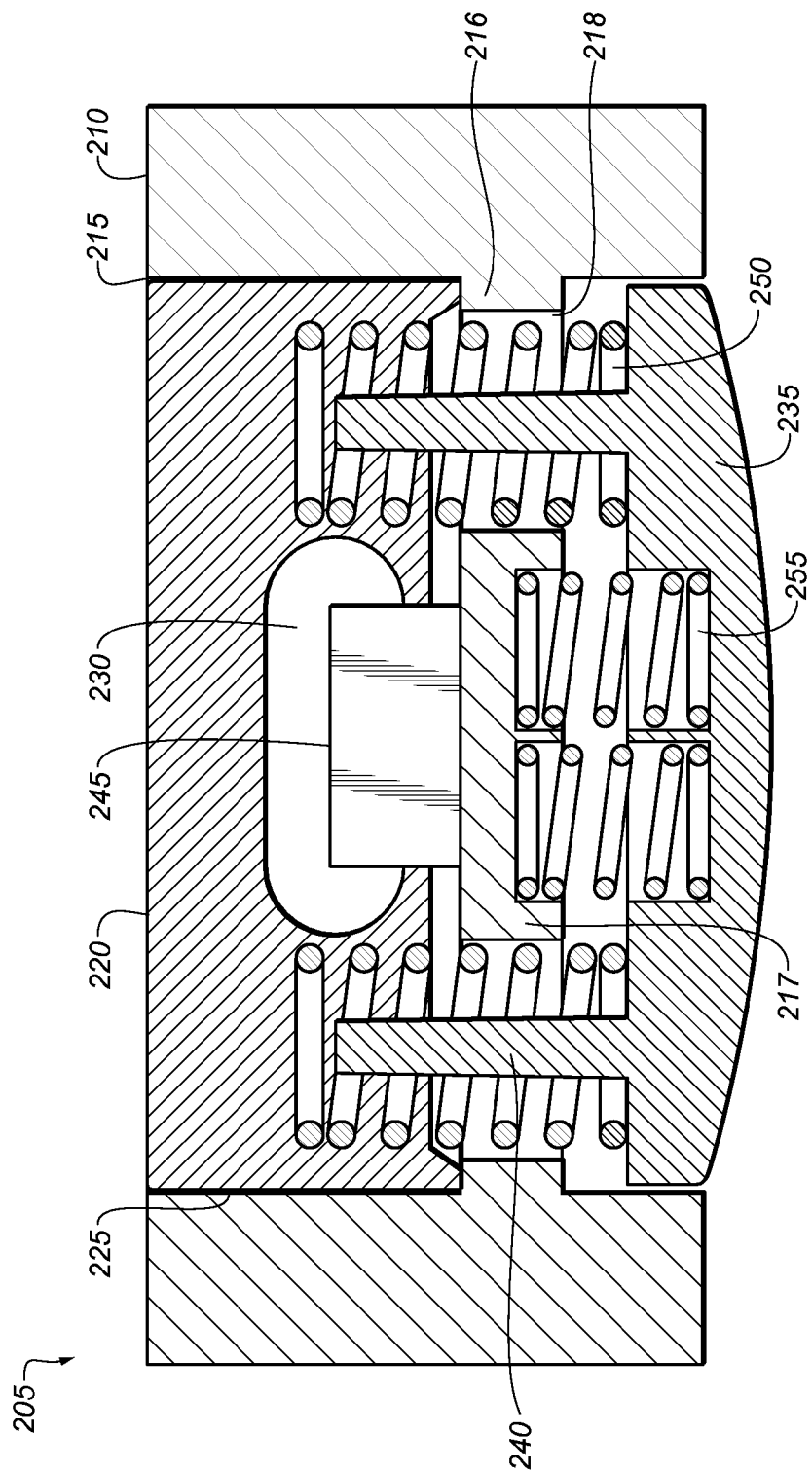
FIG. 9B illustrates a front cross-section view of a locking mechanism of the removable module of an attachment system according to one or more embodiments of the present disclosure.

FIG. 9B illustrates a front cross-section view of an opening 215 in a body 210 of the removable module 205 that contains an assembled locking mechanism according to one or more embodiments of the present disclosure. More specifically, FIG. 9B illustrates the cross-section view AA of FIG. 6A in which the locking mechanism is in a fully expanded state with no external force or compression being exerted on the locking mechanism. As previously discussed with respect to FIG. 9A, the opening 215 in the body 210 of the removable module 205 may include a top portion and a bottom portion (e.g., top portion 214 and bottom portion 219 of FIG. 9A).

The top portion may have a first depth that is defined by one or more of an outer ledge 216 and an inner ledge 217. Further, as shown in FIG. 9B, the outer ledge 216 is configured to support at least a portion (e.g., an outer edge) of a catch member 220 of the locking mechanism. In such embodiments, the outer ledge 216 prevents the catch member 220 of the locking mechanism from moving from the top portion of the opening 215 into the bottom portion of the opening 215. Further, the outer ledge 216 may be configured to support the catch member 220 such that the top planar or substantially planar surface of the catch member 220 is flush or substantially flush with respect to a first side of the body 210 of the removable module 205.

The bottom portion of the opening 215 may have a depth that is defined by the outer ledge 216 and the inner ledge 217. The inner ledge 217 may be used to support one or more spring mechanisms, such as, for example, the second set of spring mechanisms 255. The second set of spring mechanisms 255 may cause the ramp 235 to be biased proud with respect to the second side of the body 210 of the removable module 205. Further, the second set of spring mechanisms enable the ramp 235 to be compressed within the bottom side of the opening 215.

The opening 215 also includes one or more pass-through holes 218 that enable protrusions 240 and the first set of spring mechanisms 250 to pass between the bottom portion of the opening 215 into the top portion of the opening 215. The pass-through holes 218 may constrain the lateral motion of the first set of spring mechanisms 250 as the first set of spring mechanisms 250 expand and contract. In addition, the opening 215 may have one or more additional pass-through holes (not shown) that enable flanges 245 to pass from the bottom side of the opening 215 to the top surface of the opening 215 and be moveably received into the aperture 230 in the sidewall 225 of the catch member 220 of a locking mechanism.

Figure 9C:
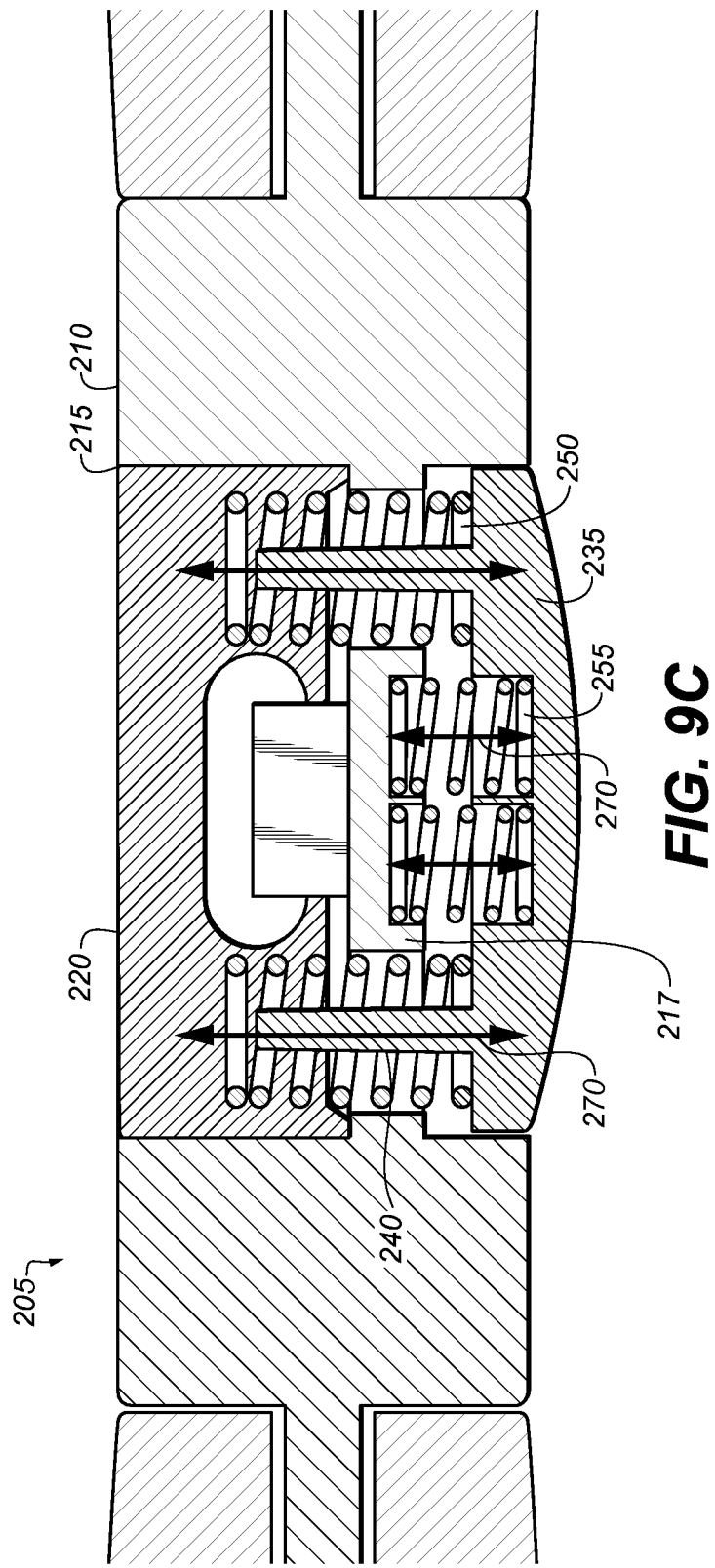
FIG. 9C illustrates a front cross-section view of a locking mechanism of a removable module of an attachment system and the movement of the locking mechanism as it engages with a mating feature of the attachment system according to one or more embodiments of the present disclosure.

FIG. 9C illustrates a front cross-section view of a locking mechanism or locking mechanism of an removable module 205 according to one or more embodiments of the present disclosure. More specifically, FIG. 9C illustrates a cross-section view AA of FIG. 6A in which the locking mechanism is in a fully expanded state with no external force or compression being exerted on the locking mechanism. FIG. 9C also illustrates the interplay between a first set of spring mechanisms 250 of the locking mechanism with respect to the catch member 220 of the locking mechanism and the ramp 235 of the locking mechanism. FIG. 9C also illustrates the interplay between a second set of spring mechanisms 255 of the locking mechanism with respect to the ramp 235 and an inner ledge 217 of an opening 215.

As previously discussed, the catch member 220 of a locking mechanism may be placed within the opening 215 of the body 210 of the removable module 205. As also discussed, the top portion of the opening 215 has a depth such that the top planar or substantially planar surface of the catch member 220 is flush or substantially flush with respect to a first side of the body 210 of the removable module 205. Additionally, one or more protrusions 240 may extend from the ramp 235 of the locking mechanism and may be received in the catch member 220. The protrusions 240 may also be used to constrain lateral movement of the first set of spring mechanisms 250.

The first set of spring mechanisms 250 may be configured to compress and expand in the direction of arrows 270. Further, the first set of spring mechanisms 250 may be configured to bias the catch member 220 of the locking mechanism away from the ramp 235 of the locking mechanism. In addition to the above, the first set of spring mechanisms 250 may also cause at least a portion of the catch member 220 to protrude from the opening 215 when the ramp 235 of the locking mechanism is compressed as discussed in more detail below.

As also shown in FIG. 9C, the ramp 235 of the locking mechanism may be placed within a bottom portion of the opening 215. The ramp 235 may be spring-biased proud with respect to a second side of the body 210 such that at least a portion of the ramp 235 protrudes from the second side of the body 210 of the removable module 205. In such embodiments, the second set of spring mechanisms 255 (e.g., preloaded springs) may be placed between an inner ledge 217 of the opening 215 and the ramp 235.

The second set of spring mechanisms 255 may also enable the ramp 235 to compress such that the ramp 235 may slide within the bottom portion of the opening 215 when a force is applied to the non-planar bottom side of the ramp 235 or when the ramp 235 is otherwise actuated. When this actuation occurs, and if the catch member 220 of the locking mechanism has a clear path of movement (e.g., not contained within a channel of the housing or not beneath a recess in the channel of the housing), the first set of spring mechanisms 250 causes the catch member 220 to move from a first position, such as, for example, a position in which the top-planar side of the catch member 220 is flush or substantially flush with respect to the first side of the body 210 of the removable module 205 such as shown in FIG. 9C, to a second position in which at least a portion of the catch member 220 protrudes from the opening 215. In embodiments where a chamfered edge is present, the chamfered edge of the catch member 220, and/or a portion of the body of the catch member 220, may protrude from the opening 215. As will be discussed below, the protruding portion of the catch member 220 enables the attachment system to be releasably locked within a channel of a housing of an electronic device.

FIG. 10A-FIG. 12B illustrate various views and components of a housing 300 of an electronic device according to one or more embodiments of the present disclosure. The housing 300 of the electronic device shown and described with respect to FIG. 10A-FIG. 12B may be similar to the housing of the consumer product shown and described above. Further, one or more components and features shown and described with respect to FIG. 10A-FIG. 12B may be similar to components and features associated with the various housings, components, apertures and the like shown and described above. In addition, specific dimensions, shapes and orientations are described below with respect to the housing and the channel within the housing. Further, the disclosed dimensions, shapes and orientations of the housing, the channel, and their associated components and features, are not limiting and are used as examples. Similar dimensions, shapes and orientations of the housing, the channel and their associated components and features described below may be used with the embodiments described above.

FIG. 10A illustrates a portion of a housing 300 of an electronic device according to one or more embodiments of the present disclosure. The housing 300 may be made from stainless steel, aluminum, plastic or any other suitable material. The housing 300 may include a channel 315 that extends from a first side of the housing 300 to a second side of the housing 300 such as shown in FIG. 10A. The channel 315 may be carved into a solid portion of the housing 300. As such, the channel 315 may be located underneath various components of the electronic device. For example, the channel 315 may be located underneath a display of the electronic device.

For example, the channel 315 may be formed directly into the housing 300. This configuration may reduce the number of parts and also enhance the structural integrity of the electronic device. In some embodiments, the channel 315 may be standardized and configured to work with a system of interchangeable components. Forming the channel 315 directly into the housing 300 may reduce parts and also facilitate structural rigidity of the device.

Although the channel 315 is shown as extending completely from a first side of the housing 300 to a second side of the housing 300, the channel 315 may partially extend from a first side of the housing 300 to a second side of the housing 300. In such an embodiment, one end of the channel 315 ends at an inner wall (not shown) of the housing 300.

In certain embodiments, the channel 315 may have a diameter of 3.3 mm. Further, the length of the profile curve within the mouth of the channel 315 may have a length of about 8.8 mm. When the removable module 205 (FIG. 7A) has been inserted into the channel 315, a gap of approximately 0.045 mm may be present around the removable module 205 although due to manufacturing tolerances, the gap may vary between 0.015 mm and 0.075 mm. As discussed above, one or more friction pads 260 (FIG. 7A) may be used to maintain that spacing.

Figure 10B:
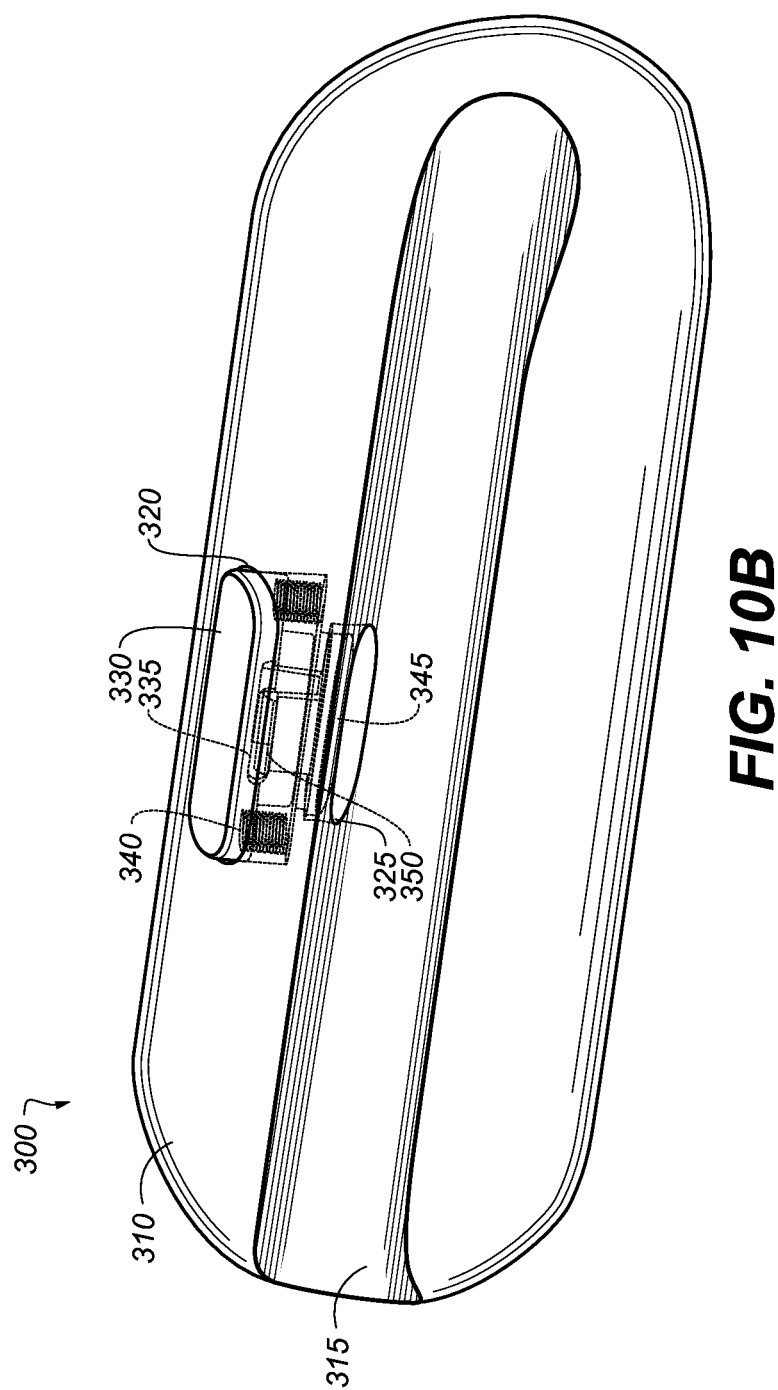
FIG. 10B illustrates an assembled release mechanism of an attachment system that is integrated within the housing of the consumer product according to one or more embodiments of the present disclosure.

The channel 315 may also have a sidewall that is at least partially rounded. Further, the channel 315 may have a sidewall that is flat or substantially flat. In addition, the channel 315 may be disposed at an angle of about five degrees with respect to the housing 300 such as shown in FIG. 10B and FIG. 11A. The channel 315 may be located beneath a center axis line of the housing although other positions are contemplated. Although specific shapes, angles and dimensions of the channel 315 are specifically discussed, the channel 315 may be configured in any desired shape having various dimensions and orientations.

The housing 300 may also include an opening 320 disposed on an outer surface 310. In certain embodiments, the opening 320 is used to receive one or more portions of a release mechanism. Specifically, the opening 320 is configured to receive a button portion 330 of the release mechanism as well as one or more spring mechanisms 340 of the release mechanism. The spring mechanisms 340 may be secured between the button portion 330 and a ledge of the opening 320. The spring mechanisms 340 may be used to cause the planar or substantially planar top surface of the button portion 330 of the release mechanism to be biased flush or substantially flush with respect to an outer surface 310 of the housing 300.

In certain embodiments, the button portion 330 of the release mechanism is made from stainless steel, aluminum, plastic or any other suitable material. As discussed, the button portion 330 of the release mechanism may have a rounded or angular top surface that is configured to be flush or substantially flush with the outer surface 310 of the housing 300 when the button portion 330 is placed into the opening 320. In alternative embodiments, the button portion 330 may have a planar or substantially planar top surface.

The button portion 330 may be configured in a substantially rounded oblong shape. In certain embodiments, the button portion 330 may be 7.5 mm in length, 1.6 mm in width and 2.2 mm in height. Although specific dimensions are discussed, the button portion 330 may have various dimensions and shapes. The button portion 330 of the release mechanism may also include one or more receiving slots 335 that are configured to receive one or more flanges 350 of a plunger 345 of the release mechanism.

The plunger 345 of the release mechanism may be made of stainless steel, aluminum, plastic or any other suitable material. Further, the plunger 345 may have a planar or substantially planar bottom surface such as shown in FIG. 10A. In other implementations, the bottom surface may be concave or convex. According to one or more embodiments, the plunger 345 may be 4.8 mm in length, 1.6 mm in width and 2.0 mm in height although other dimensions and shapes may be used.

The bottom surface of the plunger 345 may be used to actuate at least a portion of a locking mechanism, such as, for example, a catch member of a locking mechanism such as described above. The plunger 345 may also include one or more flanges 350 that are configured to be received and secured in one or more receiving slots 335 of the button portion 330 of the release mechanism.

The housing 300 also includes a recess 325 disposed within the channel 315 of the housing 300. The recess 325 may be positioned at any point within the channel 315. For example, the recess 325 may be positioned near one of the openings of the channel 315. In one embodiment, multiple recesses 325 may be disposed within the channel 315. In yet another embodiment, the recess 325 may not be disposed within the channel 315 as the channel 315 may have other securement means such as described later herein.

The recess 325 may be positioned below the opening 320 and form part of the opening 320. As such, one or more flanges 350 of the plunger 345 may extend from the plunger 345 through the recess 325 into the opening 320 and be secured within respective receiving slots 335 of the button portion 330. Because the plunger 345 is coupled to the button portion 330, actuation of the button portion 330 causes the plunger 345 to move within the recess 325. As the plunger 345 moves within the recess 325 (e.g., from a first position within the recess 325 to a second position within the recess 325) in response to actuation of the button portion 330 of the release mechanism, the plunger 345 is configured to expel or otherwise remove a portion (e.g., a catch member) of a locking mechanism from the recess 325.

Although not shown in FIG. 10A, the channel 315 may also include a connector slot that may be used to connect a cable, plug or other such mechanism to the electronic device. The cable may be used to, for example, charge a battery of the device, transfer data to and from a storage device, perform maintenance processes, restore default and/or saved settings on the electronic device and so on. The connector slot may be positioned proximate to the recess 325 or may aligned with the recess 325. In another embodiment, the connector slot may be positioned anywhere within the channel 315 or other part of the housing 300.

FIG. 10B illustrates an assembled release mechanism contained within a housing 300 of an electronic device according to one or more embodiments of the present disclosure. As discussed above, the release mechanism may include a button portion 330 and a plunger 345. As shown in FIG. 10B, the button portion 330 may be received in an opening 320 of the housing 300. Likewise, the plunger 345 may be received into a recess 325 disposed within a channel 315 of the housing 300.

A planar top surface of the button portion 330 is spring-biased flush or substantially flush with respect to the outer surface 310 of the housing 300 using one or more spring mechanisms 340. The plunger 345 may be coupled to the button portion 330 using one or more flanges 350. That is, the one or more flanges are received into respective receiving slots 335 defined by the button portion 330.

The plunger 345, by virtue of its coupling to the button portion 330, is held within the recess 325 at an upper most portion of the recess 325 such as shown in FIG. 10B. Such a positioning enables the recess 325 to receive a portion of a locking mechanism such as described above. When a portion of a locking mechanism has been received into the recess 325, actuation of the button portion 330 causes the plunger 345 to move within the recess 325 from the first position to a second position (e.g., a position in which a planar or substantially planar bottom surface of the plunger 345 is flush or substantially flush with respect to the channel 315). Movement of the plunger 345 from the first position to the second position expels the portion of the locking mechanism from within the recess 325 and further causes the locking mechanism to compress and/or enter a compressed state.

FIG. 11A illustrates an exploded side cross-section view of the release mechanism of the housing 300 according to one or more embodiments of the present disclosure. More specifically, FIG. 11A illustrates a cross-section view of the housing 300 taken from cross-section CC of FIG. 6A.

As shown in FIG. 11A, the housing 300 may include a channel 315 that extends from a first side of the housing 300 to a second side of the housing 300. In certain embodiments, the channel 315 may have a rounded configuration and may be positioned at a certain angle with respect to the housing such as described above.

As previously discussed, the housing 300 may also include an opening 320 disposed on an outer surface 310. The opening 320 may be used to receive one or more portions of a release mechanism. More specifically, the opening 320 is configured to receive a button portion 330 of the release mechanism as well as one or more spring mechanisms 340 of the release mechanism. The spring mechanisms 340 may be secured between the button portion 330 of the release mechanism and a ledge of the opening 320. Further, the spring mechanisms 340 may cause the top surface of the button portion 330 of the release mechanism to be biased flush or substantially flush with respect to the outer surface 310 of the housing 300 such as shown in FIG. 11B.

The release mechanism may also include a plunger 345. The plunger 345 may have a planar or substantially planar bottom surface that may be configured to move from a first position within the recess 325 to a second position within the recess 325 in response to actuation of the button portion 330. The plunger 345 may also include one or more flanges 350 that are configured to be received and secured in one or more receiving slots 335 of the button portion 330 of the release mechanism such as shown in FIG. 11B.

As discussed above, the housing 300 may also include a recess 325. In certain embodiments, the recess 325 may be positioned below the opening 320 and enable one or more flanges 350 of the plunger 345 to extend through the recess 325 into the opening 320. The one or more flanges 350 may then be secured within respective receiving slots 335 of the button portion 330.

Figure 11B:
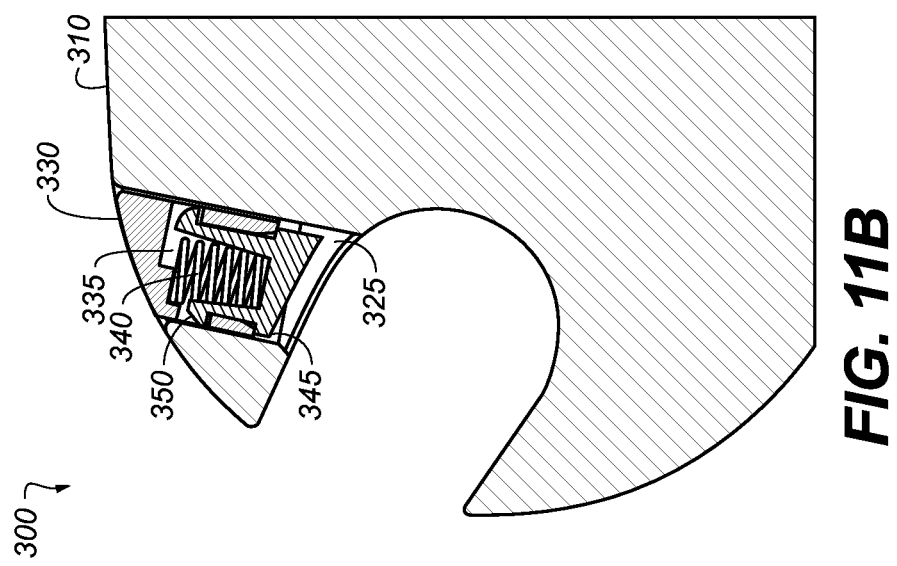
FIG. 11B illustrates an assembled side cross-section view of the release mechanism of the attachment system that is integrated within the housing of the consumer product according to one or more embodiments of the present disclosure.

FIG. 11B illustrates a side cross-section view (e.g., cross-section view CC of FIG. 6A) of an assembled release mechanism contained within the housing 300 of an electronic device according to one or more embodiments of the present disclosure. As shown in FIG. 11B, because the plunger 345 is coupled to the button portion 330, the plunger 345 is positioned within a top portion of the recess 325 and is flush or substantially flush with the outer surface 310 of the housing 300. When the plunger 345 is positioned within the top portion of the recess 325, the recess 325 includes a space that is configured to receive at least a portion of a locking mechanism. Once the portion of the locking mechanism is received into the recess, subsequent actuation of the button portion 330 causes the plunger 345 to move within the recess 325 and expel the portion of the locking mechanism that is contained within the recess 325. As also shown, the spring mechanisms 340 are secured between the plunger 345 and the button portion 330 when the one or more flanges 350 are received into corresponding receiving slots 335.

Figure 12A:
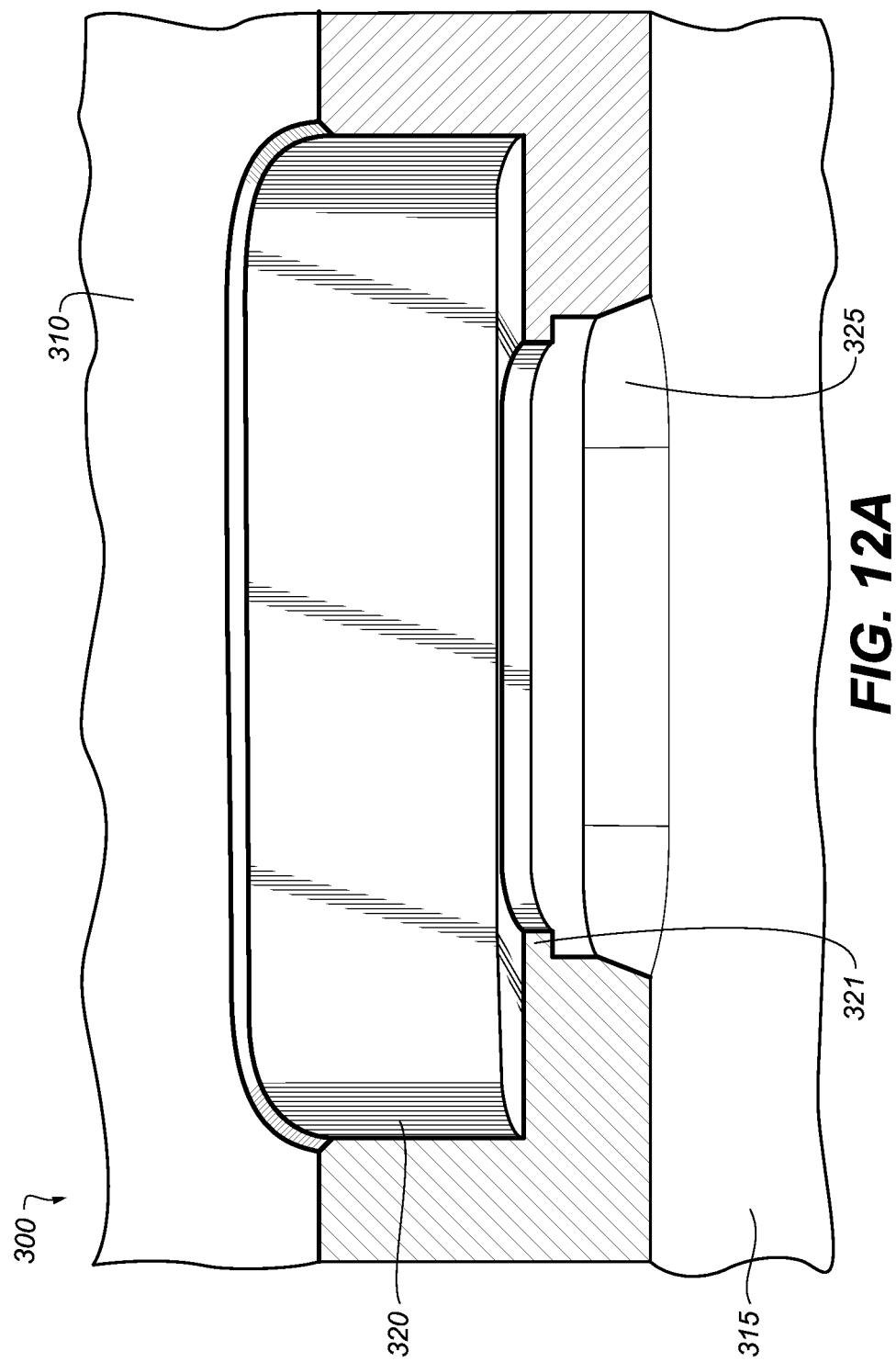
FIG. 12A illustrates a front cross-section view of an opening of a housing of a consumer product according to one or more embodiments of the present disclosure.
Figure 12B:
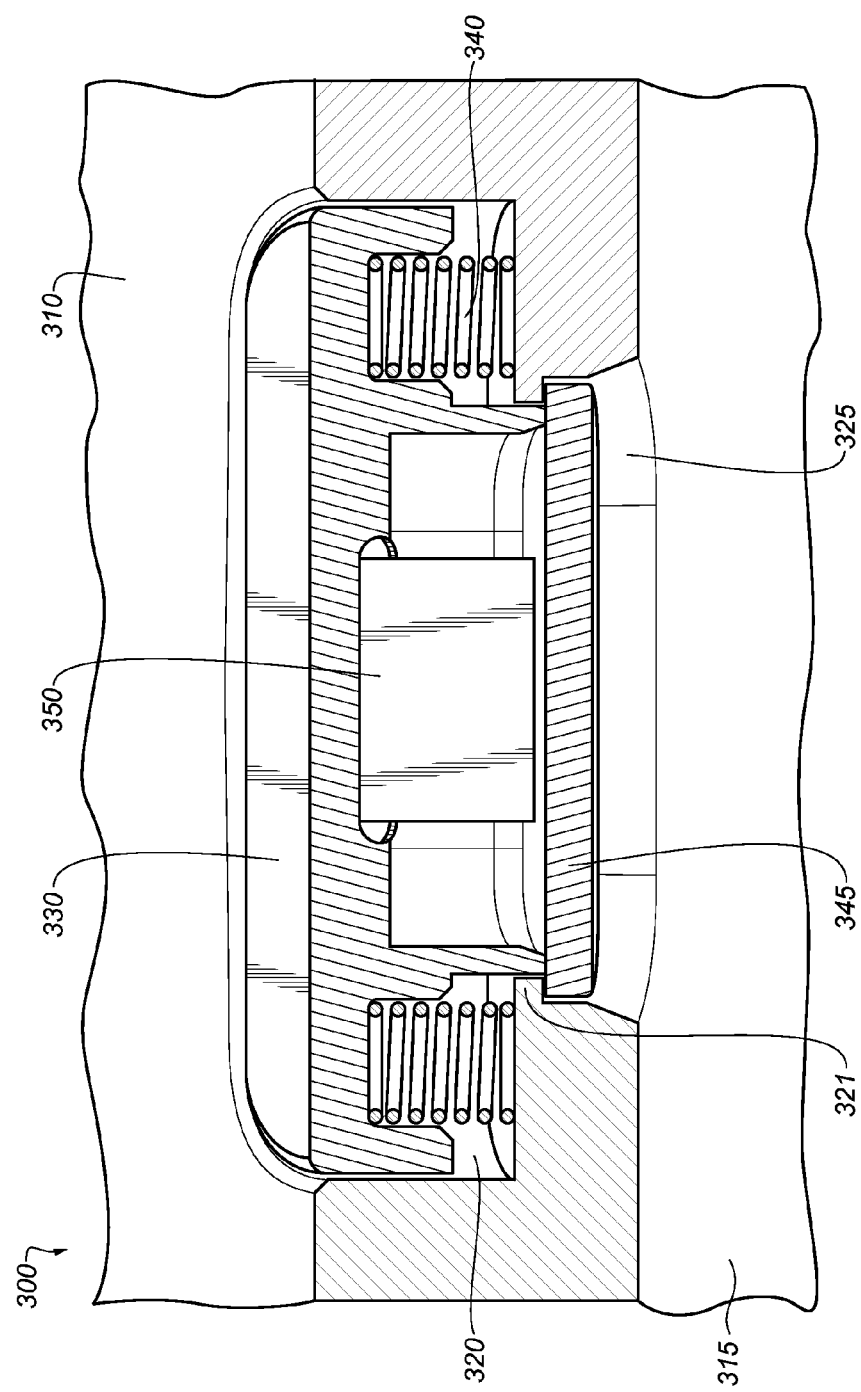
FIG. 12B illustrates a front cross-section view of an assembled release mechanism in the opening of the housing of the consumer product according to one or more embodiments of the present disclosure.

FIG. 12A illustrates a front cross-section view (e.g., cross-section view DD of FIG. 6A) of the opening 320 of the housing 300 of the electronic device according to one or more embodiments of the present disclosure and FIG. 12B illustrates a front cross-section view (e.g., cross-section view DD of FIG. 6A) of an assembled release mechanism in the opening 320 of the housing 300 of the electronic device according to one or more embodiments of the present disclosure. In certain embodiments, the opening 320 is positioned above a recess 325 that is positioned in or defined by a channel 315 of the housing 300.

The opening 320 and the recess 325 may be at least partially separated by an outer ledge 321. As shown in FIG. 12B, the outer ledge 321 is configured to hold the spring mechanisms 340 such that the spring mechanisms 340 bias the top surface of the button portion 330 of the release mechanism flush or substantially flush with respect to the outer surface 310 or top surface of the housing 300. Further, the outer ledge 321 is also configured to retain the plunger 345 of the release mechanism in the recess 325.

As also shown in FIG. 12B, a pass-through is provided between the opening 320 and the recess 325. In certain embodiments, the pass-through enables one or more components of the plunger 345 (e.g., flanges 350) to extend from the recess 325 into the opening 320 and be coupled to the button portion 330.

FIG. 13A illustrates a front cross-section view (taken at cross-section AA of FIG. 6A) of a removable module 205 being partially inserted into a channel 315 of a housing 300 of a consumer product according to one or more embodiments of the present disclosure. As shown in FIG. 13A, the removable module 205 may include a locking mechanism having a catch member 220 and a ramp 235. In certain embodiments, the catch member 220 is moveably coupled to the ramp 235 using one or more flanges 245 that extend from the ramp 235.

According to various embodiments, the catch member 220 may be spring-biased flush with respect to a body 210 of the attachment system while the ramp 235 may be spring-biased proud with respect to the body 210 of the removable module 205. Specifically, the locking mechanism may include a first set of spring mechanisms 250 coupled to or secured by one or more protrusions 240 that cause the catch member 220 of the locking mechanism and the ramp 235 of the locking mechanism to be biased away from each other. In addition, a second set of spring mechanisms 255 may cause the ramp 235 to be biased proud with respect to the body 210 of the removable module 205. The second set of spring mechanisms 255, along with the flange 245, may also cause the catch member 220 to be biased flush with respect to the body 210 of the removable module 205.

As discussed above, in certain embodiments, the flange 245 is secured to the catch member 220 via an aperture 230. In such embodiments, the flange 245 may initially latch to a bottom portion of the aperture 230 such as shown in FIG. 8B. However, as also discussed with respect to FIG. 8B, the flange 245 may be configured to move within the aperture 230. Specifically, as the ramp 235 is compressed, the flange 245 may move from a first position (in which the overhang of the flange 245 is in contact with the bottom portion of the aperture 230) within the aperture 230 to a second position within the aperture 230. Likewise, when the ramp 235 is spring-biased proud, the flange 245 may exert a downward force (e.g., a force toward to the ramp 235) on aperture 230 of the catch member 220 that holds or causes the catch member 220 to be flush or substantially flush with respect to the body 210 of the removable module 205.

The catch member 220 may have a length that is substantially equal to or slightly greater than a length of the ramp 235. For example, the catch member 220 may have a length of 2.5 mm while the ramp 235 has a length of 2.0 mm. Although specific measurements are given, the ramp 235 and the catch member 220 may have any lengths. Although the catch member 220 is configured to be flush or substantially flush with respect to the top surface of the body 210, when the catch member 220 extends from the top surface of the body 210 (as a result of the ramp 235 being actuated), the catch member 220 may extend past the top surface of the body 210 by approximately 0.38 mm.

The lengths of each of the catch member 220 and the ramp 235 may affect how the removable module 205 is received into the channel 315 of the housing 300. For example, compression of the ramp 235 may cause the catch member 220 to extend or protrude from the body 210 of the removable module 205. However, if the catch member 220 extends from the body 210 of the removable module 205 prior to the catch member 220 being inserted into the channel 315, the removable module 205 may be prohibited from fully entering the channel 315 (without actuation of the catch member 220 to re-compress the catch member 220) as the protruded catch member 220 will come into contact with the side of the channel 315 or the side of the housing 300.

However, even in embodiments where the catch member 220 may protrude from the housing, either by the ramp 235 being compressed, or by not being flush or substantially flush with respect to the top surface of the removable module 205, contact between the catch member 220 and the channel 315 may cause the catch member 220 to begin to compress. Specifically, the channel 315 may contact a sidewall 225 of the catch member 220 (or a chamfered edge of the catch member when a chamfered edge is present) and cause the catch member 220 to compress such that the catch member 220 is received within the body 210 of the removable module 205. Once the catch member 220 has been compressed, the catch member 220 may enter the channel 315.

In addition to the features of the catch member 220 discussed above, the shape and/or length of the ramp 235 may enable at least a portion of the catch member 220 to be inserted into the channel 315 prior to the ramp 235 being compressed. Such a configuration may also help prevent the catch member 220 from outer expansion prior to a portion of the catch member 220 being inserted into the channel 315.

For example, as shown in FIG. 13A, a length 223 of the catch member 220 is received into the channel 315 of the housing prior to the ramp 235 coming into contact with an outer edge of the channel 315. As the removable module 205 is inserted farther into the channel 315, the first set of spring mechanisms 250 and the second set of spring mechanisms 255 enable the ramp 235 to be compressed. However, because the length 223 of the catch member 220 is contained within the channel 315 of the housing 300, the catch member 220 cannot fully expand. Further, as the removable module 205 is inserted into the channel 315, one or more friction pads 260 may maintain the spacing between the removable module 205 and the channel 315.

Figure 13B:
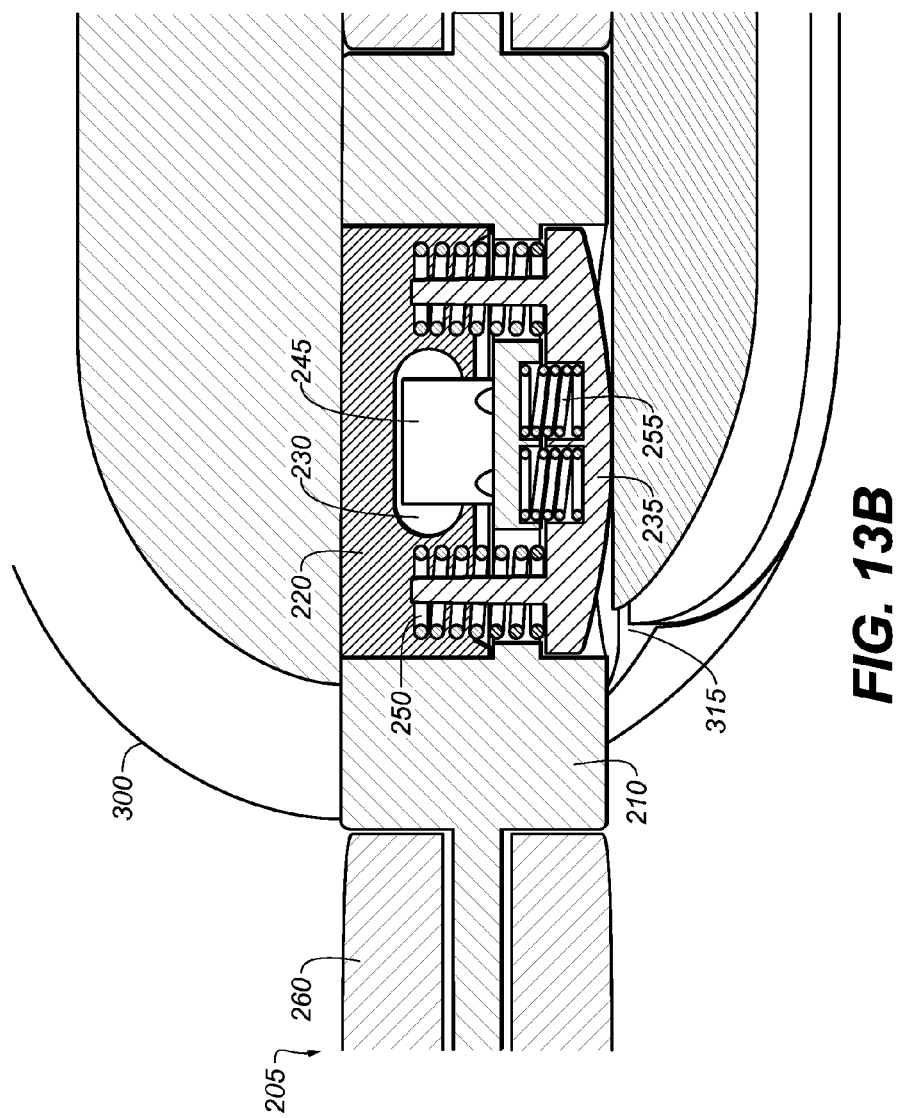
FIG. 13B illustrates a front cross-section view of the removable module of the attachment system being inserted farther into the channel of the attachment system that is integrated with the housing of the consumer product such that a locking mechanism of the attachment system is in a compressed state according to one or more embodiments of the present disclosure.

Further, as shown in FIG. 13B, as the removable module 205 is inserted farther into the channel 315 of the housing 300, the channel 315 causes the ramp 235 and the second set of spring mechanisms 255 to continue to compress until the bottom rounded surface of the ramp 235 is flush or substantially flush with respect to the body 210 of the removable module 205. As the ramp 235 is compressed the one or more flanges 245 move within the aperture 230. As also shown in FIG. 13B, compression of the ramp 235 and the second set of spring mechanisms 255 also causes the first set of spring mechanisms 250 to compress. However, because the catch member 220 is contained within the channel 315, the locking mechanism remains in a compressed state as shown. In some embodiments, the position of the body 210 of the removable module 205 shown in FIG. 13B may be equivalent to the position of the body 210 of the removable module 205 shown and described above with respect to FIG. 5B and FIG. 6B.

Figure 13C:
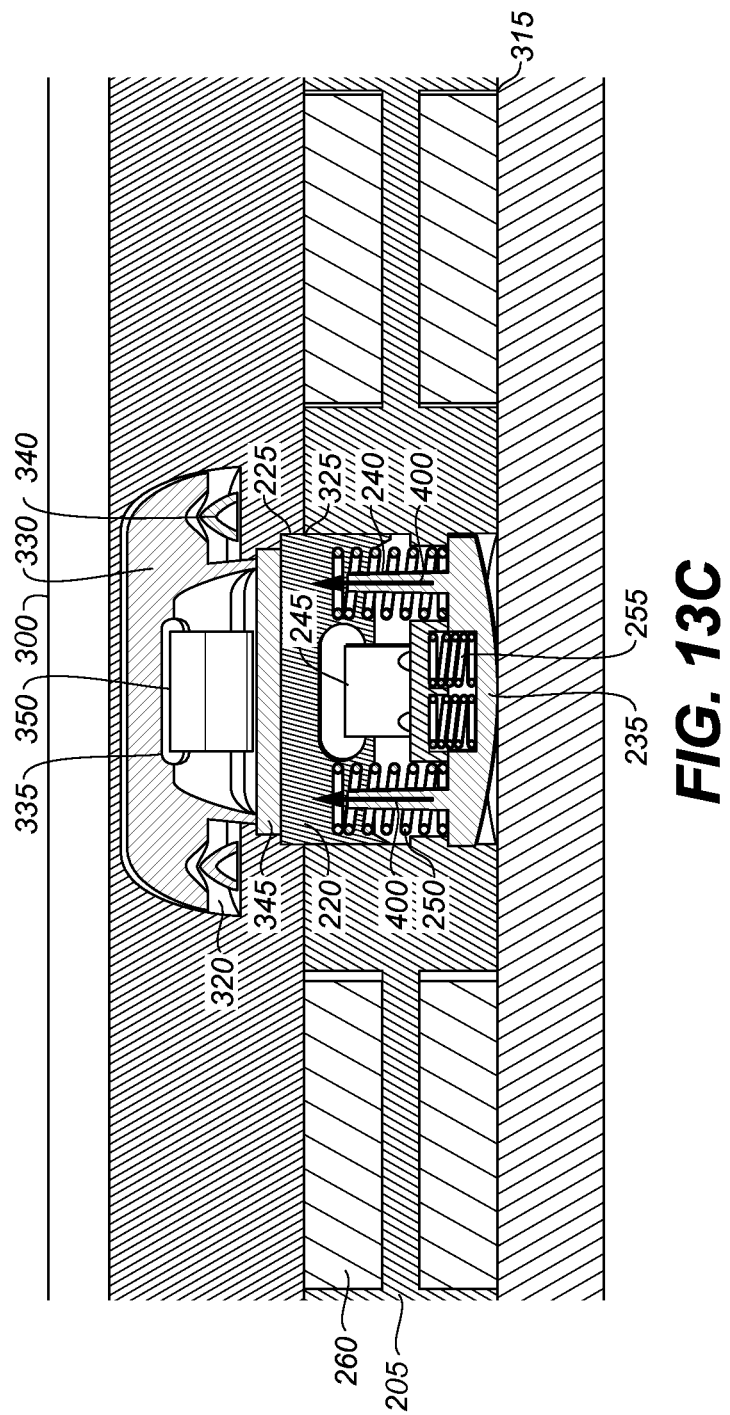
FIG. 13C illustrates a front cross-section view of the locking mechanism fully inserted into the channel of the housing in which a catch member of the locking mechanism is engaged with a recess formed in the channel of the housing of the consumer product according to one or more embodiments of the present disclosure.

FIG. 13C illustrates a front cross-section view (taken for example at cross-sections AA and DD of FIG. 6A) of a locking mechanism of a removable module 205 in which a catch member 220 of the locking mechanism is contained within a recess 325 of a channel 315 of a housing 300. As shown in FIG. 13C, when the removable module 205 has been inserted into a channel 315 of the housing 300 and the catch member 220 comes into contact with the recess 325 in the channel 315, the first set of spring mechanisms 250 expand. The expansion of the first set of spring mechanisms 250 causes the catch member 220 to move in the direction of arrows 400 and the catch member 220 is received into the recess 325 which locks the removable module 205 in place. In some embodiments, the catch member 220 extends into the recess 325 approximately 0.38 mm although other distances are contemplated. In some embodiments, the position of the body 210 of the removable module 205 shown in FIG. 13C may be equivalent to the position of the body 210 of the removable module 205 shown and described above with respect to FIG. 5C and FIG. 6C.

The catch member 220 may include a chamfered edge. In such embodiments, the recess 325 may also be chamfered so as to receive the chamfered edge of the catch member 220. Such a configuration may help eliminate movement of the removable module 205 when the removable module 205 has been locked in place within the channel 315.

As also shown in FIG. 13C, as the catch member 220 expands into the recess 325, the catch member 220 may expand outwardly until it comes into contact with the plunger 345 of the release mechanism. More specifically, the planar or substantially planar top surface of the catch member 220 may come into contact with the planar or substantially planar bottom surface of the plunger 345. Thus, in response to actuation of the button portion 330 of the release mechanism, the plunger 345 does not travel prior to coming into contact with the catch member 220.

Figure 14A:
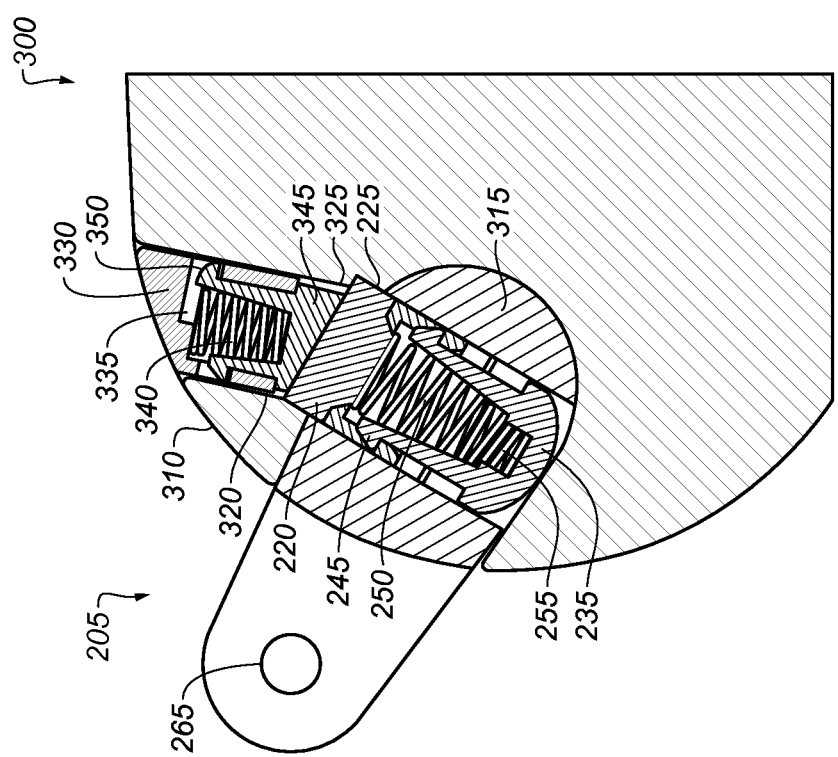
FIG. 14A illustrates a side cross-section view of a locking mechanism of an attachment system being received into a recess formed in a channel of a housing of a consumer product according to one or more embodiments of the present disclosure.

FIG. 14A illustrates a side cross-section view (taken for example at cross-sections BB and CC of FIG. 6A) of a locking mechanism of a removable module 205 that has been received into a recess 325 of a channel 315 of a housing 300 of a consumer product according to one or more embodiments of the present disclosure. Specifically, as shown in FIG. 14A, when the removable module 205 has been inserted into a channel 315 of the housing 300, the removable module 205 may travel within the channel 315 until the catch member 220 is below the recess 325 in the channel 315. Once the catch member 220 is below the recess 325 in the channel 315, the first set of spring mechanisms 250 expand which causes the sidewalls 225 of the catch member 220 to be received into the channel 315. As also shown in FIG. 14A, the catch member 220 may expand into the recess 325 until it comes into contact with the plunger 345 of the release mechanism.

The removable module 205 may be equally or substantially equally spaced within the channel 315. As discussed above, one or more friction pads (not shown) may be disposed on the removable module 205 and used to maintain the spacing between the channel 315 and the removable module 205.

Figure 14B:
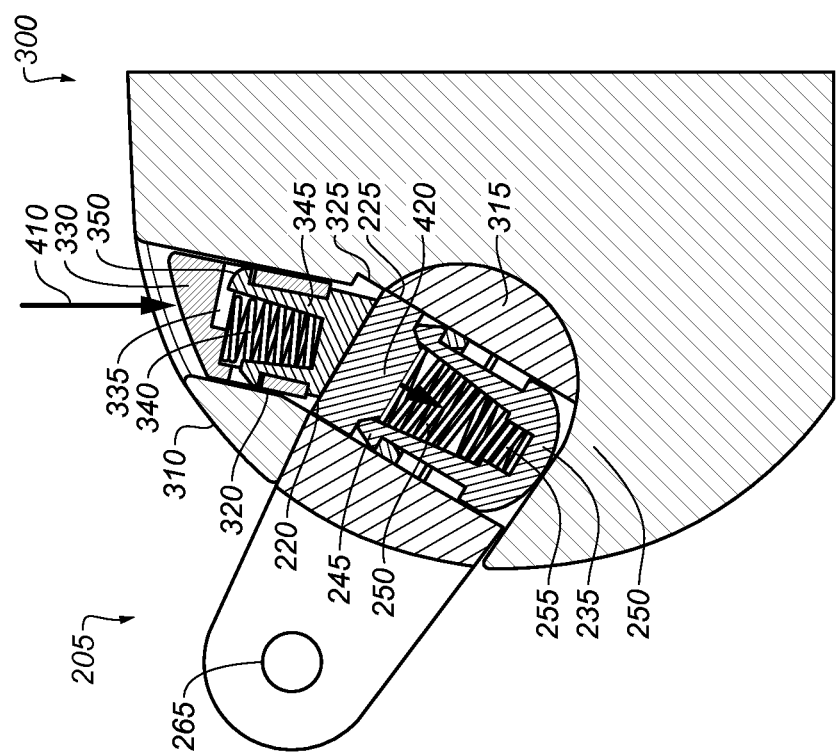
FIG. 14B illustrates actuation of a release mechanism of the attachment system that is integrated with a housing of the consumer product according to one or more embodiments of the present disclosure.

FIG. 14B illustrates actuation of a release mechanism contained within a housing 300 of a consumer product according to one or more embodiments of the present disclosure. Specifically, FIG. 14B when compared with FIG. 14A illustrates the interplay between the release mechanism contained within the housing 300 of the consumer product and the locking mechanism contained in the removable module 205.

As shown in FIG. 14B, when the button portion 330 of the release mechanism is actuated in the direction of arrow 410, the button portion 330 travels below the outer surface 310 of the housing 300. More specifically, the spring mechanisms 340 in the release mechanism compress and enable the button portion 330 to move within the opening 320 of the housing 300. Because the plunger 345 of the release mechanism is coupled to the button portion 330, actuation of the button portion 330 also causes the plunger 345 to move from a first position in the recess 325 (e.g., the position shown in FIG. 14A) to a second position within the recess 325 such as shown in FIG. 14B.

The second position of the plunger 345 may be a position in which the planar or substantially planar bottom surface of the plunger 345 is flush or substantially flush with respect to the channel 315. As further shown in FIG. 14B, as the plunger 345 moves from the first position to the second position, the plunger 345 causes the catch member 220 of the locking mechanism to move in the direction of arrow 420. Specifically, the plunger 345 causes the first set of spring mechanisms 250 within the locking mechanism to compress. As the first set of spring mechanisms compress, the catch member 220 is expelled from the recess 325. Once the catch member 220 has been removed from the recess 325, the removable module 205 may move within the channel 315.

Figure 15:
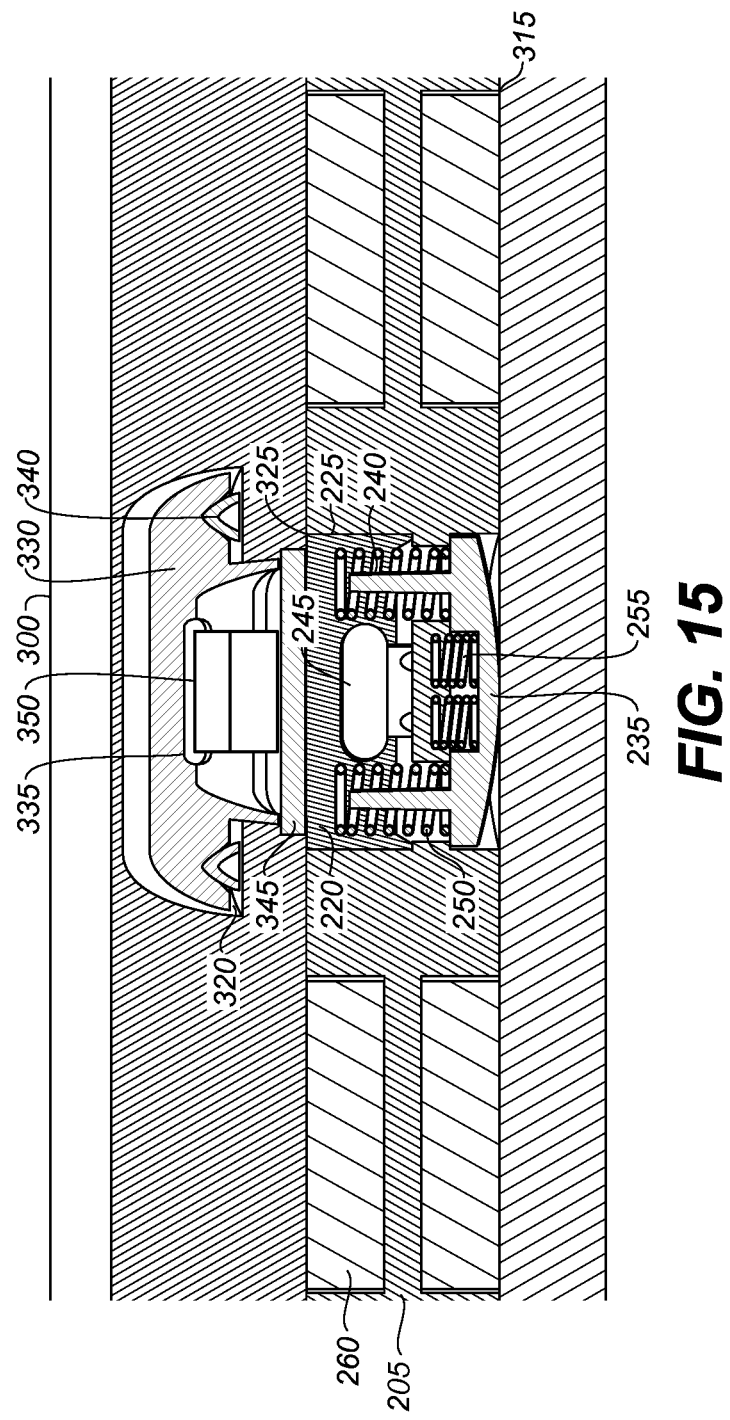
FIG. 15 illustrates a front cross-section view of an actuation of a release mechanism of the attachment system that is integrated with a housing of a consumer product according to one or more embodiments of the present disclosure.

FIG. 15 illustrates a front cross-section view of an actuated release mechanism contained within a housing 300 of a consumer product according to one or more embodiments of the present disclosure. More specifically, FIG. 15, when compared with FIG. 13C, illustrates the interplay between the release mechanism contained within the housing 300 of the consumer product and the locking mechanism contained in the removable module 205.

For example, as shown in FIG. 15, when the button portion 330 of the release mechanism is actuated, the spring mechanisms 340 in the release mechanism compress and enable the button portion 330 to move within the opening 320 of the housing 300. Actuation of the button portion 330 also causes the plunger 345 of the release mechanism to move from a first position in the recess 325 (e.g., the position shown in FIG. 13C) to a second position within the recess 325 such as shown in FIG. 15. In certain embodiments, the second position may be a position in which the planar or substantially planar bottom surface of the plunger 345 is flush or substantially flush with respect to the channel 315. As the plunger 345 moves from the first position to the second position, the plunger 345 causes the first set of spring mechanisms 250 to compress which enables the catch member 220 to be removed from the recess 325. Once the catch member 220 has been removed from the recess 325, the removable module 205 may move within the channel 315.

FIG. 16A illustrates an exploded perspective view of a locking mechanism of a removable module 500 of an attachment system according to one or more alternative embodiments of the present disclosure. The removable module 500 shown and described with respect to FIG. 16A may be used with embodiments shown and described above. As such, the removable module 500 may be inserted into a housing of a consumer product such as consumer product 180 of FIG. 4A. Further, the removable module 500 may be removably connected to a band, a strap, a dock, a stand, a display system and the like.

The removable module 500 includes a body 510. The body 510 may be elongated and rounded such as shown in FIG. 16A. In certain embodiments, the body 510 may have dimensions similar to those described above with respect to body 210 of FIG. 7A. In certain embodiments, the body 510 includes a proximal end and a distal end. Although not required, each of the proximal end and the distal end may include an arm 513 that extends beyond the body 510. That is, is some implementations, the removable module 500 may include a body 510 without arms 513. In other implementations, the body 510 may include a channel, aperture or other such opening in which a band or other accessory may be placed.

Although rounded chamfered arms 513 are specifically shown and described with respect to FIG. 16A, the proximal end and the distal end of the removable module 500 may be in any shape or configuration based on the shape of the housing, the shape of the channel within the housing or based on a desired aesthetic of the removable module 500.

The removable module 500 may also include an opening 515 disposed within the body 510. The opening 515 may be configured to receive a catch member 520 of a locking mechanism and enable the catch member 520 to move within the opening 515. However, as shown in FIG. 16A, the locking mechanism of this example embodiment excludes a ramp.

The catch member 520 may be made of plastic, aluminum, stainless steel or any other material or combination of materials. The catch member 520 may be configured in a rounded oblong shape and include a planar or substantially planar top surface. In certain embodiments, the catch member 520 may have similar dimensions to those described above with respect to the catch member 220 (FIG. 7A) although other dimensions may be used.

The planar or substantially planar top surface of the catch member 520 may be surrounded or substantially surrounded by a chamfered edge 525 that facilitates actuation of the catch member 520 as the removable module 500 is inserted into a channel or removed from a recess or other opening within the channel. In other implementations, the catch member 520 may have a rounded or substantially non-planar top surface that is conducive to enabling the catch member 520 to be actuated as the catch member 520 comes into contact with a channel of the housing. As such, the chamfered edge 525 may not be needed.

In some implementations, the catch member 520 may be actuated by force applied by a tool or a user. Once the catch member 520 has been actuated by the user applied force, the removable module 500 may be inserted into a channel of the housing.

More specifically, the catch member 520 may protrude from the body 510 of the removable module 500. In order to fully insert the removable module 500 into the channel, the catch member 520 may need to be flush or substantially flush with respect to the body 510. As such, an individual or tool may need to manually compress or physically actuate the catch member 520 to enable the catch member 520, and subsequently the body 510 of the removable module 500 to be inserted into the channel. Although manual actuation of the catch member is specifically discussed with the embodiment shown in FIG. 16A and FIG. 16B, manual actuation of the catch member 520 may be used with the other embodiments described herein.

The removable module 500 may also include a set of spring mechanisms 530. The set of spring mechanisms 530 may enable the catch member 520 to move from an extended position in which the catch member 520 is biased proud with respect to a top surface of the body 510 of the removable module 500 (as shown in FIG. 16B) to a contracted position in which a top surface of the catch member 520 is flush or substantially flush with respect to the top surface of the body 510 of the removable module 500. Although two spring mechanisms 530 are shown and described, the set of spring mechanisms 530 may include any number of spring mechanisms.

Although not required, the removable module 500 may also include one or more friction pads 540. The friction pads 540 may have dimensions similar to those described above with respect to friction pads 260 (FIG. 7A). Further, although the friction pads 540 are shown in a rounded oblong configuration, the friction pads 540 may be configured in various shapes with varying dimensions.

For example, a top surface of the body 510 may include multiple friction pads 540 while a bottom surface of the body 510 may include a single friction pad 540 that extends partially or entirely along the bottom surface of the body 510. In another embodiment, three friction pads 540 may be positioned on the bottom surface of the body 510 and located opposite from the two friction pads 540 and the catch member 520 located on the top surface of the body 510. In certain embodiments, the friction pads 540 may be made of plastic, nylon or other such material that is conducive to reducing friction between two surfaces.

The body 510 of the removable module 500 may include one or more recesses in which the friction pads 540 may be placed. In alternative embodiments, the friction pads 540 may be placed directly on top, bottom and/or side surfaces of the body 510 of the removable module 500. The friction pads 540 may be disposed in one or more openings that extend entirely though an axis of the body 510 of the removable module 500.

The friction pads 540, or at least a portion of each friction pad 540, may extend or protrude from one or more surfaces of the body 510 of the removable module 500. The portion of the friction pad 540 that extends beyond the surface of the body 510 of the removable module 500 may be used to: (1) increase friction between the removable module 500 and the channel of the housing of the consumer product into which the removable module 500 is inserted so as to reduce undesired movement, rattling, and/or noise caused by any movement of the removable module 500; and (2) maintain or substantially maintain spacing between the surfaces of the removable module 500 and a surface of a channel of the housing of the consumer product into which the removable module 500 is inserted.

The removable module 500 may also include one or more engagement features 550 according to various embodiments. As shown in FIG. 16A, the one or more engagement features 550 may be placed on inner sides of the arms 513 that extend from each of the proximal end and the distal end of body 510 of the removable module 500. The one or more engagement features 550 may be used to secure a band or a strap (not shown) to the removable module 500 such as described above with respect to FIG. 5B.

FIG. 16B illustrates a perspective view of an assembled locking mechanism of FIG. 16A according to one or more embodiments of the present disclosure. As shown in FIG. 16B, the catch member 520 of the locking mechanism is placed within the body 510 of the removable module 500 such that the top surface of the catch member 520 is spring-biased proud with respect to a top side of the body 510 of the removable module 500. Although the catch member 520 is spring-biased proud with respect to the top side of the body 510, the set of spring mechanisms 530 enable the catch member 520 to compress which causes the catch member 520 to move from a first position, such as shown in FIG. 16B, to a second position in which the top surface of the catch member 520 is flush or substantially flush with respect to the top side of the body 510 of the removable module 500.

Figure 17:
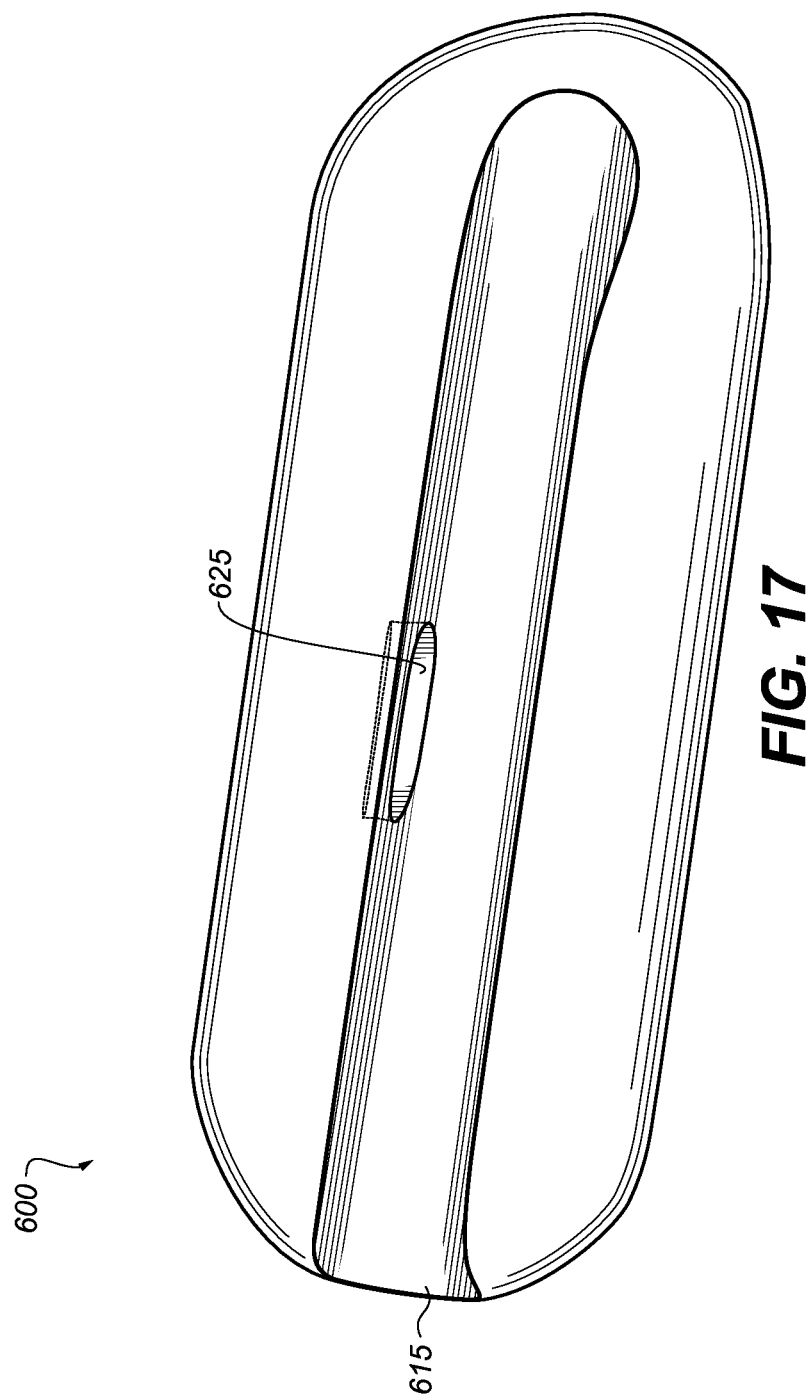
FIG. 17 illustrates an attachment system that is integrated with a consumer product that is configured to receive the removable module of FIG. 16B according to one or more embodiments of the present disclosure.

FIG. 17 illustrates a portion of a 600 housing of a consumer product configured to receive the removable module 500 of FIG. 16A and FIG. 16B according to one or more embodiments of the present disclosure. Although housing 600 is shown and described as receiving the removable module 500, other embodiments of the housings shown and described herein may also be used in conjunction with the removable module 500. For example, the removable module 500 may be releasably received in housing 300 shown and described above.

The housing 600 may be made of stainless steel, aluminum, plastic or any other suitable material. The housing 600 may include a channel 615 that extends from a first side of the housing 600 to a second side of the housing 600. Although the channel 615 is shown as extending completely from a first side of the housing 600 to a second side of the housing 600 in FIG. 9, the channel 615 may partially extend from a first side of the housing 600 to a second side of the housing 600 such that one of the ends of the channel 615 ends at an inner wall (not shown) of the housing 600.

The channel 615 may have a rounded configuration and be positioned at an angle with respect to the housing 600 such as described above with respect to FIG. 4C. The housing 600 also includes a recess 625 disposed within the channel 615 of the housing 600. The recess 625 is configured to receive a catch member of a locking mechanism such as, for example, catch member 520 (FIG. 13A).

In embodiments, the recess 625 may be shaped to release and/or cause the catch member of the locking mechanism to compress when a force is applied to a proximal end or a distal end of a removable module that is received within the channel 615. For example, as force is applied to one end of the removable module, an edge of the recess 625 may cause the catch member of the removable module to begin to compress. As the removable module continues to move in the direction of the applied force, the catch member continues to compress until it reaches a fully compressed state (e.g., a state in which the top surface of the catch member is substantially contained within a body of the removable module). Once the catch member is in a fully compressed state, the removable module may freely move within the channel 615 of the housing 600.

Figure 18A:
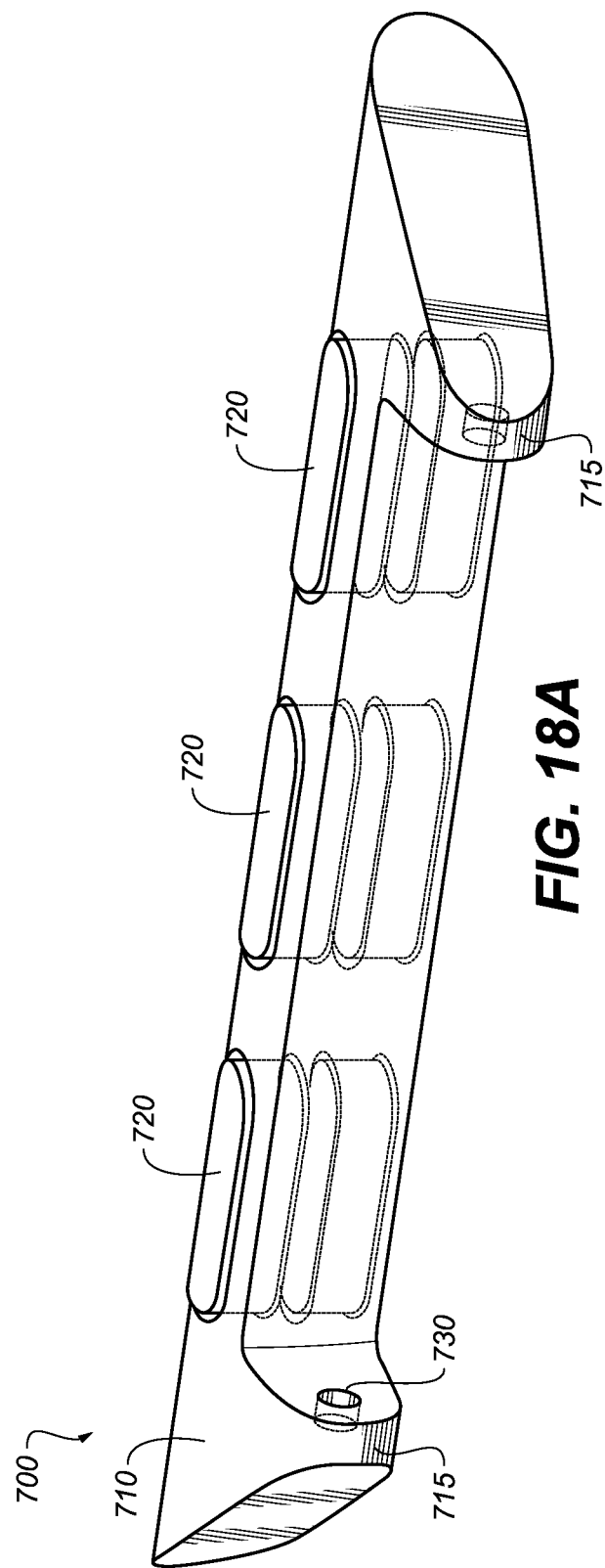
FIG. 18A illustrates a removable module of an attachment system according to one or more alternative embodiments of the present disclosure.

FIG. 18A illustrates a removable module 700 of an attachment system according to one or more alternative embodiments of the present disclosure. In certain embodiments, the removable module 700 includes a body 710. The body 710 may be elongated and rounded such as shown in FIG. 17. In certain embodiments the body 710 may have dimensions similar to those described above with respect to body 210 of FIG. 7A.

As shown in FIG. 18A, the body 710 includes a proximal end and a distal end and, although not required, each of the proximal end and the distal end may include an arm 715 that extends beyond the body 710. Although rounded chamfered arms 715 are specifically shown and described, the arms 715, as well as the proximal end and the distal end of the removable module 700 may be in any shape or configuration based on the shape of the housing, the shape of the channel within the housing or based on a desired aesthetic of the removable module 700.

The removable module 700 may also include one or more friction pads 720 disposed on one or more surfaces of the removable module 700. For example, a top surface of the removable module 700 may include one or more friction pads 720 and the bottom surface of the removable module 700 may also include one or more friction pads 720. In certain embodiments, the friction pads 720 may be made of plastic, nylon or other such material that is conducive to reducing friction between two surfaces. In embodiments, the friction pads 720 may have dimensions similar to those described above with respect to friction pads 260 (FIG. 7A). Further, although the friction pads 720 are shown in a rounded oblong configuration, the friction pads 720 may be configured in various shapes with varying dimensions.

The body 710 of the removable module 700 may include one or more recesses in which the friction pads 720 may be placed. In alternative embodiments, the friction pads 720 may be placed directly on top, bottom and/or side surfaces of the body 710 of the removable module 700. Further, the friction pads 720 may be disposed in one or more openings that extend entirely though an axis of the body 710 of the removable module 700. In some embodiments, a friction pad 720 may be integrated with or otherwise a part of a ramp 235 (FIG. 7A) and/or a catch member 220 (FIG. 7A).

The friction pads 720, or at least a portion of each friction pad 720, may extend or protrude 0.11 mm or more from one or more surfaces of the body 710 of the removable module 700. In such embodiments, the portion of the friction pad 720 that extends beyond the surface of the body 710 of the removable module 700 may be removably received into corresponding recesses in a channel of a housing such as, for example, recesses 820 of FIG. 18B. Further, the friction pads 720 may be used to: (1) increase friction between the removable module 700 and the channel of the housing of the consumer product into which the removable module 700 is to be inserted so as to reduce undesired rattling or movement of the removable module 700; and (2) maintain or substantially maintain spacing between the surfaces of the removable module 700 and a surface of a channel of the housing of the consumer product into which the removable module 700 is to be inserted.

The removable module 700 may also include one or more engagement features 730 according to various embodiments. As shown in FIG. 18A, the one or more engagement features 730 may be placed on inner sides of the arms 715 that extend from each of the proximal end and the distal end of body 710 of the removable module 700. The one or more engagement features 730 may be used to secure a band or a strap (not shown) to the removable module 700 such as described above with respect to FIG. 7A.

Figure 18B:
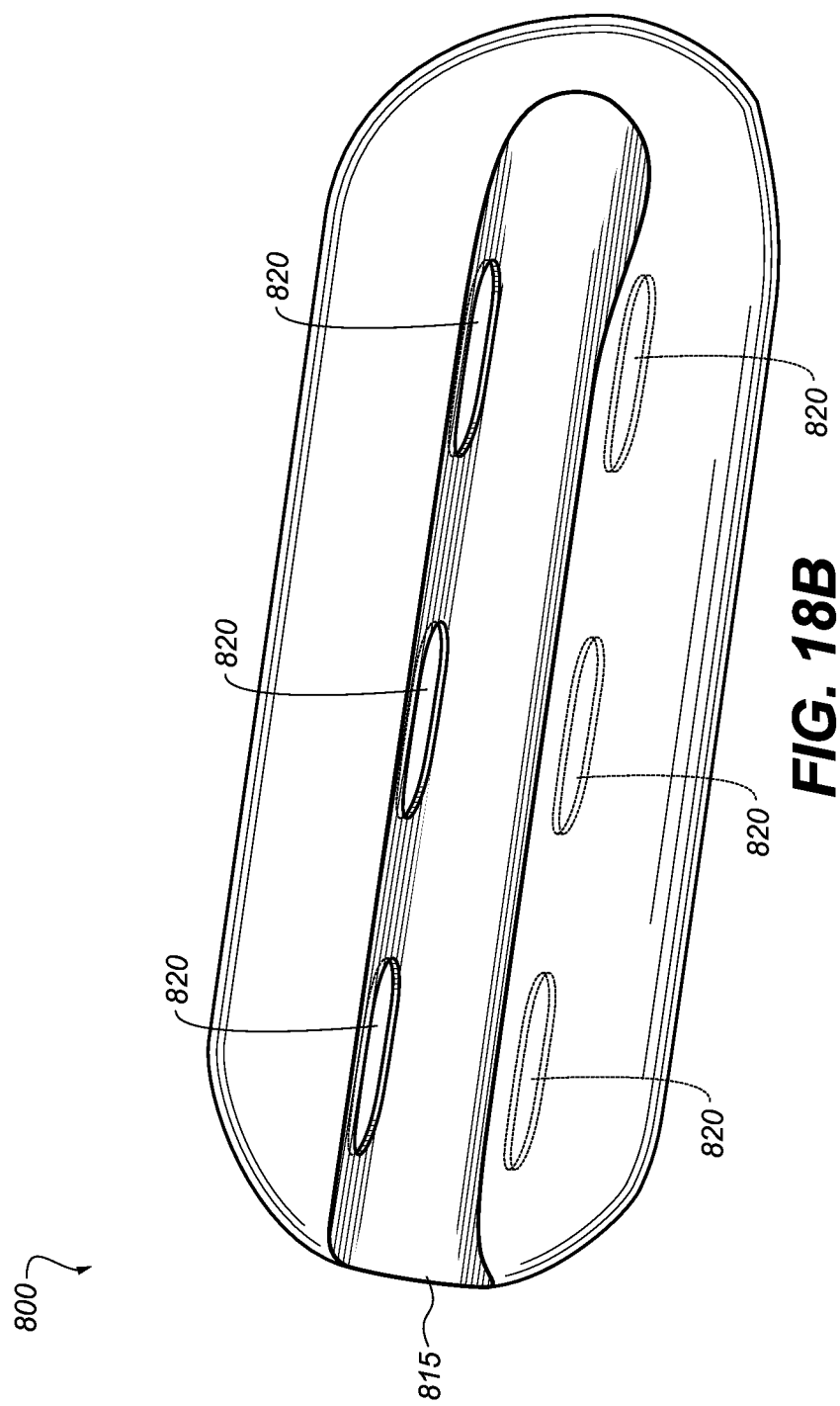
FIG. 18B illustrates an attachment system that is integrated with a consumer product that is configured to receive the attachment system of FIG. 18A according to one or more embodiments of the present disclosure.

FIG. 18B illustrates a housing 800 of a consumer product configured to receive the removable module 700 of FIG. 18A according to one or more embodiments of the present disclosure. In certain embodiments the housing 800 may be part of an attachment system and be made of stainless steel, aluminum, plastic or any other suitable material. The housing 800 may include a channel 815 that extends from a first side of the housing 800 to a second side of the housing 800 such as shown in FIG. 18B. Although the channel 815 is shown as extending completely from a first side of the housing 800 to a second side of the housing 800, the channel 815 may partially extend from a first side of the housing 800 to a second side of the housing 800 such that one of the ends of the channel 815 ends at an inner wall (not shown) of the housing 800.

In certain embodiments, the channel 815 may have a rounded configuration and be positioned at an angle with respect to the housing 800. The housing 800 may also include a plurality of recesses 820.

In certain embodiments, the plurality of recesses 820 may be used to receive at least a portion of a friction pad, such as, for example, friction pad 720 (FIG. 18A). For example and as discussed above, a portion of a friction pad may protrude from a surface of a removable module. Accordingly, one or more recesses 820 disposed in the channel 815 may be shaped to receive the protruded portion of the friction pad when the removable module is placed within the channel 815. As the removable module slides within the channel 815, the protruded portion of the friction pad may be received into the recesses 820. As a result, the removable module may be locked in place. Similarly, when a force is exerted on a proximal end or a distal end of the removable module, the force causes the friction pads to compress or otherwise be removed from the recesses 820 which enables the removable module 700 to slide within the channel 815.

Figure 19:
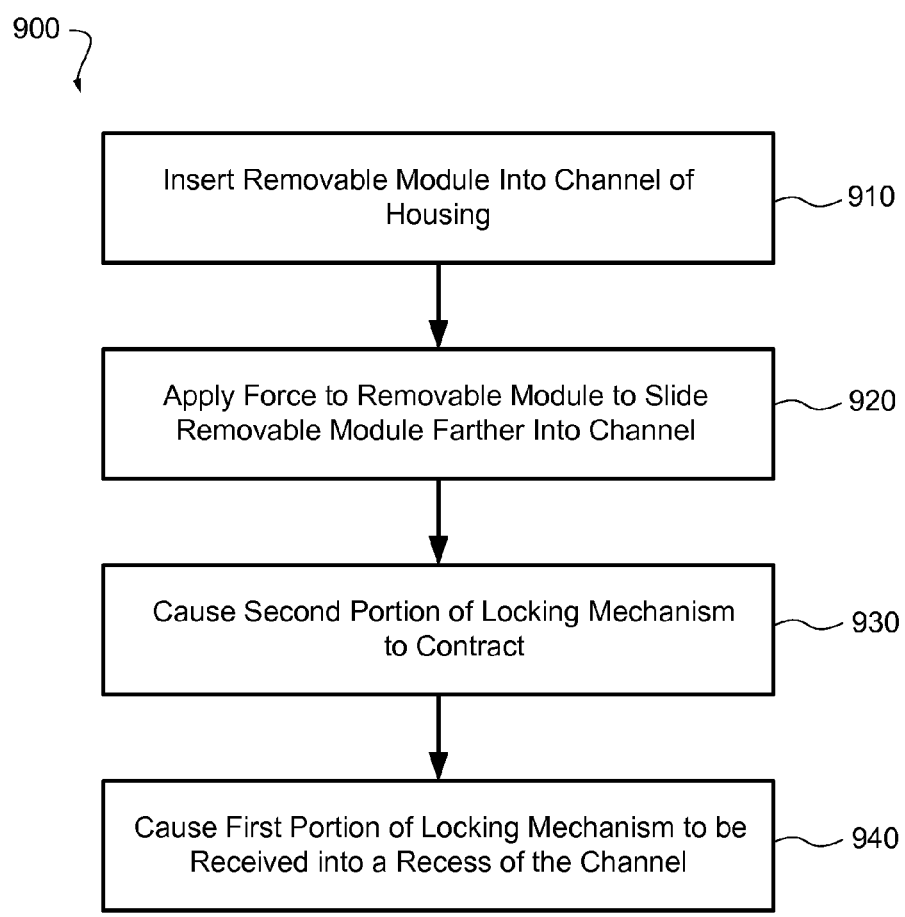
FIG. 19 illustrates an example process of inserting and securing a removable module to a consumer product according to one or more embodiments of the present disclosure.

FIG. 19 illustrates a method 900 of inserting and securing a removable module of an attachment system into a channel of a housing or component of a consumer product according to one or more embodiments of the present disclosure. The method 900 may be used to insert various attachment systems into various channels, components, apertures, and the like such as described herein. For example, method 900 may be used to insert the removable module 205 shown and described with respect to FIG. 7A-FIG. 9C into a channel 315 of a housing 300 shown and described with respect to FIG. 10A-FIG. 12B. Although specific attachment systems, including removable modules and channels are described, the method 900, or portions thereof, may be used to insert any of the removable modules described herein into any of the channels of the various devices described herein.

Method 900 begins when a removable module or engagement node is inserted 910 into a channel of the housing of a consumer product. More specifically, a head portion of a removable module may be configured to slide relative to the consumer product. The removable module may comprise a locking mechanism having one or more sets of spring mechanisms, a first portion and a second portion.

The first portion of the locking mechanism may be inserted into the channel of a housing or component. In some embodiments, the removable module has a body with a profile shape that is extruded or extended along a length of the body. Similarly, the housing or component may have a corresponding opening or feature having a similar profile shape that is extended along a length or direction. With regard to operation, the removable module may be inserted by sliding the body of the removable module into the opening in the housing along a direction that is substantially aligned with both the length of the body and the length of the opening.

As previously described, the removable module may include a spring-loaded locking mechanism. In some embodiments, a first portion of the locking mechanism may be spring-biased flush with respect to the removable module. The first portion of the locking mechanism may correspond to the catch member described above with respect to the previous figures. A second portion of the locking mechanism may be spring-biased proud with respect the removable module. The second portion of the locking mechanism may correspond to the ramp member described above with respect to the previous figures. The locking mechanism may also include a first set of spring elements or mechanisms that cause the first portion of the locking mechanism and the second portion of the locking mechanism to be biased away from each other. In addition, a second set of spring elements or mechanisms may cause the second portion to be biased proud with respect to a surface of the removable module. The second set of spring elements or mechanisms may also cause the first portion of the locking mechanism to be biased flush with respect to the removable module.

In operation 920, a force is applied to at least one side of the removable module. As the force is applied to the removable module, the removable module slides within the channel in the direction of the applied force. The first portion of the locking mechanism may have a length that is substantially equal to, or slightly greater than, a length of the second portion of the locking mechanism. As such, as the removable module slides farther into the housing, the first portion of the locking mechanism enters the channel prior to the second portion of the locking mechanism coming into contact with an outer edge of the channel. Alternatively, the channel may have a first edge that protrudes beyond a second edge resulting in the first portion of the locking mechanism engaging the first edge before the second portion of the locking mechanism engages the second edge. In either case, the channel may keep the first portion of the locking mechanism in a compressed state even when the second portion of the locking mechanism begins to enter a compressed state due to contact with the channel such as described above.

In operation 930, the second portion of the locking mechanism of the removable module comes into contact with the channel. When the second portion of the locking mechanism comes into contact with the channel and force is continually applied to the removable module, the channel causes the second portion of the locking mechanism to compress or withdraw into the removable module.

As the removable module is inserted farther into the channel, the first set of spring elements or mechanisms and a second set of spring elements or mechanisms enable the second portion of the locking mechanism to compress until the second portion of the locking mechanism is contained within the removable module or at least until the second portion of the locking mechanism is contained within the channel. Although the first and the second set of spring elements or mechanisms are compressed, and although the first set of spring elements or mechanisms cause the first portion of the locking mechanism to be biased away from the second portion of the locking mechanism, the first portion of the locking mechanism is contained within the channel which prohibits the first portion of the locking mechanism from expanding. Therefore, the locking mechanism may remain in a compressed state.

The locking mechanism remains in the compressed state as the removable module continues to slide within the channel. However, when the locking mechanism is in proximity to, or beneath a recess contained in the channel, flow proceeds to operation 940 and the locking mechanism may expand or extend into a recess of the housing.

More specifically, in operation 940, the first portion of the locking mechanism aligns with and engages the recess in the channel. In some embodiments, the first set of spring elements mechanisms of the locking mechanism expand. The expansion of the first set of spring elements or mechanisms causes the first portion to move in a direction toward the recess. When the first portion of the locking mechanism is in the recess, the removable module may be locked in place within the channel. Although the first portion of the locking mechanism is in an expanded state (e.g., a state in which a portion of the first portion of the locking mechanism extends beyond the removable module), the second portion of the locking mechanism remains in a contracted or withdrawn state due to continued contact with the channel of the housing.

In some embodiments, the removable module may be retained or locked with respect to the housing until the first portion is disengaged or released with respect to the recess in the channel of the housing. The resulting engagement of the removable module with respect to the housing results in a secure connection between the housing of a device and an accessory such as a band, strap, or other attachment accessory.

Figure 20:
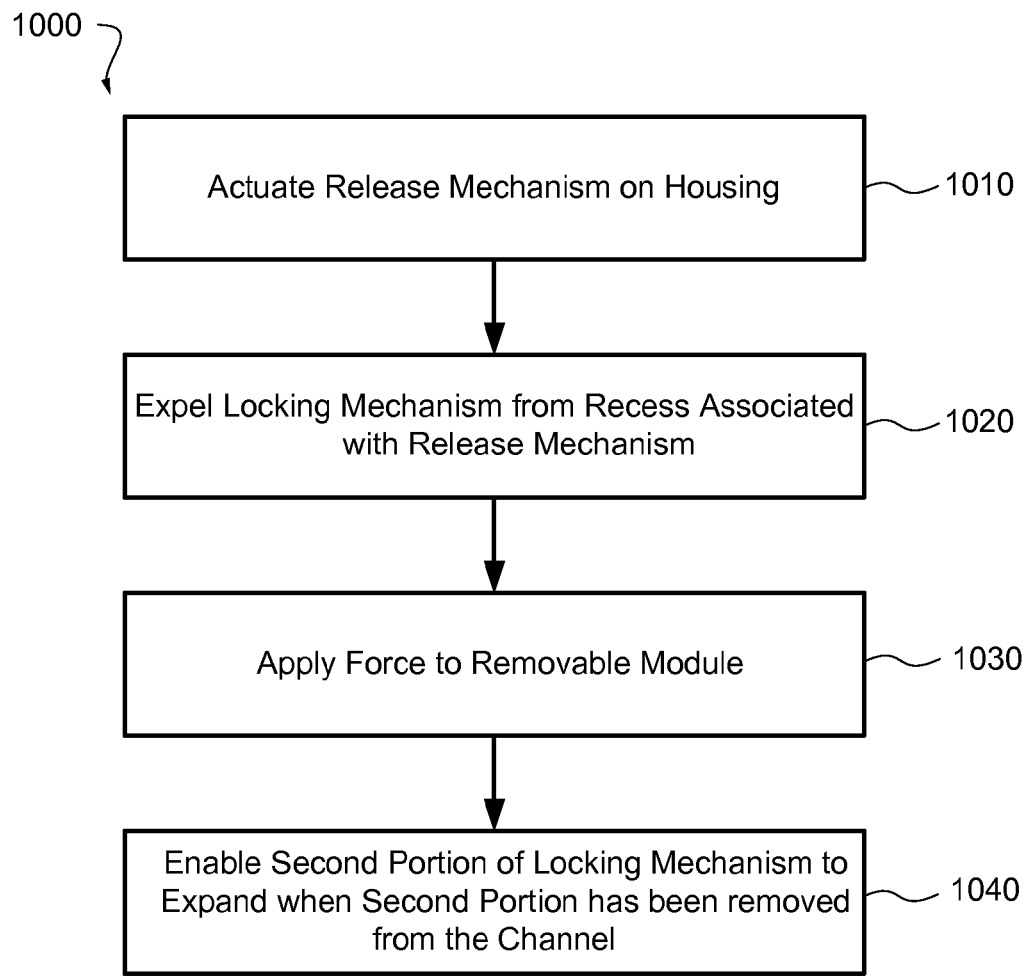
FIG. 20 illustrates an example process of removing a removable module from a consumer product according to one or more embodiments of the present disclosure.

FIG. 20 illustrates an example process 1000 of removing a removable module from a housing or component of a consumer product according to one or more embodiments of the present disclosure. The process 1000 may be used to remove various removable modules from various channels such as described herein. For example, process 1000 may be used to disengage a locking mechanism of the removable module 205 shown and described with respect to FIG. 7A-FIG. 9C from the channel 315 of a housing 300 shown and described with respect to FIG. 10A-FIG. 12B. Although specific removable modules and channels are described, the process 1000, or portions thereof, may be used to remove any of the removable modules described herein from any of the channels, components, apertures, housings, and the like described herein.

In operation 1010, a release mechanism on a housing of a consumer product is actuated. The release mechanism may be actuated, for example, by applying a force to an actuation portion or first portion of the release mechanism using an object, such as a finger or tool. In some embodiments, when a first portion of the release mechanism is actuated, a spring mechanism in the release mechanism compresses and enables the first portion of the release mechanism to move within an opening in the housing. In some embodiments, the first portion of the release mechanism corresponds to the actuation portion or button potion described with respect to the previous figures. The actuation of the first portion may also cause a second portion of the release mechanism to move from a first position in a recess of a channel in the housing to a second position within the recess of the channel. In some embodiments, the second portion of the release mechanism corresponds to the plunger portion described above with respect to the previous figures.

In operation 1020, the movement of the release mechanism may cause the second portion of the release mechanism to expel a first portion of a locking mechanism of a removable module from the recess. As previously discussed, the second portion of the release mechanism may depress the first portion of the locking mechanism to be flush or nearly flush with a surface of the removable module, thereby disengaging the locking mechanism from the housing.

Once the first portion of the locking mechanism has been expelled from the recess, in operation 1030, a force may be applied to the removable module to move the removable module within the channel. For example, when the first portion of the release mechanism is actuated, spring elements or mechanisms in the release mechanism may compress and enable the first portion to move within the housing. Actuation of the first portion of the release mechanism may also cause the second portion of the release mechanism to move from a first position in the recess to a second position within the recess. As the second portion of the release mechanism moves from the first position to the second position, the second portion of the release mechanism may cause a spring element or mechanism in the locking mechanism to compress. The compression may result in the first portion of the locking mechanism to be removed from the recess. Once the first portion of the locking mechanism has been removed from the recess, the removable module may move within the channel in a direction of applied force.

In operation 1040, the removable module may be removed from the channel and a second portion of the locking mechanism of the removable module may expand. In some implementations, when the second portion of the locking mechanism is removed from the channel of the housing of the consumer product, the second spring elements or mechanism may cause the second portion of the locking mechanism to be biased proud with respect to the removable module while causing the first portion of the locking mechanism to be biased flush or substantially flush with respect to the removable module.

The result of process 1000 is that the band, strap, or other attachment accessory is detached from the housing of a device. In some embodiments, process 1000 may be used to detach a first type of band, strap, or other attachment accessory and method 900 can be used to attach a different, second type of band, strap, or other attachment accessory. In some embodiments, the attachment systems and methods described herein may be used to create an interchangeable system of components and accessories that can be attached to a consumer product. The interchangeable components or accessories may alter the functionality and/or appearance of the consumer product and thereby expand the applicability or use of a particular consumer product.

Figure 21:
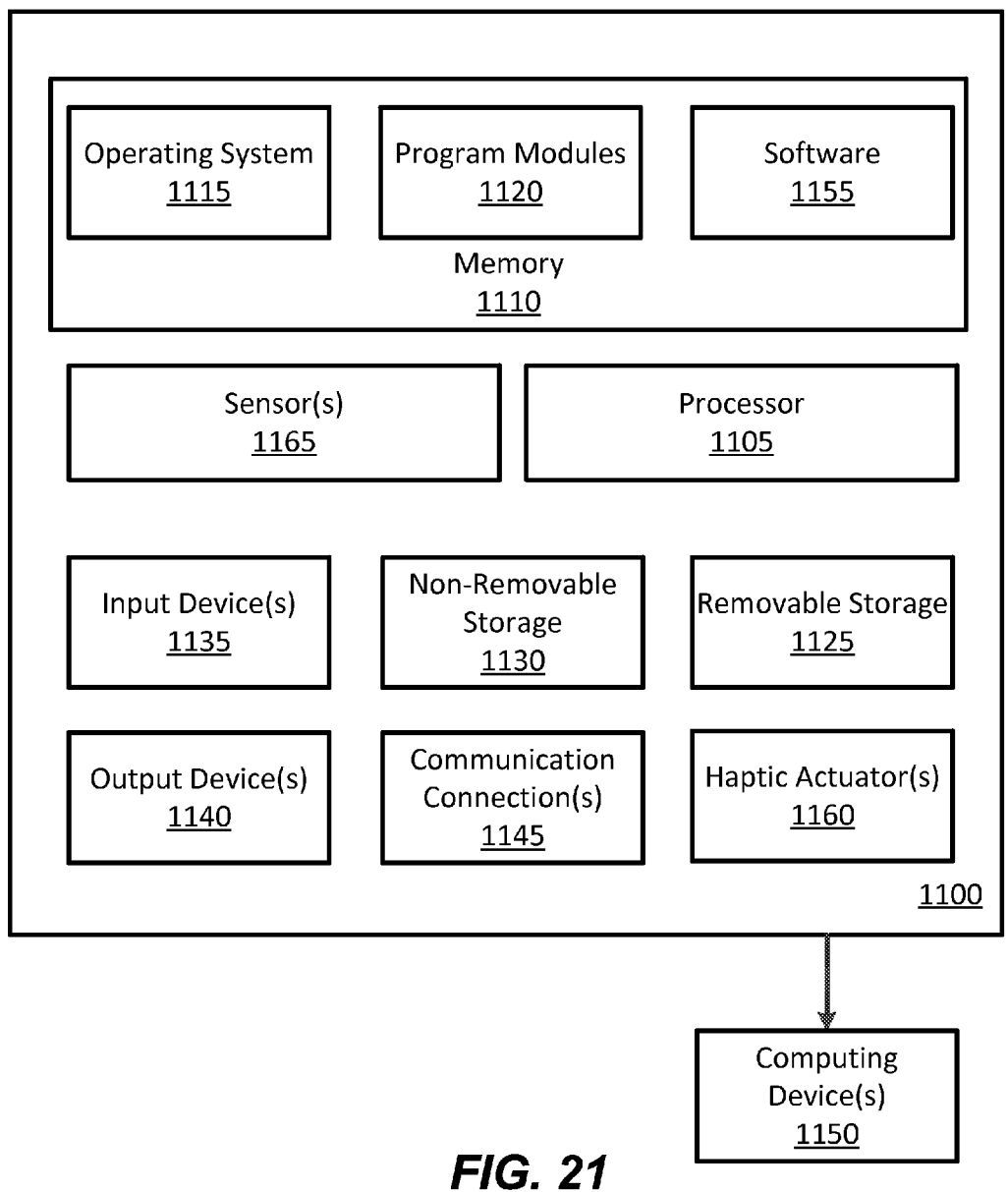
FIG. 21 is a block diagram illustrating example physical components of a consumer product that may be used with one or more embodiments of the present disclosure.

FIG. 21 is a block diagram illustrating example components, such as, for example, hardware components of a consumer product 1100 according to one or more embodiments of the present disclosure. The consumer product 1100 may be similar to the consumer product 104 described above. Although various components of the consumer product 1100 are shown, connections and communication channels between each of the components are omitted for simplicity.

In a basic configuration, the consumer product 1100 may include at least one processor 1105 or processing unit and a memory 1110. The memory 1110 may comprise, but is not limited to, volatile storage such as random access memory, non-volatile storage such as read-only memory, flash memory, or any combination thereof. The memory 1110 may store an operating system 1115 and one or more program modules 1120 suitable for running software applications 1155. The operating system 1115 may be configured to control the consumer product 1100 and/or one or more software applications 1155 being executed by the operating system 1115. The software applications 1155 may include browser applications, e-mail applications, calendaring applications, contact manager applications, messaging applications, games, media player applications, time keeping applications, and the like.

The consumer product 1100 may have additional features or functionality than those expressly described herein. For example, the consumer product 1100 may also include additional data storage devices such as removable storage device 1125 and non-removable storage device 1130. Examples of such storage devices include magnetic disks, optical disks, or tape.

As also shown in FIG. 21, the consumer product 1100 may include one or more input devices 1135. The input devices 1135 may include a keyboard, a mouse, a pen or stylus, a sound input device, a touch input device, and the like. The consumer product 1100 may also include one or more output devices 1140. The output devices 1140 may include a display, one or more speakers, and the like. The consumer product 1100 may also include one or more haptic actuators 1160 that are used to provide the haptic feedback. In some embodiments, the consumer product 1100 may also include one or more sensors 1165. The sensors may include, but are not limited to, accelerometers, ambient light sensors, gyroscopes, magnetometers and other types of sensors.

The consumer product 1100 may also include communication connections 1145 that facilitate communications with additional computing devices 1150. Such communication connections 1145 may include a RF transmitter, a receiver, and/or transceiver circuitry, universal serial bus (USB) communications, parallel ports and/or serial ports.

As used herein, the term computer-readable media may include computer storage media. Computer storage media may include volatile and nonvolatile media and/or removable and non-removable media implemented in any method or technology for the storage of information. Examples include computer-readable instructions, data structures, or program modules. The memory 1110, the removable storage device 1125, and the non-removable storage device 1130 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the consumer product 1100.

The consumer product 1100 may also include a synchronization application or module (not shown) configured to synchronize applications or data resident on the consumer product 1100 with another computer or device.

The consumer product 1100 may also include a power supply such as a battery, a solar cell, and the like that provides power to each of the components shown. The power supply may also include an external power source, such as an AC adapter or other such connector that supplements or recharges the batteries. The consumer product 1100 may also include a radio that performs the function of transmitting and receiving radio frequency communications. Additionally, communications received by the radio may be disseminated to the application programs. Likewise, communications from the application programs may be disseminated to the radio as needed.

The consumer product 1100 may also include a visual indicator, a keypad and a display. In embodiments, the keypad may be a physical keypad or a virtual keypad generated on a touch screen display. The visual indicator may be used to provide visual notifications to a user of the consumer product. The consumer product 1100 may also include an audio interface for producing audible notifications and alerts.

In certain embodiments, the visual indicator is a light emitting diode (LED) or other such light source and the audio interface is a speaker. In certain embodiments, the audio interface may be configured to receive audio input.

The audio interface may also be used to provide and receive audible signals from a user of the consumer product 1100. For example, a microphone may be used to receive audible input. The system may further include a video interface that enables an operation of an on-board camera to record still images, video, and the like.

In one or more embodiments, data and information generated or captured by the consumer product 1100 may be stored locally. Additionally or alternatively, the data may be stored on any number of storage media that may be accessed by the consumer product using the radio, a wired connection or a wireless connection between the consumer product and a remote computing device. Additionally, data and information may be readily transferred between computing devices.

FIG. 22A-FIG. 22F illustrate various removable modules and attached accessories that may be used in the various attachment systems described herein. Each of the removable modules shown in FIG. 22A-FIG. 22F may be similar to the various removable modules described above. For example, the removable modules shown in FIG. 22A-FIG. 22F may be similar to removable module 205 shown and described with respect to FIG. 7A-FIG. 7B. Although the various removable modules shown and described with respect to these figures may interface with a band or other accessory in various ways, the functionality of the removable module remains the same. For example, the locking mechanism, if present, of each removable module may be configured to be received within a recess of a channel such as described above. Additionally, the friction pads may also provide the same functionality and so on.

Figure 22A:
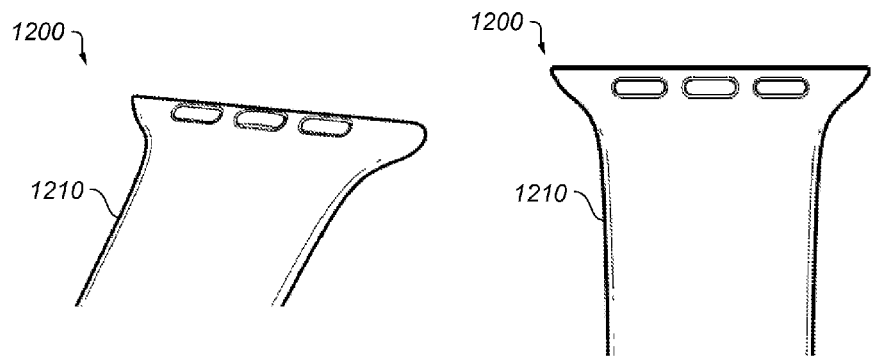
FIG. 22A illustrates a removable module and an attached accessory according to a first embodiment of the present disclosure.

FIG. 22A illustrates an example removable module 1200 in which the removable module, and/or components of the removable module is integrated with a band 1210. More specifically, the removable module 1200, in addition to the various components of the removable module 1200 (e.g., a locking mechanism, friction pads and so on) may formed in the band 1210 itself or protrude from the band 1210. In another embodiment, the band 1210 may be overmolded on the removable module 1200 such that the various components may protrude through or are otherwise accessible through the band 1210.

Figure 22B:
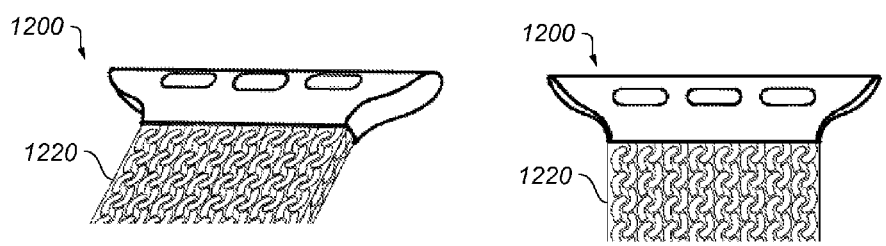
FIG. 22B illustrates a removable module and an attached accessory according to a second embodiment of the present disclosure.

FIG. 22B illustrates another embodiment in which a removable module 1200 of an attachment system is coupled to a band 1220. In this embodiment, the band 1220 may be a mesh material such as, for example, a metallic mesh. Although a metallic mesh is specifically mentioned, other materials can be used. For example, the band 1220 may be made of woven fibers or other such materials. In some embodiments, the removable module 1200 may be coupled directly to the band 1220. In another embodiment, a pin or other connection mechanism may be used to secure the band 1220 to the removable module 1200.

Figure 22C:
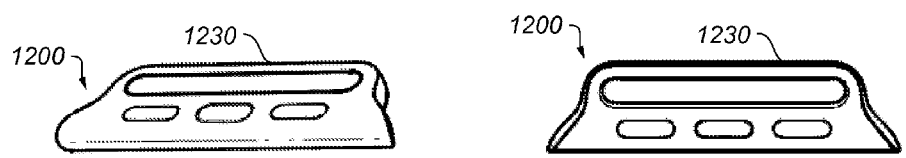
FIG. 22C illustrates a removable module and an attached accessory according to a third embodiment of the present disclosure.

FIG. 22C illustrates another embodiment of a removable module 1200 of an attachment system. In the embodiment shown in FIG. 22C, a bar 1230 may be integrated with the removable module 1200 such that the bar 1230 and the removable module 1200 form a single, unitary component. As such, a band, object or another accessory may be, threaded, woven or otherwise inserted through the opening formed between the bar 1230 and the removable module 1200. In another embodiment, a band or other such accessory may be removably coupled (e.g., clipped, snapped and so on) to the bar 1230. In other implementations, a band or other accessory may be overmolded onto the bar 1230.

Figure 22D:
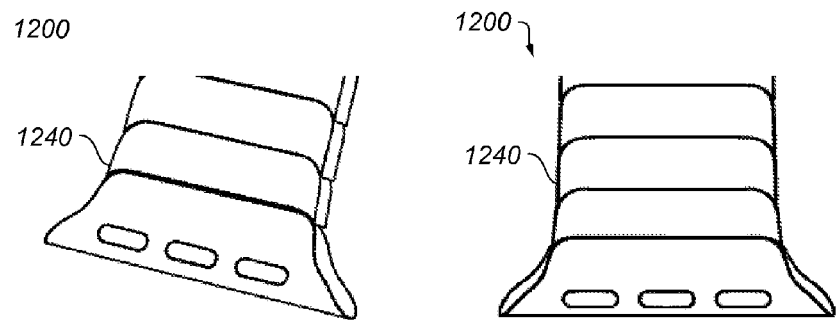
FIG. 22D illustrates a removable module and an attached accessory according to a fourth embodiment of the present disclosure.

FIG. 22D illustrates yet another example removable module 1200 of an attachment system in which the removable module 1200 is coupled to or otherwise comprises a band 1240 that is comprised of multiple links. More specifically, the band 1240 may be comprised of a number of links that may be attached to and detached from one another. In some implementations, one of the links may be the removable module 1200. In another embodiment, the band 1240 or one of the links in the band 1240 may be coupled to the removable module 1200 using a pin or other such securement mechanism.

Figure 22E:
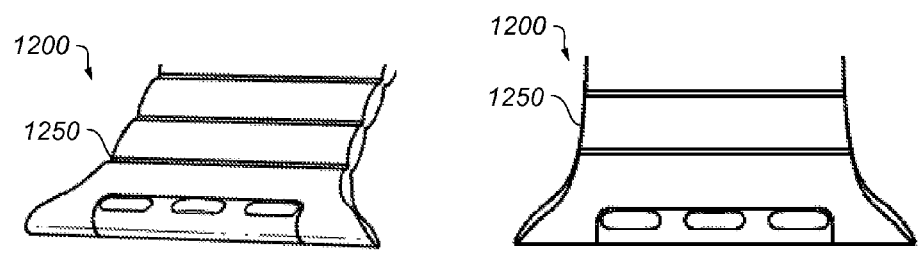
FIG. 22E illustrates a removable module and an attached accessory according to a fifth embodiment of the present disclosure.

FIG. 22E illustrates an example removable module 1200 of an attachment system and an associated band 1250. In this particular example, the removable module 1200, or portions of the removable module 1200 may be integrated with the band 1250. More specifically, one or more components of the removable module 1200 (e.g., the friction pads, locking mechanism etc.) may be coupled to the band 1250. In another implementation, a body portion of the removable module 1200 may be covered by a portion of the band 1250 while the components remain exposed. The band 1250 may be a leather band, a silicon band, a plastic band and the like.

Figure 22F:
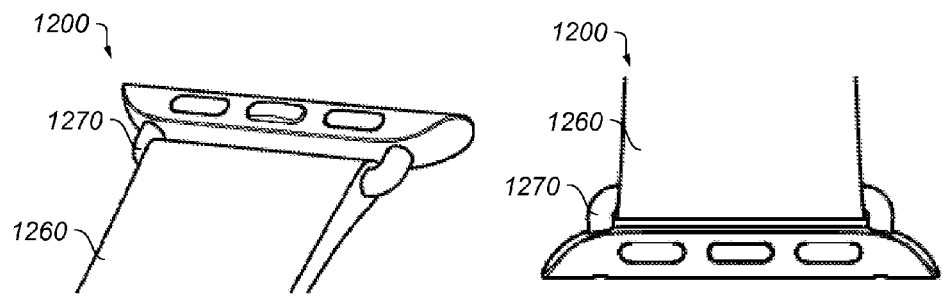
FIG. 22F illustrates a removable module and an attached accessory according to a sixth embodiment of the present disclosure.

FIG. 22F illustrates an embodiment of a removable module 1200 of an attachment system that includes a bracket 1270 that is coupled to both the band 1260 and the removable module 1200. In some implementations, the band 1260 may be overmolded onto the bracket 1270. In another embodiment, the band 1260 may include an opening, a hole or other aperture through which the bracket 1270 may be inserted. In some embodiments and as will be described below, the bracket 1270 may be comprised of two separate pieces that may be coupled to each other and decoupled from each other in order to secure or remove the band 1260 from the bracket 1270 and the removable module 1200. In addition, each piece of the bracket 1270 may be removably coupled to the removable module 1200.

In each of the examples set forth above, the removable module 1200, whether integrated with the various band or coupled to the various bands, may be inserted into a channel of a housing of a consumer product such as described above. Further, each of the bands may be formed from a different material or may be made using a different construction.

For example, band 1260 may be formed from a textile material that may be constructed from a pattern of thread or fiber material. The textile material may include a variety of materials, including natural fibers, synthetic fibers, metallic fibers, ductile metals or alloys and so on. The bands may also be formed from a woven material may be constructed from an array of warp fibers or threads interwoven with one or more weft fibers or threads. Similarly, the warp and weft fibers may include a variety of materials, including natural fibers, synthetic fibers, metallic fibers, and so on.

In another embodiment, the bands may be formed from leather material such as, for example, a sheet or strip of cowhide or other types of animal hide. The leather material may also include a synthetic leather material, such as vinyl or plastic. In still yet other embodiments, the bands may be formed from a metallic mesh or link construction. For example, band 1220 may be formed from a Milanese mesh or other similar type of construction. The bands may also be formed from a silicone or other elastomer material.

In some cases, the band is a composite construction that includes various materials which may be selected based on the end use or application. In some embodiments, a first band strap, or a first portion of the first band strap may be made up of a first material and a second band strap, or a second portion of the second band strap, may be made from a second, different material. The band may also be made up of a plurality of links and, as such, the band may be resizable by, for example, adding or removing links.

As discussed above, each removable module and band combination may be interchangeable which allows for individual customization of the device or to better adapt the device for a range of uses or applications. In some instances, the type of band that is selected and installed can facilitate a particular user activity. For example, a band formed from a textile material and that includes a durable clasp may be particularly well suited for exercise or outdoor activities. Alternatively, a band formed from a metallic material and includes a thin or low-profile clasp may be well suited for more formal or fashion-focused activities.

In some embodiments, the band may be coupled to the removable module 1200 using pins, holes, adhesives, screws, and so on. In yet other embodiments, the band may be co-molded or overmolded with at least a portion of the component having a mating feature such as, for example the bar 1230 discussed above. In some embodiments, the band is coupled to the component via a pin that allows the straps to rotate with respect to the component. The pin may be formed integrally with or disposed in a loop formed in the end of the band.

In some embodiments, each band may have a band clasp. On example clasp may include first band strap having a buckle or tang assembly which is configured to interface with a second band strap having a series of apertures or holes formed with the strap. Additionally or alternatively, the bands may include a magnetic clasp having one or more magnetic elements on a first band strap that is configured to mate to one or more magnetic or ferromagnetic elements on a second band strap.

Figure 23:
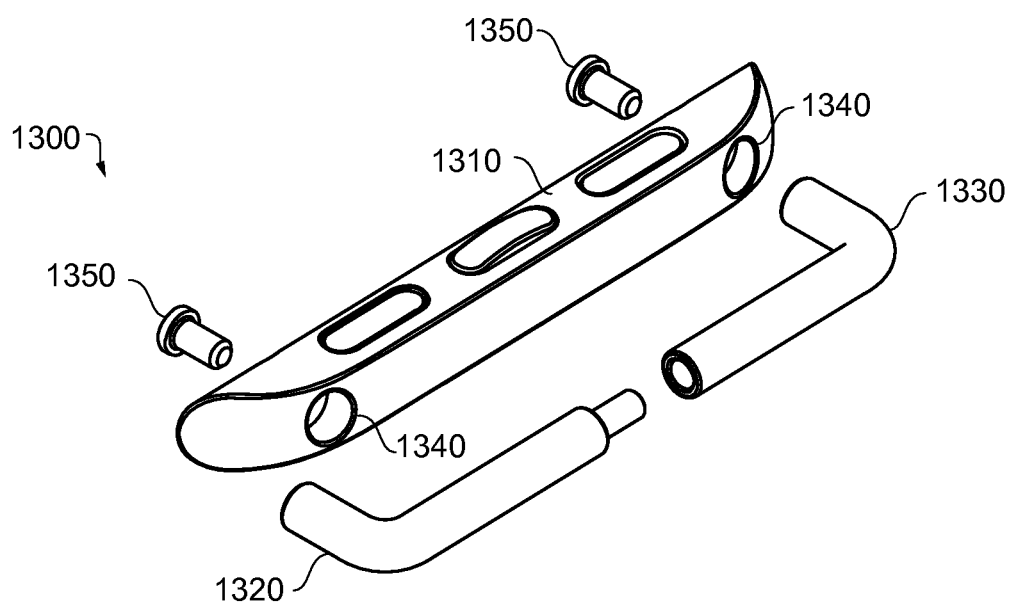
FIG. 23 illustrates an exploded view of a removable module of an example attachment system according to one or more embodiments of the present disclosure.

FIG. 23 illustrates an exploded view of a removable module 1300 of one sample attachment system according to one or more embodiments of the present disclosure. The removable module 1300 may be similar to the removable module 1200 shown and described above with respect to FIG. 22F.

The removable module 1300 may have a body 1310 having similar shapes, components and dimensions such as described above with respect to the other embodiments described herein. As such, the removable module may include one or more friction pads, a locking mechanism and so on, and may be adapted to be received in a channel of an electronic, electromechanical, or mechanical device.

The removable module 1300 may also include a bracket formed from a first section 1320 and a second section 1330. As shown in FIG. 23, each of the first section 1320 and the second section 1330 may have an "L" shape although other shapes and configurations are possible.

More specifically, the first section 1320 may include a first projection connected at a radiused angle to a second projection. The second projection may include a male protrusion that extends therefrom. Likewise, the second section 1330 may include a first projection connected at a radiused angle to a second projection. The second projection of the second section 1330 may include a female receptacle configured to receive the male protrusion of the first section 1320.

More specifically, the male protrusion of the first section 1320 may be configured to be snugly inserted into or otherwise be received into the female receptacle of the second section 1330. This may enable the first section 1320 and the second section 1330 to be joined together to form a single, unitary piece. Further, each of the first section 1320 and the second section 1330 may be inserted into an aperture in band or other such accessory. Once inserted into the aperture of the band or the accessory, the male portion of the first section 1320 may be received into the female portion of the second section 1330 which secures the band or the accessory to the bracket which may subsequently be coupled to the removable module 1300.

In another implementation, the first section 1320 can be joined or otherwise coupled to the second section 1330 and the band or accessory may then be coupled to the resulting bracket. The bracket and band combination can then be coupled to the body 1310.

The body 1310 of the removable module 1300 also defines apertures 1340. The apertures 1340 are configured to receive end portions (e.g., the end portions that do not include the male protrusion and female receptacle) of the first section 1320 and the second section 1330 respectively. For example, a first aperture may be configured to receive a distal end of the first section 1320 and a second aperture may be configured to receive a distal end of the second section 1330.

One or more bolts, screws 1350 or other suitable securement mechanisms may then be inserted through the apertures 1340. The screws 1350 may secure the first section 1320 of the bracket and the second section 1330 of the bracket to the body 1310. Securing the first section 1320 and the second section 1330 of the bracket to the body in this way may also secure the band or accessory to the removable module 1300 and also secures the first section 1320 to the second section 1330.

To remove the bracket from the body 1310 (e.g., to change the band or accessory that is coupled to the removable module 1300), the screws 1350 may be removed from the first section 1320 and the second section 1330. The first section 1320 may then be decoupled from the second section 1330 and the band or the accessory may be removed.

Figure 24:
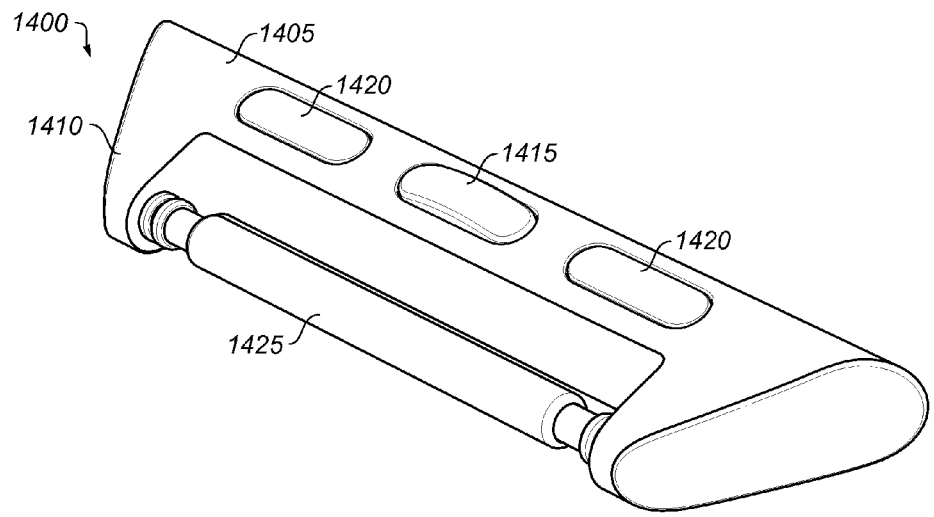
FIG. 24 illustrates a first perspective view of a removable module of an attachment system according to one or more embodiments of the present disclosure.
Figure 25:
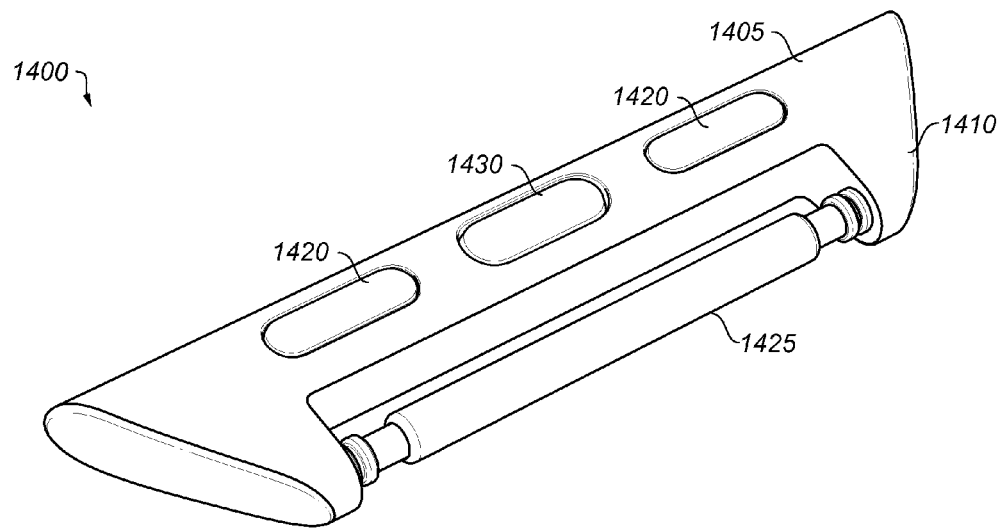
FIG. 25 illustrates a second perspective view of a removable module of an attachment system according to one or more embodiments of the present disclosure.
Figure 26:
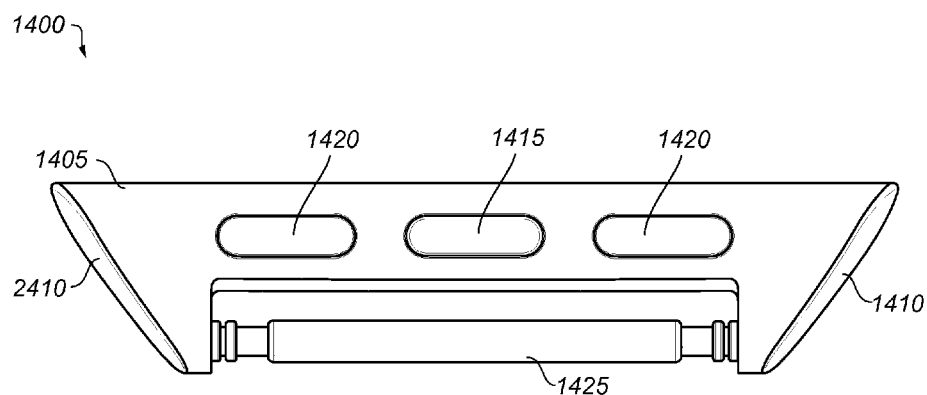
FIG. 26 illustrates a top-down view of the bottom surface of a removable module of an attachment system according to one or more embodiments of the present disclosure.
Figure 27:
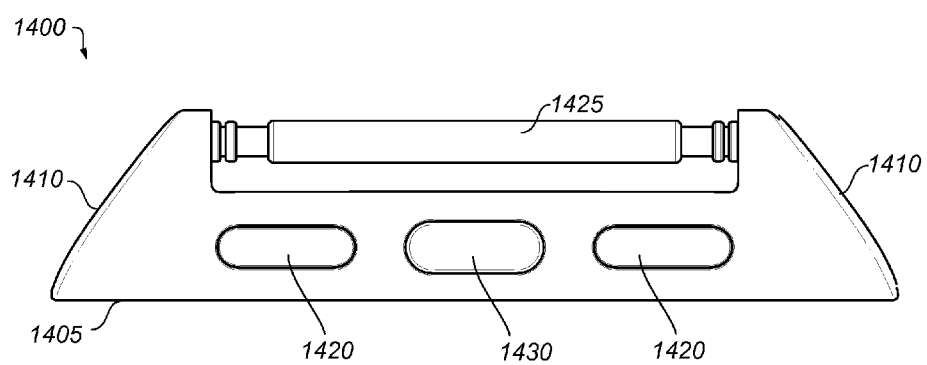
FIG. 27 illustrates a top-down view of the top surface of a removable module of an attachment system according to one or more embodiments of the present disclosure.
Figure 28:
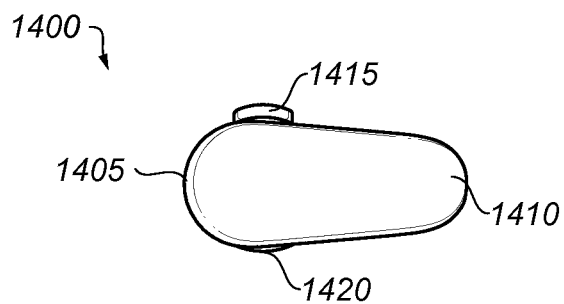
FIG. 28 illustrates a first side view of a removable module of an attachment system according to one or more embodiments of the present disclosure.
Figure 29:
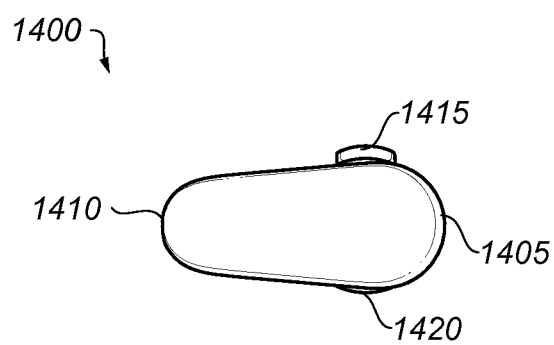
FIG. 29 illustrates a second side view of a removable module of an attachment system according to one or more embodiments of the present disclosure.
Figure 30:
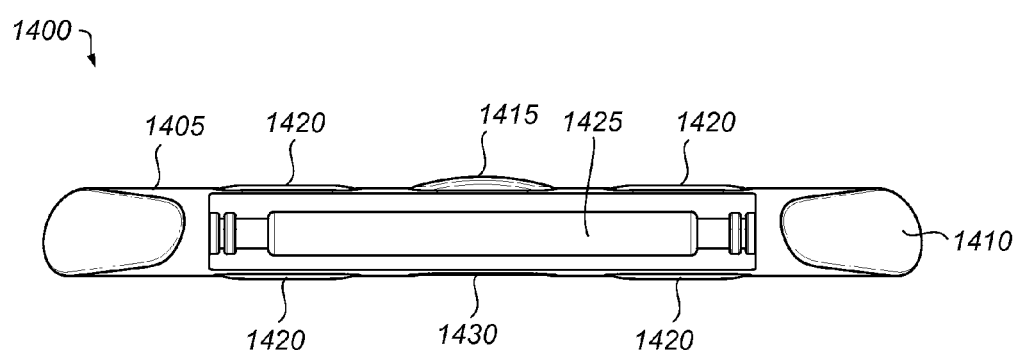
FIG. 30 illustrates a front view of a removable module of an attachment system according to one or more embodiments of the present disclosure.
Figure 31:
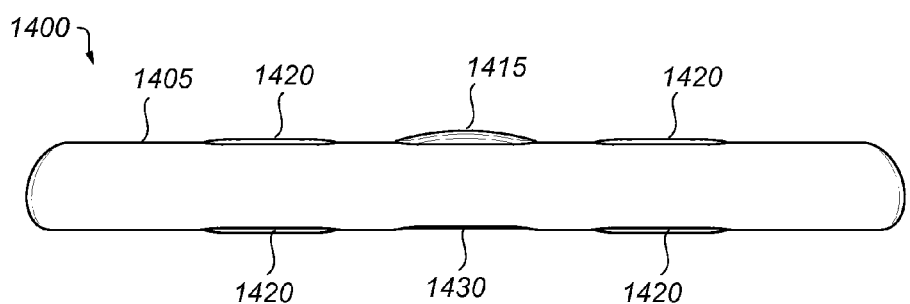
FIG. 31 illustrates a back view of a removable module of an attachment system according to one or more embodiments of the present disclosure.

FIG. 24-FIG. 31 illustrate various views of a removable module 1400 of an attachment system according to one or more embodiments of the present disclosure. More specifically, FIG. 24 illustrates a perspective view of a bottom surface of a removable module 1400, FIG. 25 illustrates a perspective view of a top surface of the removable module 1400, FIG. 26 illustrates a top view of the bottom surface of the removable module 1400, FIG. 27 illustrates a top view of the top surface of the removable module 1400, FIG. 28 and FIG. 29 illustrate left and right side views of the removable module 1400, FIG. 30 illustrates a front view of the removable module 1400 and FIG. 31 illustrates a back view of the removable module 1400. As each of these figures illustrate various views of the removable module 1400, like reference numerals may be used throughout FIG. 24-FIG. 31. In some embodiments, the removable module 1400 described with respect to these figures may be similar to the various removable modules described herein. As such, the removable module 1400 may include many of the dimensions, features and components described above.

Referring to FIG. 24, the removable module 1400 may include a rounded body 1405 and one or more arms 1410 that extend from the body 1405. This shape of the body 1405 may have a teardrop shape such as shown in FIG. 28 and FIG. 29. The body 1405 may include a locking mechanism such as described above. The locking mechanism may include a ramp 1415 that is configured to protrude from the bottom surface of the removable module 1400. As such, when the removable module 1400 is inserted into a channel or groove of a consumer product, the locking mechanism may be actuated such as described above.

In addition, the removable module 1400 may include one or more friction pads 1420. The friction pads 1420 may be positioned on both the bottom surface of the body 1405 and the top surface of the body 1405 (shown in FIG. 25). Further, the friction pads 1420 may be positioned on either side of the locking mechanism. As shown in FIG. 28-FIG. 31, the friction pads 1420 may protrude from both the bottom surface of the body 1405 and the top surface of the body 1405. Although friction pads 1420 are shown and described, in some embodiments, the friction pads may be excluded from the removable module 1400 or may be positioned on a single side.

The body 1405 of the removable module 1400 may include arms 1410 that extend from the body 1405. The arms 1410 of the removable module 1400 may have a width that starts narrow at one end and gets wider the closer the arms 1410 get to the body 1405 of the removable module 1400. That is, the arms 1410 may have a narrow width at a proximal end and have a wider width as the arms 1410 are integrated with the body 1405. Each arm 1410 may include a sidewall that extends along the outside of the removable module that make up a width of the removable module 1400.

The sidewalls of each arm 1410 may be angled and/or tapered such as shown in FIG. 24 and FIG. 26. More specifically as shown in FIG. 24, FIG. 26 and FIG. 30, the sidewall of each arm 1410 may be angled or slanted from the top surface of the body 1405 toward the bottom surface of the body 1405. The body may also include a rounded edge that transitions from or otherwise connects the top surface of the body 1405 to the bottom surface of the body 1405.

A pin 1425 may be secured between the arms 1410 of the removable module 1400. As discussed above, the pin may be removably received into one or more recesses within the arms 1410. In another embodiment, the pin 1425 may be directly coupled to the arms 1410 forming an integrated piece. In some cases the pin 1425 may be screwed into the arms or the body 1405 of the removable module. The pin 1425 may also be formed of two or more separate pieces that may be coupled together. The pin 1425 may be used to secure a band, strap or other object/accessory to the removable module 1400.

FIG. 25 illustrates a top surface of the body 1405 of the removable module 1400. As discussed above, the top surface of the body 1405 includes a portion of the locking mechanism. More specifically, a catch member 1430 of the locking mechanism may be disposed on the top surface of the body 1405 such that the catch member 1430 is flush or substantially flush with respect to the body 1405 when the locking mechanism is in its fully expanded state. The position of the catch member 1430 is further shown in FIG. 30 and FIG. 31.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Further, regardless of whether the features shown and described herein are shown and described in combination or separately, the various features, including structural features and methodological features, are intended to be selectively included or omitted to produce an embodiment with a particular set of features. Further, the directions and orientations described above may be reversed. For example a top portion or surface in one embodiment may be a bottom portion or surface in another embodiment. Likewise, a bottom portion or surface in one embodiment may be a top surface or portion in another embodiment. Having been provided with the description and illustration of the present application, one skilled in the art may envision variations, modifications, and alternate embodiments falling within the spirit of the broader aspects of the embodiments described herein that do not depart from the broader scope of the claimed embodiments.

Further, embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

What is claimed is:

1. An attachment system for a watch, the attachment system comprising:
   a watch band comprising:
      a first surface;
      a second surface; and a rounded sidewall that transitions from the first surface to the second surface; and a housing comprising:
  a channel having a shape that corresponds to a shape of the watch band and adapted to receive the watch band when the watch band slides relative to the housing;
  a recess for receiving a locking mechanism of the watch band;
  an opening;
  a ledge between the recess and the opening;
  a button at least partially within the opening and the recess; and
  a spring mechanism configured to bias the button away from the channel and against the ledge.

2. The attachment system of claim 1, wherein the locking mechanism is spring-loaded and adapted to move from an extended state to a compressed state as the watch band is received into the housing.

3. The attachment system of claim 1, wherein the locking mechanism is spring-loaded and includes a catch member disposed on the first surface of the watch band and a ramp member disposed on the second surface of the watch band.

4. The attachment system of claim 1, wherein the watch band further comprises one or more friction pads disposed on at least one of the first surface and the second surface.

5. The attachment system of claim 1, further comprising an accessory coupled to the watch band.

6. The attachment system of claim 5, wherein the watch band is integrated with the accessory.

7. The attachment system of claim 5, wherein the watch band comprises a bracket configured to be inserted into an aperture of the accessory.

8. The attachment system of claim 1, wherein the button comprises:
  a plunger having a flange; and
  a button portion having a receiving slot for receiving the flange to couple the plunger to the button portion.

9. The attachment system of claim 8, wherein the plunger is positioned at least partially within the recess and the button portion is positioned within the opening.

10. The attachment system of claim 8, wherein the spring mechanism comprises multiple springs between the button portion and the ledge.

11. An attachment system for a watch, the attachment system comprising:
  a watch band having a spring-loaded locking mechanism; and
  a housing comprising:
    a channel, wherein the channel is shaped to receive the watch band;
    a recess for receiving at least a portion of the spring-loaded locking mechanisms;
    an opening;
    a ledge between the recess and the opening;
    a button at least partially within the opening and the recess; and
    a spring mechanism configured to bias the button to move from a first position for engaging the spring-loaded locking mechanism to a second position against the ledge.

12. The attachment system of claim 11, wherein the watch band includes a rounded sidewall that transitions from a first surface of the watch band to a second surface of the watch band.

13. The attachment system of claim 12, wherein each of the first surface of the watch band and the second surface of the watch band are substantially planar.

14. The attachment system of claim 12, wherein each of the first surface of the watch band and the second surface of the watch band are rounded.

15. An attachment system comprising:
  a watch band;
  a housing for receiving the watch band, the housing comprising:
    a channel disposed along a length of the housing, the channel configured to slideably receive the watch band and having:
      a first portion having a first width;
      a second portion having a second width that is larger than the first width and forming an undercut; and
      a recess disposed within the channel, the recess adapted to receive at least a portion of a locking mechanism of the watch band when the locking mechanism is in proximity to the recess;
    an opening;
    a ledge between the recess and the opening;
    a button; and
    a spring between the button and the ledge of the housing to bias the button to be substantially flush with an outer surface of the housing while the button is against the ledge.

16. The attachment system of claim 15, wherein the button comprises:
  a plunger having a flange; and
  a button portion having a receiving slot for receiving the flange to couple the plunger to the button portion.

17. The attachment system of claim 16, wherein the plunger is positioned at least partially within the recess and the button portion is positioned at least partially within the opening.

18. The attachment system of claim 16, wherein the spring comprises multiple springs between the button portion and the ledge.

19. The attachment system of claim 15, wherein the channel comprises:
  a first portion having a first width; and
  a second portion having a second width that is larger than the first width and forming an undercut.

* * * * *